3,105,083
21-ORGANIC SULFONATES OF 11,17,21-TRI-OXYGENATED-3-KETO PREGNENES

Frank H. Lincoln, Kalamazoo, and William P. Schneider and George B. Spero, Kalamazoo Township, Kalamazoo County, Mich., assignors to The Upjohn Company, Kalamazoo, Mich., a corporation of Delaware
No Drawing. Filed Apr. 14, 1960, Ser. No. 22,141
3 Claims. (Cl. 260—397.45)

This invention relates to 21-organic sulfonate steroids, to compositions containing 21-organic sulfonate steroids as a principal active ingredient, and to methods for using such compositions in therapy.

The principal active ingredients of the present compositions are the 21-organic sulfonates of 11,17,21-trioxygenated-3-keto-$\Delta^4$ steroids of the pregnane series and the $\Delta^1$ analogs thereof possessing anti-inflammatory activity. These steroids are represented by the following formulas:

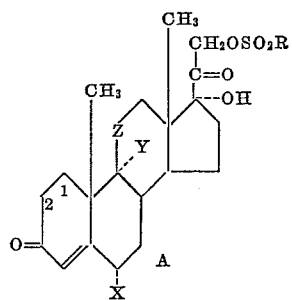

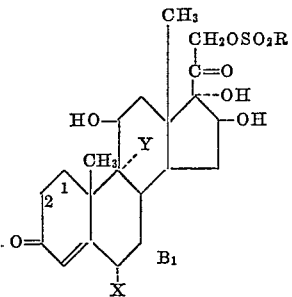

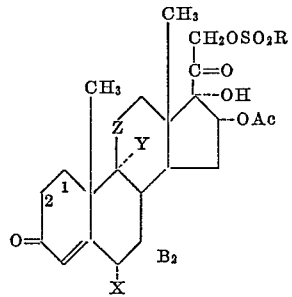

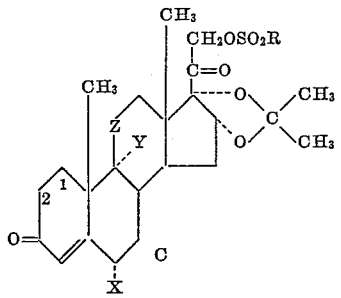

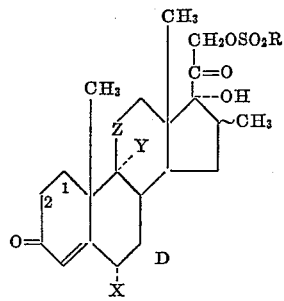

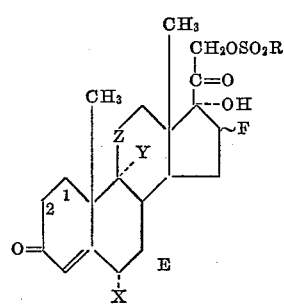

in which:

The 1,2-carbon atom linkage is a single or double bond,
Ac is the acyl radical of an organic carboxylic acid, particularly a hydrocarbon carboxylic acid containing from 1 to 12 carbon atoms, inclusive,
R is an alkyl radical containing from 1 to 12 carbon atoms, inclusive (e.g., saturated aliphatic and cycloaliphatic radicals), aralkyl radicals containing from 7 to 12 carbon atoms inclusive or aryl and substituted aryl radicals of the formula

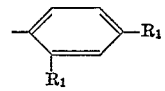

in which one of the $R_1$ substituents is hydrogen and the other $R_1$ substituent is methyl, bromo, chloro, nitro, methoxy and hydrogen,
X is hydrogen, methyl or fluorine,
Y is hydrogen or fluorine, and
Z is the carbonyl radical (>C=O) or the $\beta$-hydroxymethylene radical (>CHOH).

In addition, R represents an $\alpha$-haloalkyl radical of from 1 to 12 carbon atoms, inclusive, e.g., chloromethyl, $\alpha$-bromoethyl, trichloromethyl, trifluoromethyl, $\alpha$-chloropropyl, and the like.

In this application the wavy line ($\sim$) wherever appearing at the 16-position is a generic expression inclusive of the $\alpha$ and $\beta$ configuration and mixtures thereof.

Although in the treatment of some conditions the use of steriods having high glucocorticoid activity is appropriate, such activity is generally regarded as undesirable in the treatment of the inflammatory diseases. Accordingly, it is a constant goal of the steroid chemist seeking potent anti-inflammatory agents to provide compounds demonstrating high anti-inflammatory activity but which are essentially free of glucocorticoid activity or liver glycogen deposition. The compounds of this invention have been unexpectedly found to present an unusual split in biological activity whereby significant anti-inflammatory activity is obtained with little or no demonstrable glucocorticoid effects.

PART A

The compounds of Formula A are prepared according to the following reaction scheme:

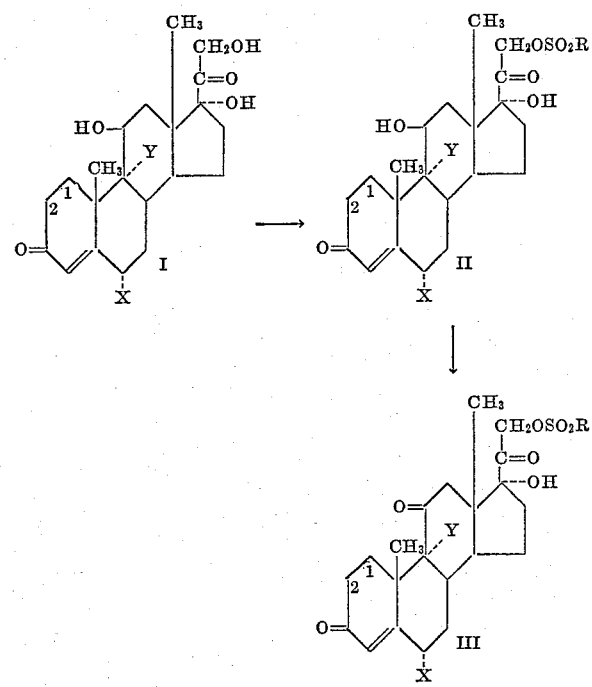

wherein R, X, and Y have the same meaning as previously given.

The process comprises reacting the compounds of Formula I, such as 6α-fluoro-11β,17α,21-trihydroxy-1,4-pregnadiene-3,20-dione with a suitable sulfonating agent in the presence of a solvent, such as pyridine, benzene, toluene, and the like, to obtain the compounds of Formula II, such as 6α-fluoro - 11β,17α,21 - trihydroxy-1,4-pregnadiene-3,20-dione 21-methanesulfonate. In the peferred embodiment the sulfonating agent is an organic sulfonic acid halide, particularly organic sulfonic acid chlorides, such as a saturated aliphatic sulfonyl chloride, e.g., methanesulfonyl chloride, ethanesulfonyl chloride, propanesulfonyl chloride, butanesulfonyl chloride, pentanesulfonyl chloride, hexanesulfonyl chloride, nonanesulfonyl chloride, dodecanesulfonyl chloride, 2-propanesulfonyl chloride, 2-butanesulfonyl chloride, 2-pentanesulfonyl chloride, 2-octanesulfonyl chloride, tertiarybutanesulfonyl chloride; a saturated cycloaliphatic sulfonyl chloride, e.g., cyclopentanesulfonyl chloride and cyclohexanesulfonyl chloride; an aralkyl sulfonyl chloride, e.g., phenylmethanesulfonyl chloride and phenylethanesulfonyl chloride; an aryl sulfonyl chloride, e.g., benzenesulfonyl chloride, o-toluenesulfonyl chloride, p-toluenesulfonyl chloride; a substituted aryl sulfonyl chloride, e.g., o-bromobenzenesulfonyl chloride, p-bromobenzenesulfonyl chloride, o-chlorobenzenesulfonyl chloride, p-chlorobenzenesulfonyl chloride, o-, m-, p-nitrobenzenesulfonyl chloride, anisole-2-sulfonyl chloride, anisole-4-sulfonyl chloride, and the like.

In addition, other organic sulfonyl chlorides can be prepared from the corresponding sulfonic acids or their alkali metal salts by reaction with phosphorous pentachloride or phosphorous oxychloride using procedures well known in the art. Aliphatic sulfonyl chlorides are also obtained directly from the hydrocarbons by treatment with chlorine and sulfur dioxide and radiation (U.S. Patent 2,352,097). Primary and secondary aliphatic sulfonic acids can be prepared from alkyl mercaptans by oxidation with nitric acid [U.S. Patent 2,142,162; Noller et al., J.A.C.S. 55, 1090 (1933)] and primary, secondary, and tertiary aliphatic sulfonic acid sodium salts can be obtained from alkyl bromides by treating with sodium sulfite [Zuffanti, J.A.C.S. 62, 1044 (1940)].

Still other organic sulfonyl halides, particularly α-haloalkanesulfonyl chlorides, such as chloromethanesulfonyl chloride, α-bromoethanesulfonyl chloride, trifluoromethanesulfonyl chloride, trichloromethanesulfonyl chloride, α-chloropropanesulfonyl chloride, and the like, can be reacted with the compounds of Formula I to obtain the compounds of Formula II.

Where such solvents as benzene and toluene are employed, an amount of an amine base such as pyridine at least equal to the molar amount of the organic sulfonyl halide should also be present to react with the halogen acid formed. Reaction of the organic sulfonyl halide is conducted preferably at temperatures between −10 and +60° C. provided that at the lower temperature the solvent has not solidified. Thus, for pyridine, dioxane, toluene, and the like, temperatures in the range of 0 to 10° C. can be used, while for benzene only temperatures above 5° C. are suitable because of the relatively high freezing point of benzene. The reaction time is usually between about 4 and 24 hours.

The compounds of Formula II, such as 6α-fluoro-11β,17α,21 - trihydroxy - 1,4 - pregnadiene-3,20-dione 21-methanesulfonate are recovered and purified in a conventional manner, such as, for example, by evaporating the solvent until a dry residue is obtained which can be freed of salts by trituration with water, dilution of the reaction mixture with water or dilute acid and filtration of the product, extraction with a water-immiscible solvent, such as methylene chloride, ethyl acetate, benzene, toluene, with or without chromatography, or by chromatography alone, followed, if desired, by recrystallization.

These recovery and purification techniques are applicable to each of the preparations (e.g., Preparations $1B_1$, through $11B_1$. $1D^1a$, $1D^1b$ and $2D^1$ through $23D^1$; $1D^2a$, $1D^2b$ and $2D^2$ through $23D^2$; and $1Ea$ through $1Ec$, $1Ec'$, $2Ea$, $2Eb$, $3E$, $4Ea$, $4Eb$; and $5E$ through $13E$) as well as each of the compound examples (Examples $1Aa$ through $1Ad$ and $2A$; $1Ba$, $1Ba_1$, $1Bb$, $1B_1$, $1Bb_2$, $2B$, $2B_1$, $2B_2$ and $3B$; $1C$, $2Ca$, $2Cb$, $2Cb_1$ and $3C$; $1Da$ through $1Dd$, and $2D$; and $1E$, $1E_1$, $1E_2$ and $2E$), described below.

The compounds of Formula II can then be oxidized to the compounds of Formula III, such as 6α-fluoro-17α,21-dihydroxy-1,4-pregnadiene-3,11,20-trione 21-methanesulfonate. The oxidation can be carried out using a variety of methods. The preferred method is to add the chromic acid reagent [Bowers et al., J. Chem. Soc. 2548 (1953)], dropwise until a slight excess of said reagent persists for 5 minutes as indicated by an orange-colored solution. The compounds of Formula III are recovered from the reaction mixture and purified by conventional methods, such as, for example, those described above for the recovery and purification of the compounds of Formula II.

Alternatively, the compounds of Formula II are converted to the compounds of Formula III, according to methods known in the art, such as, for example, by oxidizing the compounds of Formula II in acetic acid solution with chromium trioxide using molar quantities or a slight excess, such as about 10 to 30% excess, or by oxidizing with a haloamide or imide of an acid, such as N-bromoacetamide, n-chlorosuccinimide, or N-bromosuccinimide dissolved in pyridine, dioxane, or other suitable solvents. At the conclusion of the desired oxidation reaction the excess oxidant is generally destroyed by addition of methyl alcohol, ethyl alcohol, and the like, for the chromic acid oxidant, or a bisulfite for N-bromoacetamide, N-bromosuccinimide and other N-halo acyl amides and imides.

The thus obtained compounds of Formula III are recovered from the reaction mixture and purified by conventional methods, such as, for example, those described above for the recovery and purification of the compounds of Formula II.

PART B

The compounds of Formulas $B_1$ and $B_2$ are prepared according to the following reaction scheme:

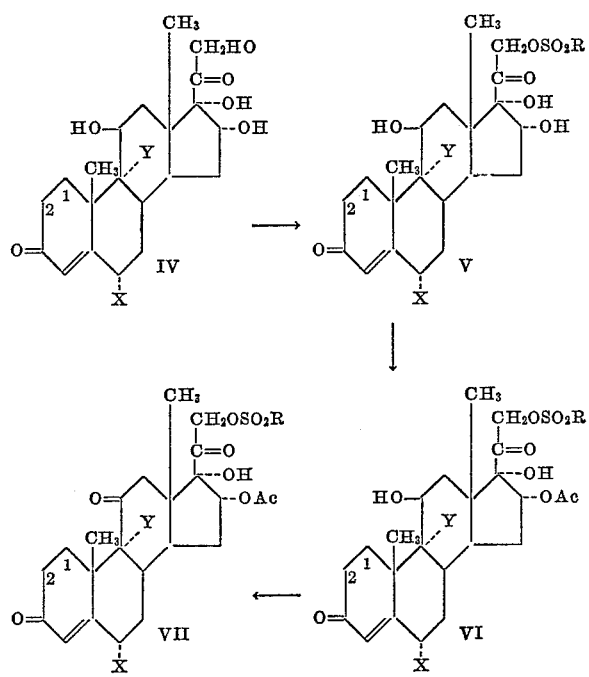

wherein X, Y, and R have the same meaning as previously given and Ac represents the acyl radical of an organic carboxylic acid, preferably a hydrocarbon carboxylic acid containing from 1 to 12 carbon atoms, inclusive.

The process comprises treating the compounds of Formula IV, such as 9α-fluoro-11β,16α,17α,21-tetrahydroxy-1,4-pregnadiene-3,20-dione, according to the procedure described above for the conversion of the compounds of Formula I to the compounds of Formula II, to obtain the compounds of Formula V, such as 9α-fluoro-11β,16α,17α,21 - tetrahydroxy-1,4-pregnadiene-3,20-dione 21-methanesulfonate. The compounds of Formula V are recovered from the reaction mixture and purified by conventional methods, such as, for example, those described above for the recovery and purification of the compounds of Formula II.

The thus obtained compounds of Formula V are then converted to the compounds of Formula VI by reaction with an acylating agent. Suitable acylating agents are organic carboxylic acids, preferably hydrocarbon carboxylic acids containing from 1 to 12 carbon atoms, inclusive, or the anhydrides or acid halides thereof, for example, a saturated straight chain aliphatic acid, e.g., formic, acetic, propionic, butyric, valeric, hexanoic, lauric, a saturated branched-chain aliphatic acid, e.g., trimethylacetic, isobutyric, isovaleric, tertiary butylacetic, a cycloaliphatic saturated acid, e.g., β-cyclopentylpropionic, cyclohexane-carboxylic, cyclohexylacetic, an alkaryl acid, e.g., benzoic, phenylacetic, β-phenylpropionic, o-, m-, p-toluic, a saturated dibasic acid (which can be converted into water soluble, e.g., sodium salts), e.g., succinic, adipic, a mono-basic unsaturated acid, e.g., acrylic, crotonic, undecylenic, propiolic, undecolic, cinnamic, dibasic unsaturated acids (which can be converted into water soluble, e.g., sodium salts), e.g., maleic and citraconic, and the like, or the acid anhydrides and acid halides thereof can be used to acylate the compounds of Formula V to convert them into the compounds of Formula VI, such as 9α-fluoro-11β,16α,17α,21-tetrahydroxy-1,4-pregnadiene-3,20-dione 16-acetate 21-methanesulfonate. The compounds of Formula VI are recovered from the reaction mixture and purified by conventional methods, such as, for example, those described above for the recovery and purification of the compounds of Formula II.

The conversion of the compounds of Formula V to the compounds of Formula VI is carried out using the acylating agent as solvent or in the presence of a suitable inert solvent, such as, benzene, xylene, dioxane, methylene chloride, or the like, particularly when the acylating agent is a solid and frequently in the presence of a strong acid, such as p-toluenesulfonic acid, or an amine, preferably pyridine. Completion of the reaction can take from a few minutes to 24 hours depending on the temperature and solvent. If the acylating agent is the free acid, the reaction is preferably carried out in the presence of an esterification catalyst, for example, p-toluenesulfonyl chloride, trifluoroacetic anhydride, p-toluenesulfonic acid, trifluoroacetic acid, sulfuric acid and the like.

The thus obtained compounds of Formula VI can then be converted to the compounds of Formula VII, such as 9α-fluoro-16α,17α,21-trihydroxy-1,4-pregnadiene - 3,11,20-trione 16-acetate 21-methanesulfonate, according to the procedures described above for the conversion of the compounds of Formula II to the compounds of Formula III. The thus obtained compounds of Formula VII are recovered from the reaction mixture and purified by conventional methods, such as, e.g., those described above for the recovery and purification of compounds of Formula II.

PART C

The compounds of Formula C are prepared according to the following reaction scheme:

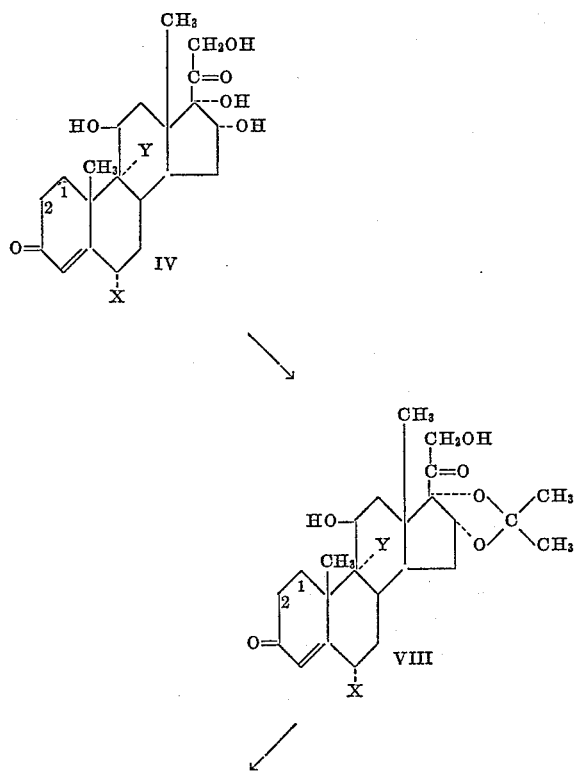

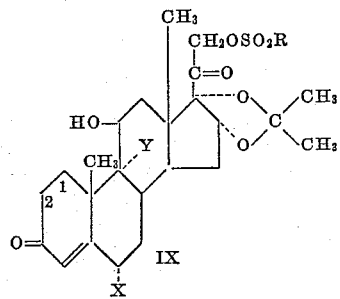

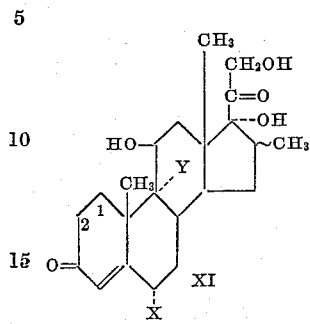

PART D

The compounds of Formula D are prepared according to the following reaction scheme:

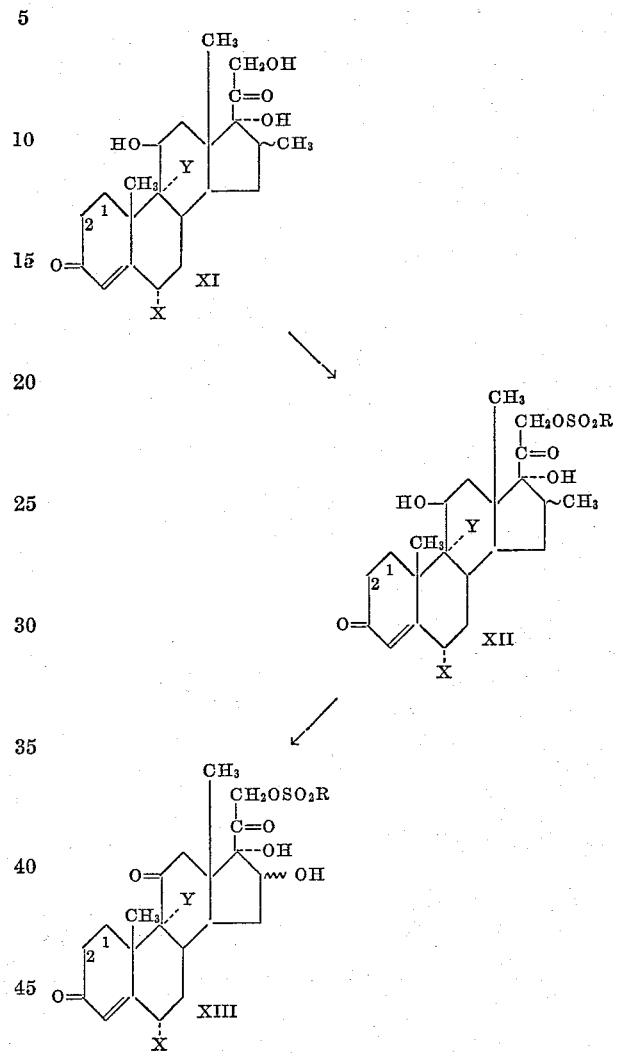

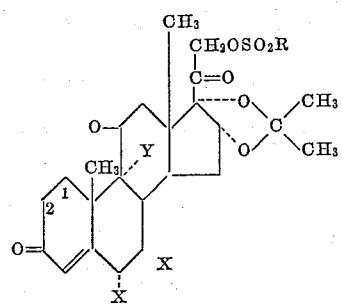

wherein R, X, and Y have the same meaning as previously given.

The process comprises reacting the compounds of Formula IV, such as 9α-fluoro-11β,16α,17α,21-tetrahydroxy-1,4-pregnadiene-3,20-dione with acetone (either alone or in a suitable solvent) in the presence of an acid catalyst, such as perchloric acid, p-toluene-sulfonic acid, hydrochloric acid, or the like, followed by neutralization of the acid, to obtain the compounds of Formula VIII, such as 9α-fluoro-11β,16α,17α,21-tetrahydroxy-1,4 - pregnadiene-3,20-dione 16,17-acetonide. The thus obtained compounds of Formula VIII can be recovered from the reaction mixture and purified by conventional methods, such as, for example, those described above for the recovery and purification of the compounds of Formula II.

The thus obtained compounds of Formula VIII are then converted to the compounds of Formula IX, such as 9α-fluoro-11β,16α,17α,21 - tetrahydroxy - 1,4 - pregnadiene-3,20-dione 16,17-acetonide 21-methanesulfonate, according to the procedures described above for the conversion of the compounds of Formula I to the compounds of Formula II. The thus obtained compounds of Formula IX are recovered from the reaction mixture and purified by conventional methods, such as, for example, those described above for the recovery and purification of the compounds of Formula II.

The thus obtained compounds of Formula IX are converted to the compounds of Formula X, such as 9α-fluoro - 16α,17α,21 - trihydroxy - 1,4 - pregnadiene-3,11,20-trione 16,17-acetonide 21-methanesulfonate, according to the procedures described above for the conversion of the compounds of Formula II to the compounds of Formula III. The thus obtained compounds of Formula X are recovered from the reaction mixture and purified by conventional methods, such as, for example, those described above for the recovery and purification for the compounds of Formula II.

wherein R, X, and Y have the same meaning as previously given.

The process comprises converting the compounds of Formula XI, such as 16β-methyl- and 16α-methyl-9α-fluoro-11β,17α,21 - trihydroxy - 1,4 - pregnadiene-3,20-dione to the compounds of Formula XII, such as 16β-methyl- and 16α-methyl-9α-fluoro-11β,17α,21-trihydroxy-1,4-pregnadiene-3,20-dione 21-methanesulfonate, according to the procedures described above for the conversion of the compounds of Formula I to the compounds of Formula II. The thus obtained compounds of Formula XII are recovered from the reaction mixture and purified by conventional methods, such as, for example, those described above for the recovery and purification of the compounds of Formula II.

The thus obtained compounds of Formula XII are then converted to the compounds of Formula XIII, such as 16β-methyl- and 16α-methyl-9α-fluoro-17α,21-dihydroxy-1,4 - pregnadiene - 3,11,20-trione 21-methanesulfonate, according to the procedures described above for the conversion of the compounds of Formula II to the compounds of Formula III. The thus obtained compounds of Formula XIII are recovered from the reaction mixture and purified by conventional methods, such as, for example, those described for the recovery and purification of the compounds of Formula II.

PART E

The compounds of Formula E are prepared according to the following reaction scheme:

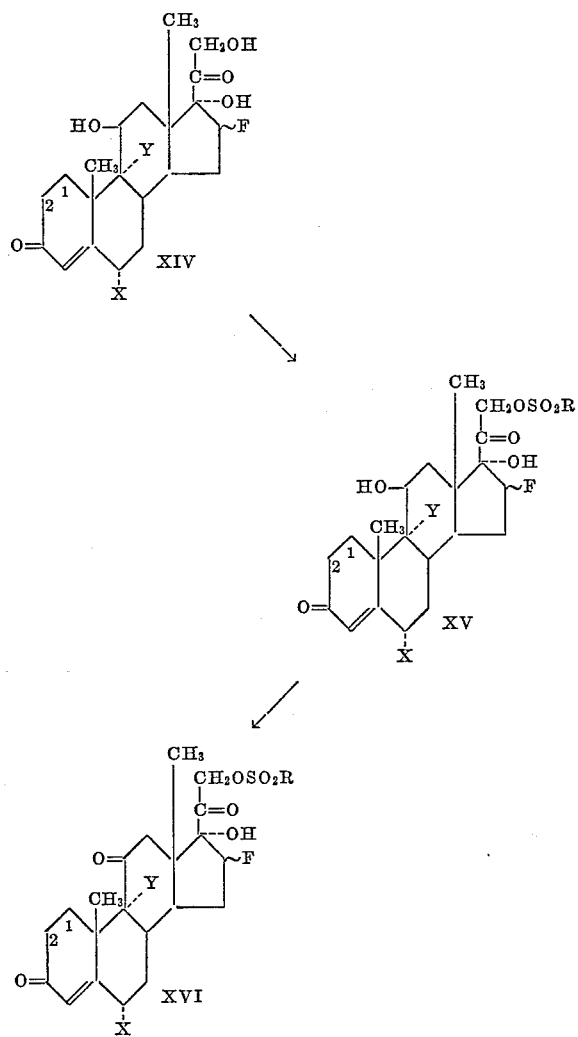

wherein R, X, and Y have the same meaning as previously given.

The process comprises converting the compounds of Formula XIV, such as 6α-methyl-9α,16β-difluoro- and 6α - methyl - 9α,16α - difluoro - 11β,17α,21 - trihydroxy-1,4-pregnadiene-3,20-dione to the compounds of Formula XV, such as 6α-methyl-9α,16β-difluoro- and 6α-methyl-9α,16α - difluoro - 11β,17α,21 - trihydroxy - 1,4 - pregnadiene-3,20-dione 21-methanesulfonate, according to the procedures described above for the conversion of the compounds of Formula I to the compounds of Formula II. The thus obtained compounds of Formula XV are recovered from the reaction mixture and purified by conventional methods, such as, for example, those described above for the recovery and purification of the compounds of Formula II.

The thus obtained compounds of Formula XV are then converted to the compounds of Formula XVI, such as 6α - methyl - 9α,16β - difluoro- and 6α - methyl - 9α,16α-difluoro - 17α,21 - dihydroxy - 1,4 - pregnadiene - 3,11,20-trione 21-methanesulfonate, according to the procedures described above for the conversion of the compounds of Formula II to the compounds of Formula III. The thus obtained compounds of Formula XVI are recovered from the reaction mixture and purified by conventional methods, such as, for example, those described above for the recovery and purification of the compounds of Formula II.

The following preparations and examples are illustrative of the products and processes of this invention.

In the examples which follow, the Roman numerals following the names of the compounds are used to indicate the relation of the compounds to the reaction schemes described above.

PREPARATIONS

Starting materials for the compounds of the formula

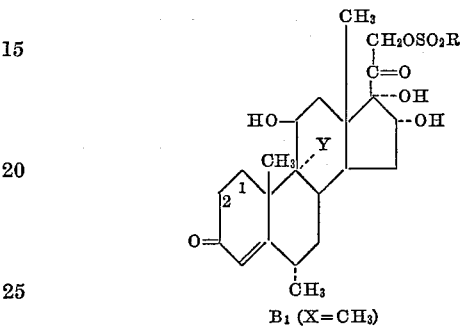

B₁ (X=CH₃)

wherein R and Y have the same meaning as previously given:

PREPARATION 1B₁

*3,20-Disemicarbazone of 6α-Methylhydrocortisone Acetate*

A solution was prepared containing 1.65 g. of semicarbazide hydrochloride in 10 ml. of water. This solution was added to a solution of 1 g. of 6α-methylhydrocortisone acetate [Spero et al., J. Am. Chem. Soc. 78, 6213 (1956)] in 1.2 ml. of pyridine and 40 ml. of methanol. This mixture was refluxed for a period of 18 hours and thereupon concentrated to 20 ml. and poured into 500 ml. of ice cold water. The reaction mixture was then kept at 0° C. for 6 hours, and thereafter filtered. The precipitate was washed with ice water and thereupon dried. The colorless crystals, 3,20-disemicarbazone of 6α-methylhydrocortisone 21-acetate, 1.216 g., had a melting point of over 300° C. and a rotation [α]$_D$ of +173 degrees in dioxane.

*Analysis.*—Calcd. for $C_{26}H_{40}O_6N_6$: C, 58.63; H, 7.57. Found: C, 58.40; H, 7.46.

PREPARATION 2B₁

*6α-Methyl-11β,21-Dihydroxy-4,16-Pregnadiene-3,20-Dione 21-Acetate*

A solution was prepared containing in 20 ml. of glacial acetic acid and 1 ml. of acetic anhydride, 1 g. of the 6α-methylhydrocortisone acetate 3,20-disemicarbazone, prepared in Preparation 1B₁. This mixture was refluxed in a nitrogen atmosphere for a period of 1 hour. The reaction mixture was thereupon concentrated in vacuo to approximately 12 ml. and thereupon treated with 6 ml. of pyruvic acid. The reaction mixture was then kept at room temperature for a period of 40 hours. Thereafter the mixture was heated for 2 hours at 60° C., allowed to cool and diluted with 600 ml. of water. The aqueous mixture was thereupon extracted 3 times with 400 ml. portions of chloroform, the chloroform extracts were washed twice with 100 ml. portions of 5% sodium carbonate solution and 3 times with 100 ml. portions of water. The thus washed and combined chloroform extracts were dried over anhydrous sodium sulfate and evaporated to dryness. The crude residue containing the 6α - methyl - 11β,21 - dihydroxy - 4,16 - pregnadiene-3,20-dione 21-acetate was then chromatographed over 70 g. of aluminum oxide as shown in Table I, taking fractions of 60 ml. each:

TABLE I

| Fraction No. | Solvent | Weight of residue in milligrams |
|---|---|---|
| 1–4 | benzene | |
| 5–7 | benzene: ether 9:1 | |
| 8–10 | benzene: ether 8:2 | |
| 11 | benzene: ether 1:1 | |
| 12 | do | 3 |
| 13 | do | 12 |
| 14 | ether | 51 |
| 15 | do | 40 |
| 16 | do | 15 |
| 17 | do | 6 |
| 18 | do | 4 |
| 19 | ether: methylene chloride 9:1 | 1 |
| 20 | do | 1 |
| 21 | ether: methylene chloride 8:2 | |
| 22 | ether: methylene chloride 1:1 | |
| 23–24 | do | |
| 25–28 | methylene chloride | |
| 29–30 | methanol | |

Fractions 12 through 20, inclusive, were combined, crystallized and recrystallized from benzene-commercial hexanes to give a total amount of 122 mg. of 6α-methyl-11β,21-dihydroxy-4,16-pregnadiene-3,20-dione 21-acetate, having one melting point at approximately 115° C. and a second melting point at 152 to 154° C. and rotation $[\alpha]_D$ of 177 degrees in chloroform.

*Analysis.*—Calcd. for $C_{24}H_{32}O_5$: C, 71.97; H, 8.05. Found: C, 70.99; H, 8.07.

PREPARATION 3B₁

*6α-Methyl-11β,16α,17α,21-Tetrahydroxy-4-Pregnene-3,20-Dione*

A reaction mixture containing 90 mg. of 6α-methyl-11β,21-dihydroxy-4,16-pregnadiene-3,20-dione 21-acetate, 65 mg. of osmium tetroxide in 2.5 ml. of benzene and 0.12 ml. of pyridine was allowed to stand at room temperature for a period of 95 hours. Thereafter a solution of 0.7 g. of anhydrous sodium sulfite and 0.7 g. of potassium bicarbonate, dissolved in 65 ml. of water, was added to the mixture while stirring. The stirring was continued for a period of 16 hours. The mixture was then diluted with 10 ml. of chloroform and filtered. The residue on the filter was washed with a total of 100 ml. of hot chloroform. The chloroform washings and the filtrate were combined, washed with saturated saline solution and the chloroform layers separated. The chloroform layer was then dried over anhydrous sodium sulfate and evaporated to dryness. The residue weighing approximately 100 mg. was recrystallized twice from acetone-ether to give 39 mg. of 6α-methyl-11β,16α,17α,21-tetrahydroxy-4-pregnene-3,20-dione of melting point 215 to 217° C. and rotation $[\alpha]_D$ of +68° in dioxane.

*Analysis.*—Calcd. for $C_{22}H_{32}O_6$: C, 67.32; H, 8.22. Found: C, 66.76; H, 8.37.

PREPARATION 4B₁

*6α-Methyl-11β,16α,17α-21-Tetrahydroxy-1,4-Pregnadiene-3,20-Dione*

Six 100 ml. portions of a medium in 250 ml. Erlenmeyer flasks containing 1% glucose, 2% corn steep liquor (60% solids) and tap water is adjusted to a pH of 5.9. This medium is sterilized for 45 minutes at 15 p.s.i. pressure and inoculated with a 1 to 2 day growth of *Septomyxa affinis* ATCC 6737. The Erlenmeyer flasks are shaken at room temperature, about 24° C., for a period of 3 days. At the end of this period, this 600 ml. volume is used as an inoculum for 10 l. of the same glucose-corn steep liquor medium which in addition contains 10 ml. of an antifoam (a mixture of lard oil and 1% octadecanol). The fermenter is placed into the water bath, adjusted to 28° C., and the contents stirred (300 r.p.m.) and aerated (0.5 l. air/10 l. beer/minute). After 17 hours of incubation, when a good growth develops and the acidity rises to pH 6.7, 2 g. of 6α-methyl-11β,16α,17α,21-tetrahydroxy-4-pregnene-3,20-dione plus 1 g. of 3-keto-bisnor-4-cholen-22-al, dissolved in 115 ml. of dimethylformamide, is added and the incubation carried out at the same temperature and aeration for 24 hours. The mycelium is filtered off and the steroidal material is extracted with methylene chloride, the methylene chloride extracts evaporated to dryness, and the resulting residue chromatographed over a Florisil column. The column is packed with 200 g. of Florisil and is developed with five 400 ml. fractions of methylene chloride, followed by increasing amounts of acetone in commercial hexanes, and finally with methanol. Those fractions which move more slowly from the origin on papergram (benzene-formamide) than the starting material are combined and recrystallized twice from acetone to give 1-dehydro-6α-methyl-16α-hydroxyhydrocortisone (6α-methyl-11β,16α,17α,21-tetrahydroxy-1,4-pregnadiene-3,20-dione).

In the same manner shown in Preparation 4B₁ by fermentation with microorganisms of the genera Corynebacterium, Didymella, Calonectria, Alternaria, Colletotrichum, Cylindrocarpon, Proaminobacter, Ophiobolus, Septomyxa, Fusarium, Listeria, Erysipelothrix, Mycobacterium, Streptomyces (e.g., *lavendulae*), Pseudomonas (e.g., *testosteroni*), Bacillus (especially *B. sphericus*), Nocardia, Micromonospora and members of the family Tuberculariaceae, 6α-methyl-11β,16α,17α,21-tetrahydroxy-4-pregnene-3,20-dione is converted to 6α-methyl-11β,16α,17α,21-tetrahydroxy-1,4-pregnadiene-3,20-dione.

PREPARATION 5B₁

*6α-Methyl-11β,16α,17α,21-Tetrahydroxy-4-Pregnene-3,20-Dione 16,21-Diacetate (6α-Methyl-16α-Hydroxyhydrocortisone 16,21-Diacetate)*

A mixture of 0.2 g. of 6α-methyl-11β,16α,17α,21-tetrahydroxy-4-pregnene-3,20-dione, 0.1 ml. of acetic anhydride in 1 ml. of pyridine is allowed to stand for a period of 4 hours. Thereafter the mixture is poured into 15 ml. of water, the aqueous mixture is cooled to 0 to 5° C. and filtered. The thus-collected precipitate is washed repeatedly with water and finally recrystallized from methanol or ethyl acetate-commercial hexanes to give 6α-methyl-11β,16α,17α,21-tetrahydroxy-4-pregnene-3,20-dione 16,21-diacetate.

PREPARATION 6B₁

*6α-Methyl-16α,17α,21-Trihydroxy-4,9(11)-Pregnadiene-3,20-Dione 16,21-Diacetate*

A mixture of 1 g. of 6α-methyl-11β,16α,17α,21-tetrahydroxy-4-pregnene-3,20-dione 16,21-diacetate, 650 mg. of N-bromoacetamide and 6 ml. of pyridine is stirred in the dark for a period of 30 minutes. The mixture is cooled in an ice-water bath and a stream of sulfur dioxide is directed onto the surface of the stirred mixture until a negative potassium iodide-starch test is obtained. 50 ml. of water is then added to the mixture and the mixture is maintained at about 5° C. for 30 minutes. The precipitated white solid is filtered, washed with water, and dried under vacuum. After crystallization from acetone-commercial hexanes or ethyl acetate-commercial hexanes, there is thus-obtained 6α-methyl-16α,17α,21-trihydroxy-4,9(11)-pregnadiene-3,20-dione 16,21-diacetate.

PREPARATION 7B₁

*6α-Methyl-9α-Bromo-11β,16α,17α,21-Tetrahydroxy-4-Pregnene-3,20-Dione 16,21-Diacetate*

A solution is prepared containing 0.5 g. of 6α-methyl-16α,17α,21-trihydroxy-4,9(11)-pregnadiene-3,20-dione 16,21-diacetate in 20 ml. of methylene chloride and there is added a solution of 1 ml. of 71% perchloric acid in 10 ml. of water and 200 mg. of N-bromoacetamide in 50 ml. of tertiary butyl alcohol. The solution is maintained at room temperature for 15 minutes and then mixed with a solution of 0.3 g. of sodium sulfite in 12 ml. of water. The mixture is distilled at reduced pressure until the residual solution becomes cloudy. The product is then precipitated by the addition of 100 ml. of a mixture of ice-water. The white crystalline precipitate is filtered, washed with water, and then dried and recrystallized from a mixture of acetone and commercial hexanes to give 6α-methyl-9α - bromo - 11β,16α,17α,21 - tetrahydroxy - 4 - pregnene-3,20-dione 16,21-diacetate.

PREPARATION 8B₁

*6α-Methyl-9β,11β-Oxido-16α,17α,21-Trihydroxy-4-Pregnene-3,20-Dione 16,21-Diacetate*

A mixture of 0.45 g. of 6α-methyl-9α-bromo-11β,16α, 17α,21-tetrahydroxy-4-pregnene-3,20-dione 16,21-diacetate, 0.45 g. of anhydrous potassium acetate and 20 ml. of acetone is heated at its refluxing temperature for a period of 5 hours. The mixture is then cooled and poured into water and extracted with methylene chloride. The methylene chloride extract is dried and poured over a column of 25 g. of Florisil synthetic magnesium silicate. The column is developed with commercial hexanes containing increasing portions of acetone. The fractions which move more rapidly from the origin on papergram (benzene-formamide) than the starting material are combined and recrystallized from acetone-commercial hexanes or ethyl acetate-commercial hexanes to give 6α-methyl-9β,11β-oxido - 16α,17α,21 - trihydroxy-4-pregnene-3,20-dione 16,21-diacetate.

PREPARATION 9B₁

*6α-Methyl-9α-Fluoro-11β16α,17α,21-Tetrahydroxy-4-Pregnene-3,20-Dione 16,21-Diacetate*

To approximately 1.3 g. of hydrogen fluoride contained in a polyethylene bottle and maintained at −60° C. there is added 2.3 ml. of tetrahydrofuran and then a solution of 500 mg. of 6α-methyl-9β,11β-oxido-16α,17α,21-trihydroxy-4-pregnene-3,20-dione 16,21-diacetate in 2 ml. of methylene chloride. The steroid solution is rinsed in with an addition of 1 ml. of methylene chloride. The light-red colored solution is then kept at approximately −30° C. for 1 hour and at −10° C. for 2 hours. At the end of this period it is mixed cautiously with an excess of cold sodium bicarbonate solution and the organic material is extracted with additional methylene chloride. The combined extracts are washed with water, dried over anhydrous sodium sulfate and concentrated to approximately 35 ml. The solution is chromatographed over 130 g. of synthetic magnesium silicate (Florisil). The column is developed with 200 ml. portions of commercial hexanes containing increasing proportions of acetone and those fractions are combined which move more slowly from the origin than the starting material on papergram (benzene-formamide). There is thus eluted 6α-methyl-9α-fluoro-11β,16α,17α,21 - tetrahydroxy-4-pregnene-3,20-dione 16,21-diacetate, which is freed of solvent by evaporation of the eluate fractions, and recrystallized from acetone and commercial hexanes.

PREPARATION 10B₁

*6α-Methyl - 9α - Fluoro-11β,16α,17α,21-Tetrahydroxy-4-Pregnene-3,20-Dione (6α-Methyl-9α-Fluoro - 16α - Hydrocortisone)*

A solution is prepared containing 0.5 g. of 6α-methyl-9α - fluoro-11β,16α,17α,21-tetrahydroxy-4-pregnene-3-20-dione 16,21-diacetate in 10 ml. of methanol and 3 ml. of tetrahydrofuran. To this solution there is added 1.5 ml. of 10% aqueous potassium carbonate solution. The reaction mixture is stirred in a nitrogen atmosphere for a period of 45 minutes and thereupon 1 ml. of acetic acid is added. 20 ml. of water is then added and the solvent distilled under vacuum. The aqueous mixture is thereupon refrigerated to about 5° C. and after being kept at this temperature for 2 hours is filtered and the precipitate thus obtained is washed with water and recrystallized twice from acetone-commercial hexanes to give 6α-methyl-9α-fluoro-11β,16α,17α,21-tetrahydroxy-4-pregnene - 3,20-dione.

PREPARATION 11B₁

*6α-Methyl-9α-Fluoro-11β,16α,17α,21 - Tetrahydroxy - 1, 4-Pregnadiene-3,20-Dione (1-Dehydro-6α-Methyl-9α-Fluoro-16α-Hydroxyhydrocortisone)*

Three 100 ml. portions of a medium, in 250 ml. Erlenmeyer flasks, containing 1% glucose, 2% corn steep liquor (60% solids) and tap water, are adjusted to a pH of 4.9. This medium is sterilized for 45 minutes at 15 p.s.i. pressure and inoculated with a 1 to 2 day growth of *Septomyxa affinis* A.T.C.C. 6737. The Erlenmeyer flasks are shaken at room temperature (about 26 to 28° C.) for a period of 3 days. At the end of this period this 300 ml. volume is used as an inoculum for 5 l. of the same glucose-corn steep liquor medium which in addition contained 5 ml. of an anti-foam compound (a mixture of lard oil and octadecanol). The fermenter is placed into the water bath, adjusted to 28° C. and the contents stirred (300 r.p.m.) and aerated (0.3 l. air/minute to 5 l. of beer). After 20 hours of incubation, when a good growth has been developed, 1 g. of 6α-methyl-9α-fluoro-11β,16α, 17α,21 - tetrahydroxy-4-pregnene-3-20-dione plus one-half g. of 3-ketobisnor-4-cholen-22-al, dissolved in 16 ml. of dimethylformamide, is added and the incubation carried out at the same temperature (28° C.) and aeration for a period of 72 hours (final pH 8.3). The mycelium is filtered and extracted with three 200 ml. portions of methylene chloride and thereupon the extracts of the beer and acetone are combined, dried over anhydrous sodium sulfate, evaporated and the resulting residue is recrystallized three times from acetone-commercial hexanes to give 6α-methyl-9α-fluorol-β,16α,17α,21-tetrahydroxy-1,4-pregnadiene-3,20-dione (1-dehydro-6α-methyl-9α-fluoro-16α-hydroxyhydrocortisone).

In the same manner shown in Preparation 12B₁ using other species of genus Septomyxa under fermentation conditions known in the art, preferably in the presence of a promoting agent such as 3-ketobisnor-4-cholen-22-al, progesterone, 11β,21-dihydroxy-1,4,17(20)-pregnatrien-3-one, 3-ketobisnor-4-cholenic acid and the like, produces from 6-methyl-9α-flouro-11β,16α,17α,21-tetrahydroxy-4-pregnene-3,20-dione the 6-methyl-9α-fluoro-11β,16α,17α, 21-tetrahydroxy-1,4-pregnadiene-3,20-dione. Instead of a species of the genus Septomyxa, species of other genera such as Corynebacterium, Didymella, Bacillus, Calonectria, Alternaria, Colletotrichum, Cyclindrocarpon, Proaminobacter, Ophiobolus, Fusarium, Listeria, Erysipelothrix, Mycobacterium, Leptosphaeria, Cucurbitaria, Streptomyces, Nocardia, Pseudomonas, Micromonospora and fungi of the family Tuberculariaceae can be used to introduce a Δ¹ bond into 6-methyl-9α-fluoro-11β,16α,17α, 21-tetrahydroxy-4-pregnene-3,20-dione.

Starting materials for the compounds of the formula

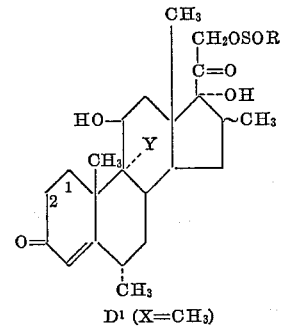

D¹ (X=CH₃)

wherein R and Y have the same meaning as previously given:

PREPARATION 1D¹a

*11α-Hydroxy-16α-Methylprogesterone*

To 16.6 l. of a fermentation medium consisting of 1.2% corn steep solids and 2% Cerelose glucose and adjusted to a pH of 4.8 to 5.0 was added an inoculum of *Rhizopus nigricans* (A.T.C.C. 6227b) and the medium incubated for 24 hours at a temperature of 28° C. with a rate of aeration of 5% air by volume per minute. To this medium was added 5 g. of 16α-methylprogesterone [Marker et al., J. Am. Chem. Soc., 64, 1280 (1942)] dissolved in 35 ml. of acetone. After an additional 24 hours of incubation under the same conditions, the mycelium was filtered, washed twice, each time with a volume of acetone approximately equal to the volume of the mycelium and then twice with similar portions of methylene chloride. The combined extracts were added to the beer filtrate and the whole was extracted successively with 2 one-half by volume portions of methylene chloride and then with 2 one-fourth by volume portions of methylene chloride. These extracts were washed with 2 one-tenth by volume portions of 2% aqueous sodium bicarbonate and then with 2 one-tenth by volume portions of water. The methylene chloride extracts were then dried and the solvent removed by distillation. The residue was dissolved in 250 ml. of methylene chloride and chromatographed over a 500 g. column of magnesium silicate (Florisil). The column was developed with 5 l. of methylene chloride, 5 l. of commercial hexanes plus 5% acetone, 10 l. of hexanes plus 10%, 5 l. of hexanes plus 25% acetone and 2 l. of acetone. The last 7 l. of hexanes plus 10% acetone, the hexanes plus 25% acetone and the first acetone eluates were combined, freed of solvent, redissolved in methylene chloride and rechromatographed over 400 g. of magnesium silicate. The column was developed with 8 l. of hexanes plus 10% acetone, 8 l. of hexanes plus 15% acetone, 4 l. of hexanes plus 20% acetone, 4 l. of hexanes plus 25% acetone and 2,400 ml. of acetone, in that order. The combined residues from the last 4 l. of hexanes plus 10% acetone and the first 1,600 ml. of hexanes plus 15% acetone eluates were recrystallized twice from ethyl acetate to give 11α-hydroxy-16α-methylprogesterone melting at 161 to 163° C., having an $[\alpha]_D$ of +149° (chloroform) and the analysis below.

*Analysis.*—Calcd. for $C_{22}H_{32}O_3$: C, 76.70; H, 9.36. Found: C, 76.46; H, 9.63.

PREPARATION 1D¹b

*11α-Hydroxy-16β-Methylprogesterone*

To 16.6 l. of a fermentation medium consisting of 1.2% corn steep solids and 2% Cerelose glucose and adjusted to a pH of 4.8 to 5.0 is added an inoculum of *Rhizopus nigricans* (A.T.C.C. 6227b) and the medium is incubated for 24 hours at a temperature of 28° C. with a rate of aeration of 5% air by volume per minute. To this medium is added 5 g. of 16β-methylprogesterone dissolved in 35 ml. of acetone. After an additional 24 hours of incubation under the same conditions, the mycelium is filtered, washed twice, each time with a volume of acetone approximately equal to the volume of the mycelium and then twice with similar portions of methylene chloride. The combined extracts are added to the beer filtrate and the whole is extracted successively with 2 one-half by volume portions of methylene chloride and then with 2 one-fourth by volume portions of methylene chloride. These extracts are washed with 2 one-tenth by volume portions of 2% aqueous sodium bicarbonate and then with 2 one-tenth by volume portions of water. The methylene chloride extracts are then dried and the solvent removed by distillation. The residue is dissolved in 250 ml. of methylene chloride and chromatographed over a 500 g. column of magnesium silicate (Florisil). The column is developed with 5 l. of methylene chloride, 5 l. of hexanes (Skellysolve B) plus 5% acetone, 10 l. of hexanes plus 10% acetone, 5 l. of hexanes plus 25% acetone and 2 l. of acetone. The last 7 l. of hexanes plus 10% acetone, the hexanes plus 25% acetone and the first acetone eluates are combined, freed of solvent, redissolved in methylene chloride and rechromatographed over 400 g. of magnesium silicate. The column is developed with 8 l. of hexanes plus 10% acetone, 8 l. of hexanes plus 15% acetone, 4 l. of hexanes plus 20% acetone, 4 l. of hexanes plus 25% acetone and 2,400 ml. of acetone, in that order. Those fractions which on papergram (benzene-formamide) moved from the origin more slowly than the starting material are combined and crystallized from ethyl acetate-commercial hexanes to yield 11α-hydroxy-16β-methylprogesterone.

PREPARATION 2D¹

*11α-Hydroxy-16-Methylprogesterone 3,20-Bis-(Ethylene Ketal)*

A solution of 10 g. of 11α-hydroxy-16α-methylprogesterone, 1 g. of para-toluenesulfonic acid in 1000 ml. of benzene and 150 ml. of ethylene glycol is refluxed for 6 hours using a water trap to remove the water formed in the reaction. The solution is cooled, water is added and the aqueous layer is separated and washed with ether and the ether extracts added to the organic layer. The combined organic layers are successively washed with 5% sodium bicarbonate solution, saturated sodium chloride solution, water and then dried over sodium sulfate. The solvents are removed by distillation and the thus-obtained residue is recrystallized from methanol to give 11α-hydroxy-16α-methylprogesterone 3,20-bis-(ethylene ketal).

In the same manner, substituting 11α-hydroxy-16β-methylprogesterone for 11α-hydroxy-16α-methylprogesterone is productive of 11α-hydroxy-16β-methylprogesterone-3,20-bis-(ethylene ketal).

Esterification according to the method of Preparation 16D¹, below, gives 11α-hydroxy-16β-methyl and 11α-hydroxy-16α-methylprogesterone-3,20-bis-(ethylene ketal) 11-acetate.

PREPARATION 3D¹

*11α-Hydroxy-16-Methylprogesterone 3,20-Bis-(Ethylene Ketal) 11-Acetate*

In the same manner as shown in Preparation 2D¹, 6 g. of 11α-hydroxy-16α-methylprogesterone 11-acetate, dissolved in 600 ml. of benzene and 90 ml. of ethylene glycol, is heated to reflux in the presence of 600 mg. of para-toluent-sulfonic acid for a period of 18 hours to give 11α-hydroxy-16α-methylprogesterone 3,20-bis-(ethylene ketal) 11-acetate.

In the same manner, substituting 11α-hydroxy-16β-methylprogesterone 11-acetate for 11α-hydroxy-16α-methylprogesterone 11-acetate is productive of 11α-hydroxy-16β-methylprogesterone 3,20-bis-(ethylene ketal) 11-acetate.

PREPARATION 4D¹

*5α,6α-Epoxy-11α-Hydroxy-16-Methylpregnane-3,20-Dione 3,20-Bis-(Ethylene Ketal) 11-Acetate*

To a suspension of 8.8 g. of anhydrous sodium acetate in 88 ml. of 40% peracetic acid in an ice bath is added a solution of 44.2 g. of 11α-hydroxy-16α-methylprogesterone 3,20-bis-(ethylene ketal) 11-acetate in 880 ml. of chloroform. The heterogeneous mixture is stirred vigorously for 2 hours at ice bath temperature. The mixture is diluted with 750 ml. of chloroform and the chloroform phase is separated, washed with 5% sodium bicarbonate, water, and evaporated to dryness under reduced pressure. The white solid residue is recrystallized from acetone to give 5α,6α-epoxy-11α-hydroxy-16α-methylpregnane-3,20-dione 3,20-bis-(ethylene ketal) 11-acetate.

In the same manner, substituting 11α-hydroxy-16β-methylprogesterone 3,20-bis-(ethylene ketal) 11-acetate for 11α-hydroxy-16α-methylprogesterone 3,20-bis-(ethylene ketal) 11-acetate is productive of 5α,6α-epoxy-11α-hydroxy-16β-methylpregnane-3,20-dione 3,20-bis-(ethylene ketal) 11-acetate.

PREPARATION 5D¹

*5α,6α-Epoxy-11α-Hydroxy-16-Methylpregnane-3,20-Dione 3,20-Bis-(ethylene ketal)*

In the same manner as shown in Preparation 4D¹, reacting 11α-hydroxy-16α-methylprogesterone 3,20-bis-(ethylene ketal) with peracetic acid and anhydrous sodium acetate in chloroform solution produces 5α,6α-epoxy-11α-hydroxy-16α - methylpregnane - 3,20-dione 3,20-bis-(ethylene ketal).

In the same manner, as shown in Preparation 4D¹, reacting 11α - hydroxy-16β-methylprogesterone 3,20-bis-(ethylene ketal) is productive of 5α,6α-epoxy-11α-hydroxy-16β-methylpregnane-3,20-dione 3,20-bis-(ethylene ketal).

PREPARATION 6D¹

*5α,11α-Dihydroxy-6β,16-Dimethylpregnane-3-20-Dione 3,20-bis-(Ethylene Ketal)*

To 5 ml. of 3 M ether solution of methyl magnesium bromide is added dropwise a solution of 476 mg. of 5α,6α-epoxy-11α-hydroxy-16α-methylpregnane-3,20-dione 3,20-bis-(ethylene ketal) 11-acetate in 20 ml. of distilled tetrahydrofuran. The reaction mixture is stirred and refluxed for 17 hours and is then cooled and 25 ml. of iced saturated ammonium chloride solution is added. After stirring for a few minutes the mixture is extracted with ether and the ether is washed with water, dried over anhydrous sodium sulfate and evaporated to dryness. The residue is crystallized from a mixture of acetone and commercial hexanes to give 5α,11α-dihydroxy-6β,16α-dimethylpregnane-3,20-dione 3,20-bis-(ethylene ketal).

In the same manner, substituting 5α,6α-epoxy-11α-hydroxy-16β-methylpregnane-3,20-dione 3,20-bis-(ethylene ketal) 11-acetate for 5α,6α-epoxy-11α-hydroxy-16α-methylpregnane-3,20-dione 3,20-bis-(ethylene ketal) 11-acetate is productive of 5α,11α-dihydroxy-6β,16β-dimethylpregnane-3,20-dione 3,20-bis-(ethylene ketal).

PREPARATION 7D¹

*5α,11α-Dihydroxy-6β,16-Dimethylpregnane-3-20-Dione 3,20-Bis-(Ethylene Ketal)*

In the same manner as shown in Preparation 6D¹, reacting 5α,6α-epoxy-11α-hydroxy - 16α - methylpregnane-3,20-dione 3,20-bis-(ethylene ketal) with methyl magnesium iodide in ether produces 5α,11α-dihydroxy-6β,16α-dimethylpregnane-3,20-dione 3,20-bis-(ethylene ketal).

In the same manner, substituting 5α,6α-epoxy-11α-hydroxy-16β-methylpregnane-3,20-dione 3,20-bis-(ethylene ketal) in the procedure of Preparation 6D¹ is productive of 5α,11α-dihydroxy-6β,16β-dimethylpregnane-3,20-dione 3,20-bis-(ethylene ketal).

PREPARATION 8D¹

*5α,11α-Dihydroxy-6β,16-Dimethylpregnane-3-20-Dione*

A solution of 459 mg. of 5α,11α-dihydroxy-6β,16α-dimethylpregnane-3,20-dione 3,20-bis-(ethylene ketal in 10 ml. of acetone and 1 ml. of N sulfuric acid is stored at room temperature overnight, diluted with 20 ml. of water and then refrigerated. There is obtained a crystalline precipitate of 5α,11α-dihydroxy-6β,16α-dimethylpregnane-3,20-dione.

In the same manner, substituting 5α,11α-dihydroxy-6β,16β-dimethylpregnane-3,20 - dione 3,20-bis-(ethylene ketal) for 5α,11α-dihydroxy-6β,16α-dimethylpregnane-3,20-dione 3,20-bis-(ethylene ketal) is productive of 5α,11α-dihydroxy-6β,16β-dimethylpregnane-3,20-dione.

PREPARATION 9D¹

*5α-Hydroxy-6β,16-Dimethylpregnane-3,11,20-Trione*

To a solution of 5 g. of sodium dichromate dihydrate in 100 ml. of glacial acetic acid is added 10 g. of 5α,11α-dihydroxy-6β,16α-dimethylpregnane-3,20-dione in 150 ml. of acetic acid and the mixture is stirred for one hour at room temperature. The solution is then cooled to between 0 and 5° C. and 1.5 l. of ice and water is added with vigorous stirring. When addition is complete, excess sodium sulfite is added and the solution is then maintained at between 0 and 5° C. overnight. The precipitated steroid is filtered and washed with water and then dried. There is thus obtained substantially pure 5α-hydroxy-6β,16α-dimethylpregnane-3,11,20-trione which can be further purified by recrystallization from acetone-commercial hexanes or ethyl acetate-commercial hexanes after decolorization with charcoal.

In the same manner, substituting 5α,11α1dihydroxy-6β,16β-dimethylpregnane-3,20-dione for 5α,11α-dihydroxy-6β,16β-dimethylpregnane-3,20-dione is productive of 5α-hydroxy-6β,16β-dimethylpregnane-3,11,20-trione.

PREPARATION 10D¹

*6α,16-Dimethyl-11-Ketoprogesterone*

To a stirred solution of 4.576 g. of 5α-hydroxy-6β,16α-dimethylpregnane-11,20-trione in 440 ml. of methanol in a nitrogen atmosphere is added a solution of 40 ml. of 0.1 N sodium hydroxide, similarly freed of air with nitrogen. The mixture is stirred under nitrogen for 16 hours and then made slightly acidic with glacial acetic acid. The solution is concentrated by distillation at reduced pressure to about 35 ml. There is thus obtained a precipitate of 6α,16α-dimethyl-11-ketoprogesterone which is filtered, washed with cold methanol, and dried.

In the same manner, substituting 5α-hydroxy-6β,16β-dimethylpregnane-3,11,20-trione for 5α-hydroxy-6β,16α-dimethylpregnane-3,11,20-trione is productive of 6α,16β-dimethyl-11-ketoprogesterone.

PREPARATION 11D¹

*6α,16-Dimethyl-3,11-Diketo-4,17(20)-Pregnadien-21-Oic Acid Methyl Ester*

A solution of 7.12 g. (0.02 mole) of 6α,16α-dimethyl-11-ketoprogesterone in 70 ml. of tertiary butyl alcohol is prepared by heating to 55–60° C. with stirring under a nitrogen atmosphere. While the temperature is held at this point 11.7 g. of ethyl oxalate is added. Thereafter 2.7 g. of sodium methoxide in methanol (commercial 25% solution) is added. Almost immediately the yellow precipitate of the sodium dienolate of 6α,16α-dimethyl-2,21-diethoxyoxalyl-11-ketoprogesterone begins to precipitate. The mixture is allowed to cool slowly to approximately 35° C. while stirring for 15 minutes.

A solution of 2.44 g. of anhydrous sodium acetate and 3 g. of glacial acetic acid in 160 ml. of methanol which has been previously cooled to 10° C. is then added and the mixture stirred until solution is achieved. The yellow solution is cooled to 0° and to this vigorously stirred solution is added dropwise a precooled (0° C.) solution of 9.6 g. of bromine in 96 ml. of methanol. Approximately 75 ml. of the bromine solution is added at a constant rate during 10 minutes. The rate of addition is then decreased and the remaining 21 ml. added during the following 10 minutes. After an additional 10 minute stirring period, the bromine color essentially disappears.

With continuous stirring and cooling a solution of 5.57 g. of sodium methoxide in methanol (commercial 25% solution) is added rapidly. A bright orange color develops which soon fades to yellow amber. The cooling bath is removed, the temperature raised to 24–30° C. and the solution stirred for 1.5 hours.

16 ml. of acetic acid and 3.2 g. of zinc dust is added and stirring is continued for 30 minutes. The excess zinc dust is removed by filtration and washed with 15 to 20 ml. of fresh methanol. The combined filtrates are concentrated at reduced pressure in a 60° water bath to approximately 200 ml. The concentrate is poured slowly with stirring into 750 ml. of ice and water. The mixture is refrigerated for 15 minutes and then filtered. The filter cake is washed with 100 ml. of cold water and dried at room temperature to give 3,11-diketo-6α,16α-dimethyl-4,17(20)-pregnadien-21-oic acid methyl ester.

A 1.5 g. portion of the crude material is dissolved in 50 ml. of benzene and poured onto a 75 g. magnesium silicate (Florisil) chromatographic column. The column is eluted with 750 ml. of hexanes (Skellysolve B) plus 2% acetone, 1200 ml. of hexanes plus 5% acetone, 300 ml. of hexanes plus 10% acetone, and 150 ml. of 100% acetone. The eluate is collected in 150 ml. fractions and evaporated. Those fractions showing ultraviolet absorption in the neighborhood of 225–235 mu and exhibiting ester absorption in the infrared spectrum are combined to yield 3,11 - diketo - 6α,16α-dimethyl-4,17(20)-pregnadien-21-oic acid methyl ester.

In the same manner, substituting 6α,16β-dimethyl-11-ketoprogesterone for 6α,16α-dimethyl-11-ketoprogesterone is productive of 3,11-diketo-6α,16β-dimethyl-4,17(20)-pregnadien-21-oic acid methyl ester.

PREPARATION 12D[1]

*3,11-Diketo-6α,16-Dimethyl-4,17(20)-Pregnadien-21-Oic Acid Methyl Ester 3-Pyrrolidyl Enamine*

A solution of 0.5 g. of 3,11-diketo-6α,16α-dimethyl-4,17(20)-pregnadien-21-oic acid methyl ester, 0.5 ml. of pyrrolodine, 40 ml. of benzene and 20 mg. of p-toluenesulfonic acid is heated under reflux for one hour. The solvent is distilled under vacuum. Trituration of the residue with methanol gives, as a yellow solid, the 3-pyrrolidine enamine of 3,11-diketo-6α,16α-dimethyl-4,17(20)-pregnadien-21-oic acid methyl ester.

In the same manner, substituting 3,11-diketo-6α,16β-dimethyl-4,17(20)-pregnadien-21-oic acid methyl ester for 3,11-diketo-6α,16α-dimethyl-4,17(20)-pregnadien-21-oic acid methyl ester is productive of the 3-pyrrolidyl enamine of 3,11-diketo-6α,16β-dimethyl-4,17(20)pregnadien-21-oic acid methyl ester.

PREPARATION 13D[1]

*3-Pyrrolidyl Enamine of 6α,16-Dimethyl-11β,21-Dihydroxy-4,17(20)-Pregnadien-3-One*

To a suspension of 1.1 g. of lithium aluminum hydride in 75 ml. of anhydrous ether is added 1.3 g. of the crude 3-pyrrolidyl enamine of 3,11-diketo-6α,16α-dimethyl-4,17(20)-pregnadien-21-oic acid methyl ester in 25 ml. of anhydrous ether. The reaction mixture is heated under reflux for one hour. The excess lithium aluminum hydride is destroyed by the addition of ethyl acetate. Water is added until a pasty mass of lithium salts is formed. The supernatant liquid is decanted and evaporated yielding a residue consisting essentially of the 3-pyrrolidyl enamine of 6α,16α-dimethyl-11β,21-dihydroxy-4,17(20)-pregnadien-3-one.

In the same manner, substituting the 3-pyrrolidyl enamine of 3,11-diketo-6α,16β-dimethyl-4,17(20)-pregnadien-21-oic acid methyl ester for the 3-pyrrolidyl enamine of 3,11 - diketo-6α,16α-dimethyl-4,17(20)-pregnadien-21-oic acid methyl ester is productive of the 3-pyrrolidyl enamine of 6α,16β-dimethyl-11β,21-dihydroxy-4,17(20)-pregnadien-3-one.

PREPARATION 14D[1]

*6α,16-Dimethyl-11β,21-Dihydroxy-4,17(20)-Pregnadien-3-One*

The residue from Preparation 13D[1], consisting essentially of the 3-pyrrolidyl enamine of 6α,16α-dimethyl-11β,21-dihydroxy-4,17(20)-pregnadien-3-one is dissolved in 20 ml. of methanol containing 2 ml. of 5% aqueous sodium hydroxide. After 1.5 hours at 26° the solution is neutralized with acetic acid, the methanol is distilled and the residue is extracted with methylene chloride and the extracts are chromatographed over magnesium silicate followed by elution with commercial hexanes containing increasing proportions of acetone. The main crystalline chromatographic peak contains 6α,16α-dimethyl-11β,21-dihydroxy-4,17(20)-pregnadien-3-one.

In the same manner, substituting the 3-pyrrolidyl enamine of 6α,16β-dimethyl-11β,21-dihydroxy-4,17(20)-pregnadiene-3,20-dione for the 3-pyrrolidyl enamine of 6α,16α - dimethyl - 11β,21 - dihydroxy - 4,17(20) - pregnadiene-3,20-dione is productive of 6α,16β-dimethyl-11β,21-dihydroxy-4,17(20)-pregnadien-3-one.

PREPARATION 15D[1]

*6α,16-Dimethyl-11β,21-Dihydroxy-1,4,17(20)-Pregnatrien-3-One*

2 g. of corn steep liquor containing about 48% solids and 1 g. of glucose are added to tap water to make 100 ml. of total liquid volume in a 250 ml. of Erlenmeyer flask. The pH is adjusted to 4.8 with sodium hydroxide solution and the resulting material is sterilized for 45 minutes at 15 p.s.i. steam pressure. This medium is inoculated with *Septomyxa affinis* (A.T.C.C. 6737) and the inoculated flask then placed on a rotary shaker where incubation is allowed to proceed for 2 days with the flask being rotated around a one-half inch radius at approximately 330 r.p.m. A substrate of 10 mg. of 6α,16α-dimethyl-11β,21-dihydroxy-4,17(20)-pregnadien-3-one dissolved in a minimum amount of propylene glycol is introduced slowly with constant swirling of the flask to minimize precipitation of the steroid. 10 mg. of 3-keto-bisnor-4-cholen-22-al as the bioconversion assistant is dissolved in 1 ml. of propylene glycol and added to the substrate-medium mixture; bioconversion is then permitted to proceed for 4 days, the flask being shaken throughout this period. At the end of this time, the steroid fraction is extracted with methylene chloride. The extracts are washed twice with sodium bicarbonate solution and twice with water and then dried with sodium sulfate. The washed extract is freed of solvent and the residue is triturated with ether. The residue is crystallized from ethyl acetate-commercial hexanes to give substantially pure 6α,16α-dimethyl-11β,21-dihydroxy-1,4,17(20)-pregnatrien-3-one.

In the same manner, substituting 6α,16β-dimethyl-11β,21-dihydroxy-4,17(20)-pregnadien-3-one for 6α,16α-dimethyl-11β,21-dihydroxy-4,17(20)-pregnadien-3-one is productive of 6α,16β-dimethyl-11β,21-dihydroxy-1,4,17(20)-pregnatrien-3-one.

PREPARATION 16D[1]

*6α,16-Dimethyl-11β,21-Dihydroxy-4,17(20)-Pregnadien-3-One 21-Acetate*

A solution of 100 mg. of 6α,16α-dimethyl-11β,21-dihydroxy-4,17(20)-pregnadien-3-one in 1 ml. of pyridine and 1 ml. of acetic anhydride is maintained at room temperature for 17 hours. Crushed ice is added and the precipitate of 6α,16α-dimethyl-11β,21-dihydroxy-4,17(20)-pregnadien-3-one 21-acetate is extracted with three 10 ml. portions of methylene chloride. The methylene chloride extracts are dried over anhydrous sodium sulfate, evaporated and the residue recrystallized from a mixture of ethyl acetate and commercial hexanes to give 6α,16α-dimethyl-11β,21-dihydroxy-4,17(20) - pregnadien-3-one 21-acetate.

In the same manner, substituting 6α,16β-dimethyl-11β,21-dihydroxy-4,17(20)-pregnadien-3-one for 6α,16α-dimethyl-11β,21-dihydroxy-4,17(20) - pregnadien-3-one is productive of 6α,16β-dimethyl-11β,21-dihydroxy-4,17 (20)-pregnadien-3-one 21-acetate.

In the same manner, 6α,16β-dimethyl- and 6α,16α-dimethyl-11β,21-dihydroxy-1,4,17(20) - pregnatrien - 3 - one are converted with acetic anhydride to 6α,16β-dimethyland 6α,16α-dimethyl-11β,21-dihydroxy-1,4,17(20)-pregnatrien-3-one 21-acetate.

PREPARATION 17D[1]

*6α,16-Dimethyl-11β,17α,21-Trihydroxy-4-Pregnene-3,20-Dione 21-Acetate*

100 mg. of 6α,16α-dimethyl-11β,21-dihydroxy-4,17(20)-pregnadien-3-one 21-acetate is dissolved in 6 ml. of tertiary butyl alcohol and 0.05 ml. of pyridine. To this mixture is added 1.6 mg. of osmium tetroxide and 2.5 equivalents of N-methylmorpholine oxide peroxide in tertiary butyl alcohol. After stirring at 26° C. for 2 hours, excess sodium hydrosulfite solution is added. The solvent is distilled in a vacuum and the product extracted with methylene chloride. The material is chromatographed over magnesium silicate (Florisil) and eluted with commercial hexanes containing increasing amounts of acetone. The major fractions showing a positive Tollens test are combined to give 6α,16α-dimethyl-11β,17α,21-trihydroxy-4-pregnene-3,20-dione 21-acetate.

In the same manner, substituting 6α,16β-dimethyl-11β,21-dihydroxy-4,17(20)-pregnadien-3-one 21-acetate for 6α,16α-dimethyl-11β,21-dihydroxy-4,17(20)-pregnadien-3-one 21-acetate is productive of 6α,16β-dimethyl-11β,17α,21-trihydroxy-4-pregnene-3,20-dione 21-acetate.

Similarly, under like conditions, 6α,16β-dimethyl- and 6α,16α-dimethyl-11β,21-dihydroxy-1,4,17(20)-pregnatrien-3-one 21-acetate are oxidatively hydroxylated with osmium tetroxide and N-methylmorpholine oxide peroxide to 6α,16β-dimethyl- and 6α,16α-dimethyl-11β,17α,21-trihydroxy-1,4-pregnadiene-3,20-dione 21-acetate.

PREPARATION 18D[1]

*6α,16-Dimethyl-11β,17α,21-Trihydroxy-4-Pregnene-3,20-Dione*

A solution is prepared containing 0.5 g. of 6α,16α-dimethyl-11β,17α,21-trihydroxy-4-pregnene-3,20-dione 21-acetate in 25 ml. of methanol. This solution is purged with oxygen-free nitrogen for a period of 5 minutes and then a similarly oxygen purge solution of 0.250 g. of potassium bicarbonate dissolved in 1 ml. of methanol and 1 ml. of water is added. This mixture is maintained for 3 hours in a nitrogen atmosphere, then neutralized with hydrochloric acid, poured into 200 ml. of ice water and the thus-obtained mixture is extracted with four 50 ml. portions of methylene chloride. The methylene chloride extracts are combined, washed several times with water, dried over anhydrous sodium sulfate and evaporated to give 6α,16α-dimethyl-11β,17α,21-trihydroxy-4-pregnene-3,20-dione.

In the same manner, substituting 6α,16β-dimethyl-11β,17α,21-trihydroxy-4-pregnene-3,20-dione 21-acetate for 6α,16α-dimethyl-11β,17α,21-trihydroxy-4-pregnene-3,20-dione 21-acetate is productive of 6α,16β-dimethyl-11β,17α,21-trihydroxy-4-pregnene-3,20-dione.

In the same manner, 6α,16β-dimethyl- and 6α,16α-dimethyl-11β,17α,21-trihydroxy-1,4-pregnadiene-3,20-dione 21-acetate are hydrolyzed with potassium bicarbonate to 6α,16β-dimethyl- and 6α,16α-dimethyl-11β,17α,21-trihydroxy-1,4-pregnadiene-3,20-dione.

PREPARATION 19D[1]

*6α,16-Dimethyl-17α,21-Dihydroxy-4,9(11)-Pregnadiene-3,20-Dione 21-Acetate*

To a solution of 8.5 g. of 6α,16α-dimethyl-11β,17α,21-trihydroxy-4-pregnene-3,20-dione 21-acetate in 42.5 ml. of pyridine is added 5.63 g. of N-bromoacetamide. After standing at room temperature for a period of 15 minutes, the reaction solution is cooled to 5 to 10° C. and sulfur dioxide gas is passed over the surface of the solution while shaking the flask until the solution gives no color with acidified starch-iodide paper. During the addition of the sulfur dioxide, the reaction mixture becomes warm. The temperature is kept below 30° C. by external cooling and by varying the rate of sulfur dioxide addition. Thereafter the reaction mixture is added 400 ml. of ice water and the resulting precipitate is collected by filtration. This material is recrystallized from a mixture of acetone and commercial hexanes to give 6α,16α-dimethyl-17α,21-dihydroxy-4,9(11)-pregnadiene-3,20-dione 21-acetate.

In the same manner, substituting 6α,16β-dimethyl-11β,17α,21-trihydroxy-4-pregnene-3,20-dione 21-acetate for 6α,16α-dimethyl-11β,17α,21-trihydroxy-4-pregnene-3,20-dione 21-acetate is productive of 6α,16β-dimethyl-17α,21-dihydroxy-4,9,11-pregnatriene-3,20-dione 21-acetate.

Following the procedure of Preparation 19D[1], but substituting 6α,16β-dimethyl- and 6α,16α-dimethyl-11β,17α,21-trihydroxy-1,4-pregnadiene-3,20-dione 21-acetate as the starting compounds there are thus produced 6α,16β-dimethyl- and 6α,16α-dimethyl-17α,21-dihydroxy-1,4,9(11)-pregnatriene-3,20-dione 21-acetate.

PREPARATION 20D[1]

*6α-16-Dimethyl-9α-Bromo-11β,17α,21-Trihydroxy-4-pregnene-3,20-Dione 21-Acetate*

To a solution of 5.68 g. of 6α,16α-dimethyl-17α,21-dihydroxy-4,9(11)-pregnadiene-3,20-dione 21-acetate in 100 ml. of methylene chloride and 250 ml. of tertiary butyl alcohol is added a solution of 14 ml. of 72% perchloric acid in 100 ml. of water followed by a solution of 2.34 g. of N-bromoacetamide in 60 ml. of tertiary butyl alcohol. After stirring the reaction mixture for 15 minutes, a solution of 2.8 g. of sodium sulfite in 140 ml. of water is added and the reaction mixture is concentrated to a volume of about 500 ml. under reduced pressure at about 50° C. The concentrate is cooled in an ice bath and while stirring 500 ml. of water is added. After stirring for a period of one hour, the precipitated product is isolated by filtration, and the cake is washed with water and air-dried to give 6α,16α-dimethyl-9α-bromo-11β,17α,21-trihydroxy-4-pregnene-3,20-dione 21-acetate.

In the same manner, substituting 6α,16β-dimethyl-17α,21-dihydroxy-4,9,(11)-pregnadiene-3,20-dione 21-acetate for 6α,16α-dimethyl-17α,21-dihydroxy-4,9(11)-pregnadiene-3,20-dione 21-acetate is productive of 6α,16β-dimethyl-9α-bromo-11β,17α,21-trihydroxy-4-pregnene-3,20-dione 21-acetate.

Following the procedure of Preparation 20D[1], but substituting 6α,16β-dimethyl- and 6α,16α-dimethyl-17α,21-dihydroxy-1,4,9(11)-pregnatriene-3,20-dione 21-acetate as the starting compounds, there are thus produced 6α,16β-dimethyl- and 6α,16α-dimethyl-9α-bromo-11β,17α,21-trihydroxy-1,4-pregnadiene-3,20-dione 21-acetate.

Substituting N-chlorosuccinimide for the N-bromoacetamide in the reactions described in Preparation 20D[1] and the paragraph following is productive of the corresponding 9α-chloro compounds, 6α,16β-dimethyl- and 6α,16α-dimethyl-9α-chloro-11β,17α,21-trihydroxy-1,4-pregnadiene-3,20-dione 21-acetate and 6α,16β-dimethyl- and 6α, 16α-dimethyl-9α-chloro-11β,17α,21-trihydroxy-4-pregnene-3,20-dione 21-acetate.

PREPARATION 21D[1]

*6α,16-Dimethyl-9β,11β-Epoxy-17α,21-Dihydroxy-4-Pregnene-3,20-Dione 21-Acetate*

To a solution of 6.78 g. of 6α,16α-dimethyl-9α-bromo-11β,17α,21-trihydroxy-4-pregnene-3,20-dione 21-acetate in 175 ml. of acetone is added 6.78 g. of potassium acetate and the resulting suspension is heated under reflux for a period of 17 hours. The mixture is then concentrated to approximately 60 ml. at reduced pressure on the steam bath, diluted with water and extracted with methylene chloride. The methylene chloride extracts are combined, washed with water, dried over anhydrous sodium sulfate and evaporated. The residue is redissolved in methylene chloride and chromatographed over 500 g. of magnesium silicate (Florisil). The chromatographic column is eluted with 1 l. portions of commercial hexanes containing increasing proportions of acetone. Those fractions which move more rapidly from the origin on papergram (benzene-formamide) than the starting material are combined and recrystallized from acetone-commercial hexanes or ethyl acetate-commercial hexanes to give 6α,16α-dimethyl-9β,11β-epoxy-17α,21-dihydroxy-4-pregnene-3,20-dione 21-acetate.

In the same manner, substituting 6α,16β-dimethyl-9α-bromo-11β,17α,21-trihydroxy-4-pregnene-3,20-dione 21-acetate for 6α,16α-dimethyl-9α-bromo-11β,17α,21-trihydroxy-4-pregnene-3,20-dione 21-acetate is productive of 6α,16β-dimethyl - 9β,11β - epoxy - 17α,21 - dihydroxy - 4-pregnene-3,20-dione 21-acetate.

Following the procedure of Preparation 21D¹, but substituting 6α,16β-dimethyl- and 6α,16α-dimethyl-9α-bromo-11β,17α,21-trihydroxy-1,4-pregnadiene-3,20-dione 21-acetate as the starting compounds, there are thus produced 6α,15β-dimethyl- and 6α,16α-dimethyl-9β,11β-epoxy-17α,21-dihydroxy-1,4-pregnadiene-3,20 - dione 21-acetate.

PREPARATION 22D¹

*6α,16-Dimethyl-9α-Fluoro-11β,17α,21-Trihydroxy-4-Pregnene-3,20-Dione 21-Acetate*

To approximately 1.3 g. of hydrogen fluoride contained in a polyethylene bottle and maintained at −60° C. is added 2.3 ml. of tetrahydrofuran and then a solution of 500 mg. of 6α,16α-dimethyl-9β,11β-epoxy-17α,21-dihydroxy-4-pregnene-3,20-dione 21-acetate in 2 ml. of methylene chloride. The steroid solution is rinsed in with an additional 1 ml. of methylene chloride. The light red colored solution is then kept at approximately −30° C. for one hour and at −10° C. for 2 hours. At the end of this period it is mixed cautiously with an excess of cold sodium bicarbonate solution and the organic material is extracted with additional methylene chloride. The combined extracts are washed with water, dried over anhydrous sodium sulfate and concentrated to approximately 35 ml. The solution is chromatographed over 130 g. of synthetic magnesium silicate (Florisil). The column is developed with 260 ml. portions of commercial hexanes containing increasing proportions of acetone. Those fractions which move more slowly from the origin on papergram (benzene-formamide) than the starting material are combined and recrystallized from acetone-commercial hexanes or ethyl acetate-commercial hexanes to give 6α,16α-dimethyl-9α-fluoro-11β,17α,21-trihydroxy-4-pregnene-3,20-dione 21-acetate.

In the same manner, substituting 6α,16β-dimethyl-9β,11β - epoxy - 17α,21-dihydroxy-4-pregnene-3,20-dione 21-acetate for 6α,16α-dimethyl-9β,11β-epoxy-17α,21-dihydroxy-4-pregnene-3,20-dione 21-acetate is productive of 6α,16β - dimethyl-9α-fluoro-11β,17α,21-trihydroxy-4-pregnene-3,20-dione 21-acetate.

Following the procedure of Preparation 22D¹, but substituting 6α,16β-dimethyl- and 6α,16α-dimethyl-9β,11β-epoxy - 17α,21-dihydroxy-1,4-pregnadiene-3,20-dione 21-acetate as the starting compounds, there are thus produced 6α,16β - dimethyl- and 6α,16α - dimethyl - 9α - fluoro-11β,17α,21 - trihydroxy - 1,4-pregnadiene-3,20-dione 21-acetate.

PREPARATION 23D¹

*6α,16-Dimethyl-9α-Fluoro-11β,17α,21-Trihydroxy-4-Pregnene-3,20-Dione*

3.25 g. of 6α,16α-dimethyl-9α-fluoro-11β,17α,21-trihydroxy-4-pregnene-3,20-dione 21-acetate is dissolved in 325 ml. of methanol, previously purged of air-oxygen by passing nitrogen through it for 10 minutes and to it is then added a solution of 1.63 g. of potassium bicarbonate in 30 ml. of water, similarly purged of oxygen. The reaction mixture is maintained at room temperature for 5 hours in a nitrogen atmosphere and is then neutralized with 2.14 ml. of acetic acid in 40 ml. of water. The reaction mixture is concentrated to approximately one-third volume at reduced pressure on a 60° C. water-bath, 250 ml. of water is added and the reaction mixture is chilled. The crystalline product is collected on a filter, washed with water and dried to give 6α,16α-dimethyl-9α-fluoro-11β,17α,21-trihydroxy-4-pregnene-3,20-dione.

Alternatively, following concentration of the reaction mixture and dilution with water it is extracted with methylene chloride. The methylene chloride extracts are combined, washed with water, and dried over anhydrous sodium sulfate. The solution is then chromatographed over Florisil (magnesium silicate). The chromatographic column is eluted with portions of commercial hexanes containing increasing proportions of acetone. Those fractions which move more slowly from the origin on papergram (benzene-formamide) than the starting material are combined and recrystallized from acetone-commercial hexanes or ethyl acetate-commercial hexanes to give 6α,16α-dimethyl - 9α - fluoro - 11β,17α,21-trihydroxy-4-pregnene-3,20-dione.

In the same manner, substituting 6α,16β-dimethyl-9α-fluoro - 11β,17α,21-trihydroxy-4-pregnene-3,20-dione 21-acetate for 6α,16α - dimethyl-9α-fluoro-11β,17α,21-trihydroxy-4-pregnene-3,20-dione 21-acetate is productive of 6α,16β - dimethyl-9α-fluoro-11β,17α,21-trihydroxy-4-pregnene-3,20-dione.

Following the procedure of Preparation 23D¹, but substituting 6α,16β-dimethyl- and 6α,16α-dimethyl-9α-fluoro-11β,17α,21 - trihydroxy - 1,4-pregnadiene-3,20-dione 21-acetate as the starting compounds, there are thus produced 6α,16β - dimethyl- and 6α,16α - dimethyl - 9α - fluoro-11β,17α,21-trihydroxy-1,4-pregnadiene-3,20-dione.

Starting materials for the compounds of the formula

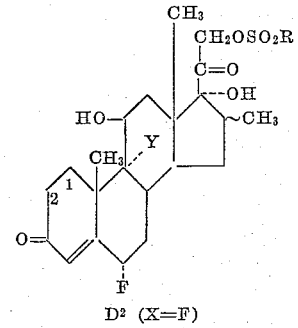

D² (X=F)

wherein R and Y have the same meaning as previously given.

PREPARATION 1D²a

*11-Keto-16α-Methylprogesterone*

To a hot solution of 4.56 g. (0.014 mole) of 11-keto-16-dehydroprogesterone in 45 ml. of methanol was added 2.25 ml. of pyrrolidine with swirling. The reaction product, the 3-pyrrolidyl enamine of 11-keto-16-dehydroprogesterone, soon separated as yellowish crystals. After cooling to 5° C., the mixture was filtered, the cake washed with cold methanol and dried under vacuum. There was obtained 4.56 g. of 3-pyrrolidyl-3,5,16-pregnatriene-11,20-dione melting at 154 to 169° C.

A solution of the thus-obtained enamine in 110 ml. of tetrahydrofuran was added slowly to a stirred suspension of 45 ml. of commercial three molar methyl magnesium bromide, 0.90 g. of cuprous chloride and 50 ml. of tetrahydrofuran. The mixture was cooled to room temperature and stirred under a nitrogen atmosphere for 3 hours. The excess Grignard reagent was cautiously destroyed by the dropwise addition of 6.5 ml. of water. To the mixture, containing 3-pyrrolidyl-16α-methyl-3,5-pregnadiene-11,20-dione, was added 4 ml. of acetic acid and 16 ml. of methanol and the mixture was warmed until a clear dark yellow solution was obtained. Sixteen ml. of a 10% aqueous solution of sodium hydroxide was added, bringing the pH to 8. The mixture was heated under reflux for 45 minutes. One ml. of acetic acid and 250 ml. of water were added and the cooled mixture was extracted three times with methylene chloride. The combined extracts were washed with an aqueous sodium bicarbonate solution, water and then dried with sodium sulfate. The dried solution was evaporated and the residue, consisting essentially of 11-keto-16α-methylprogesterone, was dissolved in 400 ml. of methylene chloride and chromatographed through a 200 g. column of magnesium silicate (Florisil). The column was developed with 400-ml. portions of solvent of the following composition and order: five of hexanes (Skellysolve B) plus 3% acetone, five of hexanes plus 5% acetone, eight of hexanes plus 7% acetone, five of hexanes plus 10% acetone, four of hexanes plus 15% acetone and finally, one of acetone. Fractions 9 to 25 (counting the methylene chloride fraction) were combined and recrystallized from a mixture of acetone and water to give 2.03 g. of 11-keto-16α-methylprogesterone melting at 179 to 182° C. A sample recrystallized from a mixture of ethyl acetate and hexanes melted at 183 to 185° C., had an $[\alpha]_D$ of $+255°$ (CHCl$_3$), $$\lambda_{max.}^{alc.} \ 238 \ m\mu$$

$a_M$ 15,850 and the analysis below.

Calcd. for $C_{22}O_{30}H_3$: C, 77.15; H, 8.83. Found: C, 76.95; H, 8.98.

PREPARATION 1D[2]b

11-Keto-16β-Methylprogesterone

A medium is prepared containing 10 g. of Cerelose dextrose technical grade and 20 g. of corn steep liquor (60% solids) in sufficient tap water to make up one liter of solution. 100.1 of such a medium is adjusted by the addition of 25% sodium hydroxide solution to a pH of 5. Thereto is then added 400 ml. of lard oil and lard-oil octadecanol as an anti-foaming agent. This medium is sterilized for 45 minutes at 20 lbs. pressure and inoculated with *Rhizopus nigricans* minus strain, American Type Culture Collection No. 6227b, and incubated for 24 hours at a temperature of 28° C. using a rate of aeration and stirring such that the oxygen uptake is 6.3 to 7 millimoles per hour per ml. of sodium sulfite according to the method of Cooper, Fernstrom and Miller, Ind. Eng. Chem. 36, 504 (1944). To this medium containing a 24 hour growth of *Rhizopus nigricans* minus strain is added fifty g. of 16β-methylprogesterone in 150 ml. of acetone to provide a suspension of the steroid in the culture. After an additional 24 hour period of incubation under the same conditions of temperature and aeration, the beer and mycelium are extracted. The mycelium is filtered, washed twice each time with a volume of acetone approximately equal to the volume of the mycelium, and extracted twice, each time with a volume of methylene chloride approximately equal to the volume of the mycelium. The acetone and methylene chloride extracts including solvents are added to the beer filtrate. The mixed extracts and beer filtrate are extracted successively with 2 one-half by volume portions of methylene chloride and then with 2 one-fourth by volume portions of methylene chloride. The combined methylene chloride extracts are washed with 2 one-tenth by volume portions of a 2% aqueous solution of sodium bicarbonate and then with 2 one-tenth by volume portions of water. After drying the methylene chloride extracts with about 3 to 5 g. of anhydrous sodium sulfate per liter of solvent and filtering, the solvent is removed by distillation. The residue is dissolved in a minimum of methylene chloride, filtered and the solvent then evaporated. The crude 16β-methyl-11α-hydroxyprogesterone is oxidized directly to 16β-methyl-11-ketoprogesterone.

A solution is prepared containing 3.5 g. of the crude 16β-methyl-11α-hydroxyprogesterone in 240 ml. of acetic acid at room temperature. Thereto is added dropwise a solution of 0.82 g. of chromium trioxide in 82 ml. of acetic acid and 0.8 ml. of water. During the addition the temperature is maintained between 20 to 23° C. and thereafter for another period of 1.5 hours. The reaction mixture is then diluted with one liter of water and extracted with six 150-ml. portions of methylene chloride. The extracts are combined, washed with dilute sodium bicarbonate solution and water, dried over anhydrous sodium sulfate and evaporated to dryness under reduced pressure. The thus obtained 16β-methyl-11-ketoprogesterone is recrystallized from acetone-commercial hexanes.

PREPARATION 2D[2]

3,11-Diketo-16-Methyl-4,17(20)-[Cis]-Pregnadien-21-Oic Acid Methyl Ester

A solution of 2.00 g. (5.8 millimoles) of 11-keto-16α-methylprogesterone in 30 ml. of dry tertiary butyl alcohol was warmed to 50° C. and stirred under nitrogen. To the solution was added 3.2 ml. of ethyl oxalate and 3.03 g. of a 25% methanolic sodium methoxide solution. A yellow-green precipitate of the sodium dienolate of 2,21-diethoxyoxalyl-11-keto-16α methylprogesterone appeared almost immediately.

The mixture was stirred for 20 minutes after which a cooled solution of 0.98 g. of anhydrous sodium acetate and 0.84 ml. of acetic acid in 40 ml. of methanol was added, thus producing the free dienol. The solution was cooled to 0° C. and then treated dropwise with a cold solution of 2.0 g. of bromine in methanol over a period of 10 minutes. There was thus produced 2,21,21-tribromo - 2,21 - diethoxyoxalyl-11-keto-16α-methylprogesterone.

The cooling bath was removed and to the solution was added 5.72 g. of a 25% methanolic sodium methoxide solution. The stirring was continued for 2.5 hours. There was thus produced 2-bromo-3,11-diketo-16α-methyl-4,17(20)-[cis]-pregnadien-21 - oic acid methyl ester.

To the resulting solution was then added 5 ml. of acetic acid and 1 g. of zinc dust and stirring was continued for 30 minutes. The mixture was diluted with water, the solids were removed by filtration, and the filtrate extracted thoroughly with methylene chloride. The extract was dried with sodium sulfate and evaporated. The residue was dissolved in 400 ml. of methylene chloride and poured over a 200 g. column of magnesium silicate (Florisil). The column was developed with 400 ml. portions of solvent of the following composition and order: four of hexanes (Skellysolve B) plus 5% acetone, ten of hexanes plus 7% acetone, ten of hexanes plus 10% acetone and finally, one of acetone. Fractions 14 to 23 (counting the methylene chloride fraction) contained starting 11-keto-16α-methylprogesterone. Fractions 7 to 12 contained 3,11-diketo-16α-methyl-4,17(20)-[cis]-pregnadien-21-oic acid methyl ester which, when crystallized from methanol and water and then from methanol, melted at 177 to 184° C., had a $$\lambda_{max.}^{alc.} \ 232.5 \ m\mu$$

$a_M$ 26,200, an $[\alpha]_D$ of $+137°$ (CHCl$_3$) and the analysis below.

Calcd. for $C_{23}H_{30}O_4$: C, 74.56; H, 8.16. Found: C, 74.58; H, 8.04.

In the same manner, substituting 11-keto-16β-methylprogesterone for 11-keto-16α-methylprogesterone in Prepartion 2D[2] is productive of 3,11-diketo-16β-methyl-4,17-(20)-[cis]-pregnadien-21-oic acid methyl ester.

PREPARATION 3D[2]

The 3-Ethylene Glycol Ketal of 3,11-Diketo-16-Methyl-4,17(20)-[Cis]-Pregnadien-21-Oic Acid Methyl Ester To a solution of 1.5 g. of 3,11-diketo-16α-methyl-4,17-(20)-[cis]-pregnadien-21-oic acid methyl ester dissolved in 150 ml. of benzene is added 7.5 ml. of ethylene glycol and 0.150 g. of paratoluenesulfonic acid and the whole is then heated with stirring at the reflux temperature of the reaction mixture for 5.5 hours. The water formed in the reaction is removed by passing the condensate through a water trap. The cooled reaction mixture is washed with 100 ml. of a 1% aqueous sodium bicarbonate solution. The benzene layer is then poured onto a column of 150 g. of magnesium silicate (Florisil). The column is developed with 100-ml. portions of solvent of the following composition and order: 8 portions of methylene chloride plus 4% acetone and 3 portions of methylene chloride plus 8% acetone. Those fractions which move more rapidly from the origin on papergram (Carbitol-methylcyclohexane) than the starting material are combined and recrystallized from acetone-commercial hexanes or ethyl acetate-commercial hexanes to yield the 3-ethylene glycol ketal of 3,11-diketo-16α-methyl-4,17-(20)-[cis]-pregnadien-21-oic acid methyl ester.

In the same manner, substituting 3,11-diketo-16β-methyl-4,17(20)-[cis]-pregnadien-21-oic acid methyl ester for 3,11-diketo-16α-methyl-4,17(20)-[cis]-pregnadien-21-oic acid methyl ester is productive of the 3-ethylene glycol ketal of 3,11-diketo-16β-methyl-4,17(20)-[cis]-pregnadien-21-oic acid methyl ester.

Reacting 3,11-diketo-16β-methyl- and 3,11-diketo-16α-methyl-4,17(20)-[cis]pregnadien-21-oic acid methyl ester with trimethylene glycol in the presence of paratoluenesulfonic acid is productive of the 3-trimethylene glycol ketal of 3,11-diketo-16β-methyl- and 3,11-diketo-16α-methyl-4,17(20)-[cis]pregnadien-21-oic acid methyl ester.

PREPARATION 4D²

*3-Ethylene Glycol Ketal of 3,11-Diketo-5α,6α-Epoxy-16-Methyl-17(20)-[cis]-Pregnen-21-Oic Acid Methyl Ester*

To a solution of 5 g. of the 3-ethylene glycol ketal of 3,11-diketo-16α-methyl-4,17(20)-[cis]-pregnadien-21-oic acid methyl ester in 100 ml. of chloroform is added a chilled solution of 1.9 g. of perbenzoic acid dissolved in 31.5 ml. of chloroform. The solution is maintained at about 4° C. for 24 hours, and then at room temperature for 72 hours. The solution is then washed with a 5% aqueous solution of sodium bicarbonate and then with water. The chloroform layer is separated, dried and the solvent distilled to give a residue of the 3-ethylene glycol ketal of 3,11-diketo-5α,6α-epoxy-16α-methyl-17-(20)-[cis]-pregnen-21-oic acid methyl ester.

In the same manner, substituting the 3-ethylene glycol ketal of 3,11-diketo-16β-methyl-4,17(20)-[cis]-pregnadien-21-oic acid methyl ester for the 3-ethylene glycol ketal of 3,11-diketo-16α-methyl-4,17(20)-[cis]-pregnadien-21-oic acid methyl ester is productive of the 3-ethylene glycol ketal of 3,11-diketo-5α,6α-epoxy-16β-methyl-17(20)-[cis]-pregnen-21-oic acid methyl ester.

PREPARATION 5D²

*3,11-Diketo-5α-Hydroxy-6β-Fluoro-16-Methyl-17(20)-Pregnen-21-Oic Acid Methyl Ester*

To approximately 1.3 g. of hydrogen fluoride contained in a polyethylene bottle and maintained at −60° C. is added 2.3 ml. of tetrahydrofuran and then a solution of 500 mg. of the 3-ethylene glycol ketal of 3,11-diketo-5α,6α-epoxy-16α-methyl-17(20)-[cis]-pregnen-21-oic acid methyl ester in 2 ml. of methylene chloride. The steroid solution is rinsed in with an additional 1 ml. of methylene chloride. The light-red colored solution is then kept at approximately −30° C. for 1 hour and at −10° C. for 2 hours. At the end of this period it is mixed cautiously with an excess of cold sodium bicarbonate solution and the organic material is extracted with additional methylene chloride. The combined extracts are washed with water, dried over anhydrous sodium sulfate and concentrated to approximately 35 ml. The solution is chromatographed over synthetic magnesium silicate. The chromatographic column is developed by eluting with methylene chloride containing increasing amounts of acetone. Peak (by weight) fractions which move more slowly from the point of origin on papergram (Carbitol-methylcyclohexane) than the starting material are combined and recrystallized from acetone-commercial hexanes to give 3,11-diketo-5α-hydroxy-6β-fluoro-16α-methyl-17(20)-pregnen-21-oic acid methyl ester.

In the same manner, substituting the 3-ethylene glycol ketal of 3,11-diketo-6α-epoxy-16β-methyl-17(20)-[cis]-pregnen-21-oic acid methyl ester for the 3-ethylene glycol ketal of 3,11-diketo-5α,6α-epoxy-16α-methyl-17(20)-[cis]-pregnen-21-oic acid methyl ester is productive of 3,11-diketo-5α-hydroxy-6β-fluoro-16β-methyl-17(20)-pregnen-21-oic acid methyl ester.

PREPARATION 6D²

*3-Ethylene Glycol Ketal of 3,11-Diketo-5α-Hydroxy-6β-Fluoro-16-Methyl-17(20)-[Cis]-Pregnen-21-Oic Acid Methyl Ester*

A mixture of 1.9 g. of methyl 6β-fluoro-3,11-diketo-5α-hydroxy-16α-methyl-17(20)-[cis]-pregnen-21-oate, 59 mg. of para-toluenesulfonic acid monohydrate and 31 ml. of distilled ethylene glycol is added to 800 ml. of benzene. The mixture is stirred and refluxed for 2 hours, with the condensate passing through a water trap to remove the water. Then the mixture is cooled, washed with water and evaporated to dryness to give a crude solid which on recrystallization from a mixture of acetone and hexanes gives the 3-ethylene glycol ketal of 3,11-diketo-5α-hydroxy-6β-fluoro-16α-methyl-17(20)-[cis]-pregnen-21-oic acid methyl ester.

In the same manner, substituting methyl 6β-fluoro-3,11-diketo-5α-hydroxy-16β-methyl-17(20)-[cis]-pregnen-21-oate for methyl 6β-fluoro-3,11-diketo-5α-hydroxy-16α-methyl-17(20)-[cis]-pregnen-21-oate is productive of the 3-ethylene glycol ketal of 3,11-diketo-5α-hydroxy-6β-fluoro-16β-methyl 17(20)-[cis]-pregnen-21-oic acid methyl ester.

PREPARATION 7D²

*The 3-Ethylene Glycol Ketal of 5α,11β,21-Trihydroxy-6β-Fluoro-16-Methyl-17(20)-[Cis]-Pregnen-3-One*

To a solution of 1.96 g. of the 3-ethylene glycol ketal of 3,11-diketo-5α-hydroxy-6β-fluoro-16α-methyl-17(20)-[cis]-pregnen-21-oic acid methyl ester in 850 ml. of anhydrous ether is added 3.7 g. of lithium aluminum hydride. The mixture is stirred for a period of one hour, and 200 ml. of water is added slowly, the ether phase separating. The aqueous phase is extracted with ethyl acetate and the extracts are added to the ether phase. The combined ether-ethyl acetate solution is washed with water, dried and evaporated to dryness under reduced pressure. The crude solid residue is crystallized from acetone-commercial hexanes to give the 3-ethylene glycol ketal of 5α,11β,21-trihydroxy-6β-fluoro-16α-methyl-17-(20)-[cis]-pregnen-3-one.

In the same manner substituting the 3-ethylene glycol ketal of 3,11-diketo-5α-hydroxy-6β-fluoro-16β-methyl-17(20)-[cis]-pregnen-21-oic acid methyl ester for the 3-ethylene glycol ketal of 3,11-diketo-5α-hydroxy-6β-fluoro-16α-methyl-17(20)-[cis]-pregnen-21-oic acid methyl ester is productive of the 3-ethylene glycol ketal of 5α,11β,21-trihydroxy-6β-fluoro-16β-methyl-17(20)-[cis]-pregnen-3-one.

PREPARATION 8D²

*The 3-Ethylene Glycol Ketal of 5α,11β,21-Trihydroxy-6β-Fluoro-16-Methyl-17(20)-[Cis]-Pregnen-3-One 21-Acetate*

0.87 g. of the 3-ethylene glycol ketal of 5α,11β,21-trihydroxy-6β-fluoro-16α-methyl-17(20)-[cis]-pregnen-3-one is dissolved in 10 ml. of acetic anhydride and 10 ml. of pyridine. The solution is maintained 16 hours at room temperature and then poured into ice water to give the 3-ethylene glycol ketal of 5α,11β,21-trihydroxy-6β-fluoro-16α-methyl-17(20)-[cis]-pregnen-3-one 21-acetate.

In the same manner, substituting the 3-ethylene glycol ketal of 5α,11β,21-trihydroxy-6β-fluoro-16β-methyl-17-(20)-[cis]-pregnen-3-one for the 3-ethylene glycol ketal of 5α,11β,21 - trihydroxy -6β - fluoro-16α-methyl-17(20)-[cis]-pregnen-3-one is productive of the 3-ethylene glycol ketal of 5α,11β,21-trihydroxy-6β-fluoro-16β-methyl-17-(20)-[cis]-pregnen-3-one 21-acetate.

PREPARATION 9D²

*The 3-Ethylene Glycol Ketal of 5α,11β,17α,21-Tetrahydroxy-6β-Fluoro-16-Methyl-Pregnane-3,20-Dione 21-Acetate*

To a solution of 0.93 g. of the 3-ethylene glycol ketal of 5α,11β-dihydroxy-6β-fluoro-16α-methyl - 17(20)-pregnen-3-one 21-acetate in 35 ml. of tertiary butyl alcohol is added one ml. of pyridine, 2.75 ml. of two molar N-methylmorpholine oxide peroxide (U.S. 2,769,823) in tertiary butyl alcohol, and 13.1 mg. of osmium tetroxide in tertiary butyl alcohol (9.1 ml. of tertiary butyl alcohol solution containing 1.44 mg. osmium tetroxide per ml.). The solution is stirred for a period of 18 hours and 15 ml. of 5% sodium hydrosulfite is added. Stirring is continued for an additional 10 minutes, at which time 0.7 g. of finely ground synthetic magnesium silicate is mixed into the solution for a period of 20 minutes and then removed by filtration. The filtrate is evaporated to dryness under reduced pressure at a temperature of less than 50° C. The residue is dissolved in methylene chloride, washed with water, dried and evaporated to dryness. The residue is crystallized from acetone-Skellysolve B hexanes to give the 3-ethylene glycol ketal of 5α,11β,17α,21-tetrahydroxy-6β-fluoro-16α-methylpregnane - 3,20-dione 21-acetate.

In the same manner, substituting the 3-ethylene glycol ketal of 5α,11β-dihydroxy-6β-fluoro-16β-methyl-17(20)-pregnen-3-one 21-acetate for the 3-ethylene glycol ketal of 5α,11β-dihydroxy-6β-fluoro-16α-methyl-17(20) - pregnen-3-one 21-acetate is productive of the 3-ethylene glycol ketal of 5α,11β,17α,21-tetrahydroxy-6β-fluoro-16β-methyl-pregnene-3,20-dione 21-acetate.

PREPARATION 10D²

*6α-Fluoro-11β,17α,21-Trihydroxy-16-Methyl-4-Pregnene-3,20-Dione 21-Acetate*

A solution of 0.144 g. of the 3-ethylene glycol ketal of 5α,11β,17α,21 - tetrahydroxy - 6β-fluoro-16α-methyl-pregnane-3,20-dione 21-acetate in 12 ml. of chloroform and 0.1 ml. of absolute alcohol is cooled to −10° C. in an ice-salt bath and a stream of anhydrous hydrochloric acid is gently bubbled through the solution for 2.5 hours while the temperature is maintained between −5 and −15° C. The solution is then diluted with 25 ml. of chloroform, washed with dilute sodium bicarbonate and water, dried over anhydrous sodium sulfate, and evaporated to dryness under reduced pressure at 60° C. or less to give 6α-fluoro-11β,17α,21-trihydroxy-16α-methyl-4-pregnene-3,20-dione 21-acetate.

Alternatively, the reaction mixture can be washed with dilute sodium bicarbonate and water, followed by extraction with portions of methylene chloride. The thus-obtained methylene chloride extracts are combined, washed with water and dried over anhydrous sodium sulfate. The solution is chromatographed over Florisil (synthetic magnesium silicate). The chromatographic column is eluted with portions of commercial hexanes containing increasing proportions of acetone. Those peak fractions which give a positive Tollens test and show Δ⁴-3-keto absorption in the ultraviolet spectrum are combined and recrystallized from acetone-commercial hexanes or ethyl acetate-commercial hexanes to give 6α-fluoro-11β,17α,21 - trihydroxy - 16α - methyl - 4 - pregnene-3,20-dione 21-acetate.

In the same manner, substituting the 3-ethylene glycol ketal of 5α,11β,17α,21 - tetrahydroxy - 6β-fluoro-16β-methylpregnane-3,20-dione 21-acetate for the 3-ethylene glycol ketal of 5α,11β,17α,21-tetrahydroxy-6β-fluoro-16α-methylpregnane-3,20-dione 21-acetate is productive of 6α-fluoro - 11β,17α,21 - trihydroxy-16β-methyl-4-pregnene-3,20-dione 21-acetate.

PREPARATION 11D²

*6α-Fluoro-11β,17α,21-Trihydroxy-16-Methyl-1,4-Pregnadiene-3,20-Dione*

A medium consisting of 1% dextrose hydrate, 2% cornsteep liquor of 60% solids and tap water is adjusted to pH 4.9 with sodium hydroxide. The medium is steam sterilized at 15 pounds' pressure for 30 minutes, cooled, and then inoculated with a 24-hour growth, from spores, of *Septomyxa affinis*, A.T.C.C. 6737. The medium is agitated, and sparged with sterile air at the rate of one-tenth volume of air per volume of medium per minute. At the end of 24 hours of fermentation at room temperature, the pH is about 7.4. To this culture there is added a solution of 6α-fluoro-11β,17α,21-trihydroxy-16α-methyl-4-pregnene-3,20-dione 21-acetate dissolved in a minimal amount of diethylformamide. The solution is prepared by dissolving 5 parts of the steroid in 100 parts of the solvent and adding about 10 cc. of the solution per liter of the medium. Fermentation is continued for a period of 48 hours whereupon the mycelium and beer are extracted thoroughly with methylene chloride. The extract is washed with sodium bicarbonate solution and then with water, dried and concentrated in vacuo to give 6α-fluoro-11β,17α,21-trihydroxy-16α-methyl-1,4-pregnadiene-3,20-dione, which can be further purified by taking it up in methylene chloride and chromatography over Florisil (synthetic magnesium silicate). The chromatographic column is eluted with portions of commercial hexanes containing increasing proportions of acetone. Those peak fractions which give a positive Tollens test and spectral properties showing the presence of a Δ¹,⁴-3-ketone system are combined and recrystallized from acetone-commercial hexanes or ethyl acetate-commercial hexanes.

In the same manner, substituting 6α-fluoro-11β,17α,21-trihydroxy-16β-methyl-4-pregnene-3,20-dione 21-acetate for 6α - fluoro-11β,17α,21-trihydroxy-16α-methyl-4-pregnene-3,20-dione 21-acetate is productive of 6α-fluoro-11β,17α,21 - trihydroxy - 16β - methyl-1,4-pregnadiene-3,20-dione.

PREPARATION 12D²

*6α-Fluoro-11β,17α,21-Trihydroxy-16-Methyl-4-Pregnene-3,20-Dione*

A solution of 1.1 g. of 6α-fluoro-11β,17α,21-trihydroxy-16α-methyl-4-pregnene-3,20-dione 21-acetate, 1 g. of potassium bicarbonate, 100 ml. of methanol and 15 ml. of water are mixed together and purged with nitrogen to remove dissolved oxygen while stirring at 25° C. for 6 hours. The solution is then neutralized by addition of acetic acid and distilled under vacuum to remove the methanol. The residue is extracted with 100 ml. of methylene chloride, and the extract is dried over sodium sulfate to give a solution of 6α-fluoro-11β,17α,21-trihydroxy-16α-methyl-4-pregnene-3,20-dione which is freed of solvent by evaporation.

In the same manner, substituting 6α-fluoro-11β,17α,21-trihydroxy-16β-methyl-4-pregnene-3,20-dione 21-acetate for 6α-fluoro-11β,17α,21-trihydroxy-16α-methyl-4-pregnene-3,20-dione 21-acetone is productive of 6α-fluoro-11β,17α,21-trihydroxy-16β-methyl-4-pregnene-3,20-dione.

PREPARATION 13D²

*6α-Fluoro-11β,17α,21-Trihydroxy-16-Methyl-1,4-Pregnadiene-3,20-Dione 21-Acetate*

1.5 g. of 6α-fluoro-11β,17α,21-trihydroxy-16α-methyl-1,4-pregnadiene-3,20-dione is dissolved in 20 ml. of pyridine and 15 ml. of acetic anhydride and the mixture is heated at 40° C. for 4 hours. The solution is cooled and then slowly diluted with water. The precipitated steroid is removed by filtration, washed with water and dried to give 6α-fluoro-11β,17α,21-trihydroxy-16α-methyl-1,4-pregnadiene-3,20-dione 21-acetate.

In the same manner, substituting 6α-fluoro-11β,17α,21-trihydroxy-16β-methyl-1,4-pregnadiene-3,20-dione for 6α-fluoro-11β,17α,21-trihydroxy-16α-methyl-1,4-pregnadiene-3,20-dione is productive of 6α-fluoro-11β,17α,21-trihydroxy-16β-methyl-1,4-pregnadiene-3,20-dione 21-acetate.

PREPARATION 14D²

6α-Fluoro-16-Methyl-17α,21-Dihydroxy-1,4,9(11)-Pregnatriene-3,20-Dione 21-Acetate To a solution of 8.5 g. of 6α-fluoro-11β,17α,21-trihydroxy-16α-methyl-1,4-pregnadiene-3,20-dione 21-acetate in 42.5 ml. of pyridine is added 5.63 g. of N-bromoacetamide. After standing at room temperature for a period of 15 minutes, the reaction solution is cooled to 5 to 10° C. and sulfur dioxide gas is passed over the surface of the solution while shaking the flask until the solution gives no color with acidified starch-iodide paper. During the addition of the sulfur dioxide, the reaction mixture becomes warm. The temperature is kept under 30° C. by external cooling and by varying the rate of sulfur dioxide addition. Thereafter to the reaction mixture is added 400 ml. of ice water and the resulting precipitate is collected by filtration. This material is recrystallized from acetone-commercial hexanes to give 6α-fluoro-16α-methyl-17α,21-dihydroxy-1,4,9(11) - pregnatriene-3,20-dione 21-acetate.

In the same manner, substituting 6α-fluoro-11β,17α,21-trihydroxy-16β-methyl-1,4-pregnadiene - 3,20 - dione 21-acetate for 6α-fluoro-11β,17α,21-trihydroxy-16α-methyl-1,4-pregnadiene-3,20-dione 21-acetate is productive of 6α-fluoro-16β-methyl - 17α,21 - dihydroxy - 1,4,9(11) - pregnatriene-3,20-dione 21-acetate.

PREPARATION 15D²

6α-Fluoro-16-Methyl-17α,21-Dihydroxy-4,9(11)-Pregnadiene-3,20-Dione 21-Acetate Following the procedure of Preparation 14D², but substituting 6α-fluoro-11β,17α,21-trihydroxy-16β-methyl- and 6α - fluoro-11β,17α,21-trihydroxy-16α-methyl-4-pregnene-3,20-dione 21-acetate as the starting compounds, there are thus produced 6α-fluoro-16β-methyl- and 6α-fluoro-16α-methyl-17α,21-dihydroxy - 4,9(11) - pregnadiene-3,20-dione 21-acetate.

PREPARATION 16D²

6α-Fluoro-9α-Bromo-11β,17α,21-Trihydroxy-16-Methyl-1,4-Pregnadiene-3,20-Dione 21-Acetate To a solution of 5.68 g. of 6α-fluoro-16α-methyl-17α,21-dihydroxy-1,4,9(11)-pregnatriene-3,20-dione 21-acetate in 100 ml. of methylene chloride and 250 ml. of tertiary butyl alcohol is added a solution of 14 ml. of 72% perchloric acid in 100 ml. of water followed by a solution of 2.34 g. of N-bromoacetamide in 60 ml. of tertiary butyl alcohol. After stirring the reaction mixture for 15 minutes, a solution of 2.8 g. of sodium sulfite in 140 ml. of water is added and the reaction mixture is concentrated to a volume of about 500 ml. under reduced pressure at about 50° C. The concentrate is cooled in an ice bath and while stirring 500 ml. of water is added. After stirring for a period of one hour, the precipitated product is isolated by filtration, and the cake washed with water and air-dried to give 6α-fluoro-9α-bromo-11β,17α,21-trihydroxy - 16α - methyl - 1,4 - pregnadiene-3,20-dione 21-acetate.

In the same manner, substituting 6α-fluoro-16β-methyl-17α,21 - dihydroxy-1,4,9(11)-pregnatriene-3,20-dione 21-acetate for 6α-fluoro-16α-methyl-17α,21-dihydroxy-1,4,9-(11)-pregnatriene-3,20-dione 21-acetate is productive of 6α-fluoro-9α-bromo-11β,17α,21-trihydroxy - 16β - methyl-1,4-pregnadiene-3,20-dione 21-acetate.

PREPARATION 17D²

6α-Fluoro-9α-Bromo-11β,17α,21-Trihydroxy-16-Methyl-4-Pregnene-3,20-Dione 21-Acetate Following the procedure of Preparation 16D² but substituting 6α-fluoro-16β-methyl- and 6α-fluoro-16α-methyl-17α,21-dihydroxy-4,9(11)-pregnadiene - 3,20 - dione 21-acetate as the starting compounds, there are thus produced 6α-fluoro - 9α - bromo-11β,17α,21-trihydroxy-16β-methyl- and 6α-fluoro-9α-bromo-11β,17α,21-trihydroxy-16α-methyl-4-pregnene-3,20-dione 21-acetate.

Substituting N-chlorosuccinimide for the N-bromoacetamide in the reactions described in Preparations 16D² and 17D², is productive of the corresponding 9α-chloro compounds, 6α - fluoro-9α-chloro-11β,17α,21-trihydroxy-16α - methyl-1,4-pregnadiene-3,20-dione 21-acetate and 6α-fluoro-9α-chloro-11β,17α,21-trihydroxy - 16α - methyl-4-pregnene-3,20-dione 21-acetate (and the corresponding 16β-methyl compounds thereof).

PREPARATION 18D²

6α-Fluoro-9β,11β-Epoxy-17α,21-Dihydroxy-16-Methyl-1,4-Pregnadiene-3,20-Dione 21-Acetate To a solution of 6.78 g. of 6α-fluoro-9α-bromo-11β,17α,21-trihydroxy - 16α - methyl - 1,4 - pregnadiene-3,20-dione 21-acetate in 175 ml. of acetone is added 6.78 g. of potassium acetate and the resulting suspension is heated under reflux for a period of 17 hours. The mixture is then concentrated to approximately 60 ml. volume at reduced pressure on the steam bath, diluted with water and extracted with methylene chloride. The methylene chloride extracts are combined, washed with water, dried over anhydrous sodium sulfate and evaporated. The residue is redissolved in methylene chloride and chromatographed over 500 g. of Florisil anhydrous magnesium silicate. The column is eluted with one-liter portions of commercial hexanes containing increasing proportions of acetone. Those fractions in the main chromatographic peak which move faster on papergram (benzene-formamide) than the starting material are combined and evaporated to give 6α-fluoro-9β,11β-epoxy-16α-methyl-17α,21-dihydroxy-1,4-pregnadiene-3,20-dione 21 - acetate which can be further purified, if desired, by recrystallization from acetone-commercial hexanes or ethyl acetate-commercial hexanes.

Following the procedure of Preparation 18D², but substituting 6α - fluoro-9α-bromo-11β,17α,21-trihydroxy-16β-methyl-1,4-pregnadiene-3,20-dione 21-acetate for 6α-fluoro-9α-bromo-11β,17α,21-trihydroxy-16β-methyl - 1,4-pregnadiene-3,20-dione 21-acetate is productive of 6α-fluoro-9β,11β-epoxy-16β-methyl - 17α,21 - dihydroxy-1,4-pregnadiene-3,20-dione 21-acetate.

PREPARATION 19D²

6α-Fluoro-9β,11β-Epoxy-16-Methyl-17α,21-Dihydroxy-4-Pregnene-3,20-Dione 21-Acetate Following the procedure of Preparation 18D², but substituting 6α - flouro - 9α - bromo - 11β,17α,21 - trihydroxy-16β-methyl- and 6α-fluoro-9α-bromo-11β,17α,21-trihydroxy - 16α - methyl - 4 - pregnene - 3,20 - dione 21-acetate as the starting compounds, there are thus produced 6α - fluoro - 9β,11β - epoxy - 16β - methyl- and 6α - fluoro - 9β,11β - epoxy - 16α - methyl - 17α,21-dihydroxy-4-pregnene-3,20-dion 21-acetate.

PREPARATION 20D²

6α,9α-Difluoro-11β,17α,21-Trihydroxy-16-Methyl-1,4-Pregnadiene-3,20-Dione 21-Acetate To approximately 1.3 g. of hydrogen fluoride contained in a polyethylene bottle and maintained at —60° C. is added 2.3 ml. of tetrahydrofuran and then a solution of 500 mg. (0.0012 mole) of 6α-fluoro-9β,11β-epoxy - 16α - methyl - 17α,21-dihydroxy - 1,4-pregnadiene-3,20-dione 21-acetate in 2 ml. of methylene chloride. The steroid solution is rinsed in with an additional 1 ml. of methylene chloride. The light red colored solution is then kept at approximately —30° C. for 1 hour and at —10° C. for 2 hours. At the end of this period it is mixed cautiously with an excess of cold sodium bicarbonate solution and the organic material is extracted with the aid of additional methylene chloride. The combined extracts are washed with water, dried over anhydrous sodium sulfate and concentrated to approximately 35 ml. The solution is chromatographed over 130 g. of Florisil anhydrous magnesium silicate. The column is developed with 260 ml. portions of commercial hexanes containing increasing proportions of acetone. Those fractions forming a chromatographic peak which, on papergram (benzene-formamide) analysis are more polar than the 9β,11β-epoxide are combined and concentrated to give 6α,9α-difluoro-11β,17α,21-trihydroxy-16α-methyl-1,4-pregnadiene-3,20-dione 21-acetate which can be further purified by crystallization from acetone-commercial hexanes or ethyl acetate-commercial hexanes.

In the same manner, substituting 6α-fluoro-9β,11β-epoxy - 16β - methyl - 17α,21 - dihydroxy - 1,4 - pregnadiene-3,20-dione 21-acetate for 6α-fluoro-9β,11β-epoxy-16α - methyl - 17α,21 - dihydroxy - 1,4 - pregnadiene-3,20-dione 21-acetate is productive of 6α,9α-difluoro-11β, 17α,21 - trihydroxy - 16β - methyl - 1,4 - pregnadiene-3,20-dione 21-acetate.

PREPARATION 21D²

6α,9α-Difluoro-11β,17α,21-Trihydroxy-16-Methyl-4-Pregnene-3,20-Dione 21-Acetate Following the procedure of Preparation 20D², but substituting 6α-fluoro-9β,11β-epoxy-16β-methyl- and 6α-fluoro - 9β,11β - epoxy - 16α - methyl - 17α,21 - dihydroxy-4-pregnene-3,20-dione 21-acetate as the starting compound, there is thus produced 6α,9α-difluoro-11β, 17α,21 - trihydroxy - 16β - methyl- and 6α,9α - difluoro-11β,17α,21 - trihydroxy - 16α - methyl - 4 - pregnene-3,20-dione 21-acetate.

PREPARATION 22D²

6α,9α-Difluoro-11β,17α,21-Trihydroxy-16-Methyl-1,4-Pregnadiene-3,20-Dione

Three and one-quarter (3.25) g. of 6α,9α-difluoro-11β, 17α,21 - trihydroxy - 16α - methyl - 1,4-pregnadiene-3,20-dione 21-acetate is dissolved in 325 ml. of methanol, previously purged of air-oxygen by passing nitrogen through it for 10 minutes and thereto is added a solution of 1.63 g. of potassium bicarbonate in 30 ml. of water, similarly purged of oxygen. The mixture is allowed to stand at room temperature for a period of 5 hours in a nitrogen atmosphere, and thereupon is neutralized with 2.14 ml. of acetic acid in 40 ml. of water. The mixture is concentrated to approximately one-third volume at reduced pressure on a 60° C. water-bath. Thereupon 250 ml. of water is added and the mixture chilled. The crystalline product is collected on a filter, washed with water and dried to give 6α,9α-difluoro-11β, 17α,21 - trihydroxy - 16α - methyl - 1,4-pregnadiene-3,20-dione. If desired, it can be recrystallized from acetone-commercial hexanes or ethyl acetate-commercial hexanes.

In the same manner, substituting 6α,9α-difluoro-11β, 17α,21 - trihydroxy - 16β - methyl - 1,4 - pregnadiene-3,20-dione 21-acetatae for 6α,9α-difluoro-11β,17α,21-trihydroxy - 16α - methyl - 1,4 - pregnadiene - 3,20 - dione 21 - acetate is productive of 6α,9α - difluoro-11β,17α, 21-trihydroxy-16β-methyl-1,4-pregnadiene-3,20-dione.

PREPARATION 23D²

6α,9α-Difluoro-11β,17α,21-Trihydroxy-16-Methyl-4-Pregnene-3,20-Dione

Following the procedure of Preparation 22D², but substituting 6α,9α-difluoro-11β,17α,21-trihydroxy-16β-methyl- and 6α,9α - difluoro - 11β,17α,21 - trihydroxy - 16α-methyl-4-pregnene-3,20-dione 21-acetate as the starting compounds, there are thus produced 6α,9α-difluoro-11β, 17α,21 - trihydroxy - 16β - methyl- and 6α,9α - difluoro-11β,17α,21 - trihydroxy - 16α - methyl - 4 - pregnene-3,20-dione.

Starting materials for the compounds of the formula

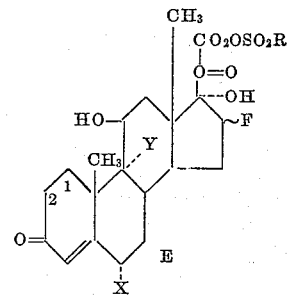

wherein R, X and Y have the same meaning as previously given:

PREPARATION 1Ea

3-Ethoxy-11-Keto-3,5,17(20)-[Cis]-Pregnatrien-21-Oic Acid Methyl Ester

A mixture of 10.0 g. of 3,11-diketo-4,17(20)-[cis]-pregnadien-21-oic acid methyl ester, 1.0 g. of p-toluenesulfonic acid monohydrate and 100 ml. of ethyl orthoformate was heated under reflux for one hour and then evaporated to dryness at reduced pressure. The semicrystalline residue was recrystallized from a mixture of methanol and pyridine to give 8.1 g. of 3-ethoxy-11-keto-3,5,17(20)-[cis]-pregnatrien-21-oic acid methyl ester melting at 146–149° C.

PREPARATION 1Eb

3,11-Diketo-6-Fluoro-4,17(20)-[Cis]-Pregnadien-21-Oic Acid Methyl Ester 40 g. of 3-ethoxy-11-keto-3,5,17(20)-[cis]-pregnatrien-21-oic acid methyl ester was dissolved in 400 ml. of pyridine and the solution cooled to —15° C. Perchloryl fluoride was bubbled through the solution for 5 minutes. The thus-obtained reaction mixture was poured into 600 ml. of concentrated hydrochloric acid containing 2 l. of ice and extracted with methylene chloride. The methylene chloride extract was washed successively with dilute hydrochloric acid and water and dried over anhydrous sodium sulfate. The thus-obtained solution was taken up in 1 l. of methylene chloride and poured onto a chromatographic column containing 1500 g. of Florisil (synthetic magnesium silicate). The chromatographic column was developed by eluting with commercial hexanes containing increasing proportions of acetone. Those fractions eluted with 9%, 12% and 15% acetone were combined and the solvent evaporated therefrom to yield 26 g. of a mixture containing 3,11-diketo-6β-fluoro and 3,11-diketo - 6α - fluoro-4,17(20)-[cis]-pregnadien-21-oic acid methyl ester which was used in Preparation 1Ec without further purification.

PREPARATION 1Ec

6α-Fluoro-11β,21-Dihydroxy-4,17(20)-[Cis]-Pregnadien-3-One 21-Acetate

A solution of 7.4 g. of a mixture of 3,11-diketo-6α-fluoro-4,17(20)-[cis]-pregnadien-21-oic acid methyl ester and 3,11 - diketo-6β-fluoro-4,17(20)-[cis]-pregnadien-21-oic acid methyl ester in 150 ml. of benzene and 3.2 ml. of pyrrolidine containing 140 mg. of p-toluenesulfonic acid was heated under reflux for 1 hour. The solvent was then distilled in vacuo and the thus-obtained residue was dissolved in 100 ml. of ether and added to 3.0 g. of lithium aluminum hydride in 200 ml. of ether. The thus-obtained mixture was heated under reflux with stirring, for 1 hour and then 25 ml. of ethyl acetate was added followed by the addition of 30 ml. of water. The organic layer was then decanted and evaporated to leave a residue which was dissolved in 300 ml. of methanol and 20 ml. of 5% sodium hydroxide solution. The temperature of the thus obtained methanolic solution was maintained at 60° C. for 30 minutes. Following adjustment of the solution to pH 7 with acetic acid, the solvent was distilled and the thus obtained residue was partitioned between methylene chloride and 5% hydrochloric acid. The organic layer was freed from water and evaporated. The thus obtained residue was dissolved in 10 ml. of acetic anhydride and 10 ml. of pyridine and maintained at ambient temperature for 17 hours. The reaction mixture was then poured into dilute hydrochloric acid and extracted with two 50-ml. portions of methylene chloride. The methylene chloride extracts were combined and evaporation of the solvent gave an oil which upon crystallization from ethyl acetate-commercial hexanes yielded 2.2 g. of 6α-fluoro-11β,21-dihydroxy - 4,17(20) - [cis]-pregnadien-3-one 21-acetate having a melting point of 182–186° C.

PREPARATION 1Ec'

6α-Fluoro-11β,21-Dihydroxy-4,17(20)-Pregnadien-3-one 21-Acetate

To 500 mg. of 6-fluoro-11β,21-dihydroxy-4,17(20)-[cis]-pregnadien-3-one 21-acetate, prepared according to the procedure disclosed in Example 6 of U.S. 2,838,532, there is added 100 ml. of chloroform and 2 ml. of ethanol. The solution is cooled to approximately −10° C. and then anhydrous hydrogen chloride gas is bubbled into the solution for several hours while maintaining the temperature of the solution at approximately −10° C. to 0° C. The solution thus obtained is washed with successive portions of water, saturated sodium bicarbonate solution and water, dried over sodium sulfate and then the solvent is removed under reduced pressure leaving a residue. The residue is purified by chromatography over a Florisil (synthetic magnesium silicate) column, using commercial hexanes containing increasing amounts of acetone to elute the column, followed by recrystallization from acetone-commercial hexanes to give 6α-fluoro-11β,21-dihydroxy-4,17(20)-pregnadien-3-one 21-acetate, a crystalline solid.

PREPARATION 2Ea

6α-Fluoro-11β,21-Dihydroxy-1,4,17(20)-Pregnatrien-3-One

Five 100-ml. portions of a medium, in 250-ml. Erlenmeyer flasks, containing 1% glucose, 2% corn steep liquor (60% solids) and tap water, are adjusted to a pH of 4.9. This medium is sterilized for 45 minutes at 15 pounds per square inch pressure and inoculated with a 1 to 2 day vegetative growth of Septomyxa affinis A.T.C.C. 6737. The Erlenmeyer flasks are shaken at room temperature (about 26 to 28° C.) for a period of 3 days. At the end of this period this 500-ml. volume is used as an inoculum for 10 l. of the same glucose-corn steep liquor medium which in addition contains 5 ml. of an antifoam compound (a mixture of lard oil and octadecanol). The fermentor is placed into the water-bath, adjusted to 28° C. and the contents stirred thoroughly (300 r.p.m.) and aerated (0.1 l. of air per minute to 10 l. of beer). After 20 hours of incubation, when a good growth has been developed, 1 g. of 6α-fluoro-11β,21-dihydroxy-4,17(20)-pregnadien-3-one 21-acetate plus 0.5 g. of 3-ketobisnor-4-cholen-22-al dissolved in 16 ml. of dimethylformamide is added and the incubation carried out at the same temperature (28° C.) and aeration for a period of 72 hours (final pH 8.3). The mycelium is filtered off and extracted with three 200-ml. portions of acetone. The beer is extracted with three 1-liter portions of methylene chloride and thereupon the acetone extracts and the extracts of the beer are combined, dried over anhydrous sodium sulfate and evaporated. The resulting residue is purified by chromatography over a Florisil (synthetic magnesium silicate) chromatographic column using commercial hexanes containing increasing amounts of acetone to elute the column, followed by recrystallization from acetone-commercial hexanes to give 6α-fluoro-11β,21-dihydroxy-1,4,17(20)-pregnatrien-3-one, a crystalline solid.

Substituting species of other genera such as Corynebacterium, Didymella, Calonectria, Alternaria, Colletotrichum, Cylindrocarpon, Ophilbolus, Fusarium, Listeria, Erysipelothrix, Mycobacterium, Tricothecium, Leptosphaeria, Cucurbitaria, Nocardia, and enzymes of fungi of the family Tuberculariaceae for Septomyxa is productive of 6α-fluoro-11β,21-dihydroxy-1,4,17(20)-pregnatrien-3-one.

PREPARATION 2Eb

6α-Fluoro-11β,21-Dihydroxy-1,4,17(20)-Pregnatrien-3-One 21-Acetate

A solution is prepared containing 50 mg. of 6α-fluoro-11β,21-dihydroxy-1,4,17(20)-pregnatrien-3-one in 1 ml. of pyridine and 1 ml. of acetic anhydride. The solution is allowed to stand at room temperature for a period of about 21 hours and is thereupon poured into ice water to give crystals of 6α-fluoro-11β,21-dihydroxy-1,4,17(20)-pregnatrien-3-one 21-acetate, which is purified by recrystallization from acetone-commercial hexanes.

PREPARATION 3E

11β,16α,21-Trihydroxy-1,4,17(20)-Pregnatrien-3-One 21-Acetate

A mixture of 9.8 g. (0.0264 mol.) of 11β,21-dihydroxy-1,4,17(20)-pregnatrien-3-one 21-acetate, prepared according to the procedure disclosed in Example 10 of U.S. Patent 2,902,410, 2.76 g. (0.0248 mol.) of selenium dioxide, 33 ml. of water and 150 ml. of dioxane was heated at reflux for approximately 1 hour with stirring. The thus-obtained reaction mixture comprising 11β,16α,21-trihydroxy-1,4,17(20)-pregnatrien-3-one 21-acetate was then cooled in an ice bath to about 25° C. 5.0 g. of a filter aid (synthetic magnesium silicate) was added to the cooled reaction mixture, stirred for about 15 minutes and filtered under vacuum through a synthetic magnesium silicate mat. The filtrate was added to 900 ml. of methylene chloride, followed by washing with four 200 ml. portions of water. The organic phase was then filtered and evaporated to a volume of about 100 ml. and poured onto an 800 g. Florisil (synthetic magnesium silicate) chromatographic column packed in commercial hexanes. The chromatographic column was developed by eluting with commercial hexanes containing increasing amounts of acetone. The eluate fractions were freed of solvent and those fractions eluted with commercial hexanes containing 20 to 25% acetone were combined and recrystallized from acetone-commercial hexanes to give 6.74 g. of product melting at 178–181° C. Four additional recrystallizations from acetone-commercial hexanes gave 11β,16α,21-trihydroxy-1,4,17(20)-pregnatrien-3-one 21-acetate having a melting point of 179–181° C., $[\alpha]_D$ +83° (CHCl$_3$), $$\lambda^{EtOH}_{max.} \ 243 \ m\mu$$

$a_M$ 15,600, and the following analysis:

*Analysis.*—Calcd. for $C_{23}H_{30}O_6$: C, 71.48; H, 7.82. Found: C, 71.68; H, 8.07.

In the same manner substituting a stoichiometric equivalent amount of 11β,21-dihydroxy-4,17(20)-pregnadien-3-one 21-acetate, 6α-fluoro-11β,21-dihydroxy-4,17(20)-pregnadien-3-one 21-acetate, prepared according to Preparation 1E above, 6α-fluoro-11β,21-dihydroxy-1,4,17-(20)-pregnatrien-3-one 21-acetate, prepared according to Preparation 2Ea and 2Eb above, 6α-methyl-11β,21-dihydroxy-4,17(20)-pregnadien-3-one 21-acetate, and 6α-methyl-11β,21-dihydroxy-1,4,17(20)-pregnatrien-3-one 21-acetate, prepared according to the procedure disclosed by Spero et al., JACS, 78, 6213 (1956), for 11β,21-dihydroxy-1,4,17(20)-pregnatrien-3-one 21-acetate is productive of the 21-acetate of 11β,16α,21-trihydroxy-4,17(20)-pregnadien-3-one,
6α-fluoro-11β,16α,21-trihydroxy-4,17(20)-pregnadien-3-one,
6α-fluoro-11β,16α,21-trihydroxy-1,4,17(20)-pregnatrien-3-one,
6α-methyl-11β,16α,21-trihydroxy-4,17(20)-pregnadien-3-one, and
6α-methyl-11β,16α,21-trihydroxy-1,4,17(20)-pregnatrien-3-one, respectively.

PREPARATION 4Ea

*20α-Chloro-11β,21-Dihydroxy-1,4,16-Pregnatrien-3-One 21-Acetate*

To a stirred solution of 965 mg. (0.0025 mol.) of 11β,16α,21-trihydroxy-1,4,17(20)-pregnatrien-3-one 21-acetate, 100 ml. of methylene chloride and 556 mg. (0.003 mol.) of tri-n-butylamine at approximately 0° C. there was added dropwise over a 5 minute period, with continuous stirring, 393 mg. (0.24 mol.) of thionyl chloride dissolved in 25 ml. of methylene chloride whilst maintaining the temperature at 0° C. The thus-obtained reaction mixture comprising the 20α and 20β epimeric forms of 20-chloro-11β,21-dihydroxy-1,4,16-pregnatrien-3-one 21-acetate was stirred for 1 hour at 0° C. followed by washing with three 20 ml. portions of dilute hydrochloric acid and four 50 ml. portions of water. The washed reaction mixture was then filtered and the filtrate obtained was evaporated to a volume of about 25 ml. and poured onto an 80 g. Florisil chromatographic column packed wet in commercial hexanes. The chromatographic column was developed by eluting with commercial hexanes containing increasing amounts of acetone. The eluate fractions were freed of solvent and those fractions eluted with commercial hexanes containing 9 to 12% acetone were combined. Two recrystallizations from acetone-commercial hexanes gave 700 mg. of 20α-chloro-11β,21-dihydroxy-1,4,16-pregnatrien-3-one 21-acetate having a melting point of 160–161° C., $$\lambda_{max.}^{EtOH}\ 242\ m\mu$$

$a_M$ 15,500 and the following analysis:
*Analysis.*—Calcd. for $C_{23}H_{29}ClO_4$: C, 68.22; H, 7.22; Cl, 8.76. Found: C, 68.17; H, 7.32; Cl, 8.88.

20β-chloro-11β,21-dihydroxy-1,4,16-pregnatrien-3-one 21-acetate is present in the mother liquors and can be recovered by further chromatography or countercurrent distribution, followed by crystallization.

In the same manner, substituting a stoichiometric equivalent amount of the 21-acetate of 11β,16α,21-trihydroxy-4,17(20)-pregnadien-3-one,
6α-fluoro-11β,16α,21-trihydroxy-4,17(20)-pregnadien-3-one,
6α-fluoro-11β,16α,21-trihydroxy-1,4,17(20)-pregnatrien-3-one,
6α-methyl-11β,16α,21-trihydroxy-4,17(20)-pregnadien-3-one, and
6α-methyl-11β,16α,21-trihydroxy-1,4,17(20)-pregnatrien-3-one, for 11β,16α,21-trihydroxy-1,4,17(20)-pregnatrien-3-one 21-acetate is productive of the 21-acetate of 20α-chloro-11β,21-dihydroxy-4,16-pregnadien-3-one,
6α-fluoro-20α-chloro-11β,21-dihydroxy-4,16-pregnadien-3-one,
6α-fluoro-20α-chloro-11β,21-dihydroxy-1,4,16-pregnatrien-3-one,
6α-methyl-20α-chloro-11β,21-dihydroxy-4,16-pregnadien-3-one, and
6α-methyl-20α-chloro-11β,21-dihydroxy-1,4,16-pregnatrien-3-one, respectively.

The mixture of the 20α and 20β epimeric forms of the 20-chloro compounds described in the preparation can be used in Preparation 5E without further treatment.

PREPARATION 4Eb

*20α-Bromo-11β,21-Dihydroxy-1,4,16-Pregnatrien-3-One 21-Acetate*

To stirred solution of 965 mg. (0.0025 mol.) of 11β,16α,21-trihydroxy-1,4,17(20)-pregnatrien-3-one 21-acetate, 100 ml. of methylene chloride and 556 mg. (0.003 mol.) of tri-n-butylamine at approximately 0° C. there was added dropwise over a 5 minute period, with continuous stirring, 500 mg. (0.24 mol.) of thionyl bromide dissolved in 25 ml. of methylene chloride whilst maintaining the temperature at 0° C. The thus-obtained reaction mixture comprising the 20α and 20β epimeric forms of 20-bromo-11β,21-dihydroxy-1,4,16-pregnatrien-3-one 21-acetate was stirred for 1 hour at 0° C. followed by washing with three 20 ml. portions of dilute hydrochloric acid and four 50 ml. portions of water. The washed reaction mixture was then filtered and the filtrate obtained was evaporated to a volume of about 25 ml. and poured onto an 80 g. Florisil chromatographic column packed in commercial hexanes. The chromatographic column was developed by eluting with acetone-commercial hexanes containing increasing amounts of acetone. The eluate fractions were freed of solvent and those fractions eluted with commercial hexanes containing 9 to 12% acetone were combined and recrystallized from acetone-commercial hexanes to give 20α-bromo-11β,21-dihydroxy-1,4,16-pregnatrien-3-one 21-acetate, an analytical sample of which had a melting point of 138.5–139.5° C., $$\lambda_{max.}^{EtOH}\ 242\ m\mu$$

$a_M$ 17,300 and the following analysis:
*Analysis.*—Calcd. for $C_{23}H_{29}BrO_4$: C, 61.47; H, 6.50; Br, 17.78. Found: C, 61.88; H, 6.82; Br, 17.78.

20β-bromo-11β,21dihydroxy-1,4,16-pregnatrien-3-one 2-acetate is present in the mother liquors and can be recovered by further chromatography or countercurrent extraction, followed by crystallization.

In like manner, substituting a stoichiometric equivalent amount of the 21-acetate of 11β,16α,21-trihydroxy-4,17(20)-pregnadien-3-one
6α-fluoro-11β,16α,21-trihydroxy-4,17(20)-pregnadien-3-one,
6α-fluoro-11β,16α,21-trihydroxy-1,4,17(20)-pregnatrien-3-one,
6α-methyl-11β,16α,21-trihydroxy-4,17(20)-pregnadien-3-one, and
6α-methyl-11β,16α,21-trihydroxy-1,4,17(20)-pregnatrien-3-one, for 11β,16α,21-trihydroxy-1,4,17(20)-pregnatrien-3-one 21-acetate is productive of the 21-acetate of 20α-bromo-11β,21-dihydroxy-4,16-pregnadien-3-one,
6α-fluoro-20α-bromo-11β,21-dihydroxy-4,16-pregnadien-3-one,
6α-fluoro-20α-bromo-11β,21-dihydroxy-1,4,16-pregnatrien-3-one,
6α-methyl-20α-bromo-11β,21-dihydroxy-4,16-pregnadien-3-one, and 6α-methyl-20α-bromo-11β,21-dihydroxy-1,4,16 - pregnadien-3-one, respectively.

The mixture of the 20α and 20β epimeric forms of the 20-bromo compounds described in this preparation can be used in Preparation 5E without further treatment.

PREPARATION 5E

*11β-Hydroxy-20β,21-Epoxy-1,4,16-Pregnatrien-3-One*

To a solution of 2.03 g. (0.005 mol.) of 20α-chloro-11β,21-dihydroxy-1,4,16-pregnatrien-3-one 21-acetate and 100 ml. of methanol cooled in an ice bath there was added, with vigorous swirling over about a 2 minute period, 100 ml. of 0.1 N sodium hydroxide solution. After standing in the ice bath for an additional 5 minutes, the reaction mixture was filtered and the white crystalline precipitate thus obtained was collected and dried to yield 1.57 g. of a product comprising 11β-hydroxy-20β,21-epoxy-1,4,16-pregnatrien-3-one having a melting point of 193–203° C. The thus-obtained white crystalline product was then dissolved in about 25 ml. of ethylene dichloride and poured onto a 120 g. Florisil chromatographic column packed in commercial hexanes. The chromatographic column was developed by eluting with commercial hexanes containing increasing amounts of acetone. The eluate fractions were freed of solvent and those fractions in a chromatographic peak which gave a negative Beilstein test were recrystallized 3 times from acetone-commercial hexanes to give 11β-hydroxy-20β,21-epoxy-1,4,16-pregnatrien-3-one melting at 205–215° C. Three additional recrystallizations from methanol did not raise the melting point of the 11β-hydroxy-20β,21-epoxy-1,4,16-pregnatrien-3-one which, following the methanol recrystallizations had a $\lambda_{max.}^{EtOH}$ 242.5 mμ

$a_M$ 14,950, and the following analysis:

*Analysis.*—Calcd. for $C_{21}H_{26}O_3$: C, 77.27; H, 8.03. Found: C, 76.99; H, 8.05.

In the same manner, substituting a stoichiometric equivalent amount of 20α-bromo-11,21-dihydroxy-1,4,16-pregnatrien-3-one 21-acetate for 20α-chloro-11β,21-dihydroxy-1,4,16-pregnatrien-3-one 21-acetate is productive of 11β-hydroxy-20β,21-epoxy-1,4,16-pregntrien-3-one.

In the same manner, substituting a stoichiometric equivalent amount of the 21-acetate of 20α-bromo- or 20α-chloro-11β,21-dihydroxy-4,16-pregnadien-3-one, 6α-fluoro-20α-bromo- or 6α-fluoro-20α-chloro-11β,21-dihydroxy-4,16-pregnadien-3-one, 6α-fluoro-20α-bromo- or 6α-fluoro-20α-chloro-11β,21-dihydroxy-1,4,16-pregnatrien-3-one, 6α-methyl-20α-bromo- or 6α-methyl-20α-chloro-11β,21-dihydroxy-4,16-pregnadien-3-one, and 6α-methyl-20α-bromo- or 6α-methyl-20α-chloro-11β,21-dihydroxy-1,4,16-pregnatrien-3-one, for 20α-chloro-11β,21-dihydroxy-1,4,16-pregnatrien-3-one 21-acetate is productive of 11β-hydroxy-20β,21-epoxy-4,16-pregnadien-3-one, 6α-fluoro-11β-hydroxy-20β,21-epoxy-4,16-pregnadien-3-one, 6α-fluoro-11β-hydroxy-20β,21-epoxy-1,4,16-pregnatrien-3-one, 6α-methyl-11β-hydroxy-20β,21-epoxy-4,16-pregnadien-3-one, and 6α-methyl-11β-hydroxy-20β,21-epoxy-1,4,16-pregnatrien-3-one, respectively.

In the same manner, substituting the mixed 20α and 20β epimeric forms of the 20-chloro or 20-bromo compounds described in Preparation 4Ea and 4Eb, respectively, is productive of a mixture comprising the 20α,21-epoxy compounds, otherwise corresponding to the 20β,21-epoxy compounds described above, and the 20β,21-epoxy compounds. This mixture comprising the 20α,21-epoxy and 20β,21-epoxy compounds can be used in Preparation 6E without further treatment.

PREPARATION 6E

*16α - Fluoro-11β,21-Dihydroxy-1,4,17(20)-Pregnatrien-3-One, 16β-Fluoro-11β,21-Dihydroxy-1,4,17(20)-Pregnatrien-3-One, 20α-Fluoro-11β,21-Dihydroxy-1,4,16-Pregnatrien-3-One and 20β-Fluoro - 11β,21 - Dihydroxy-1,4,16-Pregnatrien-3-One*

500 ml. of methylene chloride and 108 g. (1.5 mol.) of tetrahydrofuran were placed in a gallon polyethylene bottle. The bottle was flushed with nitrogen, cooled in a Dry Ice-aceton bath to about —60° C. and 60 g. (3.0 mol.) of anhydrous hydrogen fluoride were added thereto. A solution containing 19.4 g. (0.06 mol.) of 11β-hydroxy - 20β,21 - epoxy-1,4,16-pregnatrien-3-one (4) dissolved in 2 l. of methylene chloride, which had previously been cooled to about —60° C., was poured into the methylene chloride-tetrahydrofuran-hydrofluoric acid solution. The reaction mixture was swirled, and then placed in an ice bath and kept at about 0° C. for about 4 hours. The reaction mixture was then cooled to about —50° C. and poured into a stirred solution of 414 g. (3.0 mol.) of potassium carbonate dissolved in 2 l. of water. After stirring for approximately 15 minutes, the reaction mixture was allowed to stand and phase separation into an organic (methylene chloride) and aqueous phase occurred. The organic (methylene chloride) phase was separated and the aqueous phase extracted with three 200 ml. portions of methylene dichloride. These organic (methylene chloride) extracts were combined with the first organic (methylene chloride) extract, washed once with 200 ml. of water, filtered and evaporated to dryness leaving 22 g. of a white solid residue comprising 16α-fluoro-11β,21-dihydroxy-1,4,17(20)-pregnatrien-3-one, 16β-fluoro-11β,21-dihydroxy-1,4,17(20--pregnatrien-3-one, 20α-fluoro-11β,21-dihydroxy-1,4,16-pregnatrien-3-one, and 20β-fluoro-11β,21-dihydroxy-1,4,16-pregnatrien-3-one.

In the same manner, substituting a stoichiometric equivalent amount of

11β-hydroxy-20β,21-epoxy-4,16-pregnadien-3-one,

6α-fluoro-11β-hydroxy-20β,21-epoxy-4,16-pregnadien-3-one,

6α-fluoro-11β-hydroxy-20β,21-epoxy-1,4,16-pregnatrien-3-one,

6α-methyl-11β-hydroxy-20β,21-epoxy-4,16-pregnadien-3-one, and

6α-methyl-11β-hydroxy-20β,21-epoxy-1,4,16-pregnatrien-3-one, for 11β-hydroxy-20β,21-epoxy-1,4,16-pregnatrien-3-one is productive of a product comprising 16β-fluoro- and 16α-fluoro-11β,21-dihydroxy-4,17(20)-pregnadien-3-one (and 20β-fluoro- and 20β-fluoro-11β,21-dihydroxy-4,16-pregnadien-3-one), 6α,16β-difluoro- and 6α,16α-difluoro-11β,21-dihydroxy-4,17(20)-pregnadien-3-one (and 6α,20β-difluoro- and 6α,20α-difluoro - 11β,21 - dihydroxy-4,16-pregnadien-3-one), 6α,16β-difluoro- and 6α,16α-difluoro-11β,21-dihydroxy-1,4,17(20)-pregnatrien-3-one (and 6α,20β-difluoro- and 6α,20α-difluoro - 11β,21 - dihydroxy-1,4,16-pregnatrien-3-one), 6α-methyl-16β-fluoro- and 6α-methyl-16α-fluoro-11β,21-dihydroxy-4,17(20)-pregnadien-3-one (and 6α-methyl-20β-fluoro- and 6α-methyl - 20α - fluoro-11β,21-dihydroxy-4,16-pregnadien-3-one), and 6α-methyl-16β-fluoro- and 6α-methyl-16α-fluoro-11β,21-dihydroxy-1,4,17(20)-pregnatrien-3-one (and 6α-methyl-20β-fluoro- and 6α-methyl-20α-fluoro-11β,21-dihydroxy-1,4,16-pregnatrien-3-one), respectively.

In the same manner, substituting the mixture comprising the 20α,21-epoxy and 20β,21-epoxy compounds described in Preparation 5E is productive of a mixture comprising the 16α-fluoro, 16β-fluoro, 20α-fluoro and 20β-fluoro compounds described in this example.

PREPARATION 7E

*16α - Fluoro-11β,21-Dihydroxy-1,4,17(20)-Pregnatrien-3-One 21 - Acetate, 16β - Fluoro - 11β,21 - Dihydroxy-1,4,17(20)-Pregnatrien-3-One 21-Acetate, 20α-Fluoro-11β,21-Dihydroxy-1,4,16-Pregnatrien-3-One 21 Acetate and 20β-Fluoro-11β,21-Dihydroxy-1,4,16-Pregnatrien-3-One 21-Acetate*

To the white solid residue (22 g.) comprising

16α-fluoro-11β,21-dihydroxy-1,4,17(20)-pregnatrien-3-one,

16β-fluoro-11β,21-dihydroxy-1,4,17(20)-pregnatrien-3-one,

20α-fluoro-11β,21-dihydroxy-1,4,16-pregnatrien-3-one and

20β-fluoro-11β,21-dihydroxy-1,4,16-pregnatrien-3-one, obtained in Preparation 6E, there was added 140 ml. of acetic anhydride and 140 ml. of pyridine. After standing at about 25° C. for about 18 hours, the reaction mixture was poured into 2 l. of ice water, stirred for about 15 minutes and then extracted with three 200 ml. portions of methylene chloride. The methylene chloride extracts were combined, washed with two 200 ml. portions of water, filtered, and evaporated to dryness yielding 22 g. of a white solid residue comprising 16α-fluoro-11β,21-dihydroxy-1,4,17(20)-pregnatrien-3-one 21-acetate, 16β-fluoro-11β,21-dihydroxy-1,4,17(20)-pregnatrien-3-one 21-acetate, 20α-fluoro-11β,21-dihydroxy-1,4,16-pregnatrien-3-one 21-acetate and 20β-fluoro-11β,21-dihydroxy-1,4,16-pregnatrien-3-one 21-acetate.

Several residues obtained according to the reaction described immediately above were combined and 33.5 g. of the combined residue comprising 16α-fluoro-11β,21-dihydroxy-1,4,17(20)-pregnatrien - 3 - one 21-acetate, 16β-fluoro - 11β,21 - dihydroxy-1,4,17(20)-pregnatrien-3-one 21-acetate, 20α-fluoro - 11β,21 - dihydroxy-1,4,16-pregnatrien - 3 - one 21-acetate and 20β-fluoro-11β,21-dihydroxy-1,4,16-pregnatrien - 3 - one 21-acetate was taken up in 100 ml. of methylene chloride and poured onto a 2 kg. Florisil chromatographic column packed in commercial hexanes. The chromatographic column was developed by eluting with a constant concentration of acetone-commercial hexanes (8:92, by volume). The eluate fractions were freed of solvent. Those fractions which papergram analysis showed to contain the 20α-fluoro, 20β-fluoro, 16α-fluoro and 16β-fluoro compounds were dissolved in methylene chloride and poured onto a second Florisil chromatographic column and the chromatographic column was developed by eluting with a constant concentration of acetone-commercial hexanes (8:92, by volume). The eluate fractions were freed of solvent and those fractions which papergram analysis showed to contain mostly the 16-fluoro compounds (the 16α-fluoro epimer predominating) were combined. A portion of the combined fractions was recrystallized from ethyl acetate to yield an analytical sample of 16α-fluoro-11β,21-dihydroxy - 1,4,17(20) - pregnatrien-3-one 21-acetate, having a melting point of 190–191° C., $$\lambda_{max.}^{EtOH}\ 242.5\ m\mu$$

$a_M$ 15,300 and the following analysis:

*Analysis.*—Calcd. for $C_{23}H_{29}FO_4$: C, 71.11; H, 7.52; F, 4.89. Found: C, 71.21; H, 7.84; F, 4.77.

16β-fluoro - 11β,21 - dihydroxy-1,4,17(20)-pregnatrien-3-one 21-acetate is present in the mother liquor following the crystallization of 16α - fluoro - 11β,21-dihyroxy 1,4,17(20)-pregnatrien-3-one 21-acetate and can be recovered by further chromatography and/or crystallization.

The remainder of the combined fractions, which contain a mixture of 16β- and 16α-fluoro-11β,21-dihydroxy-1,4,17(20)-pregnatrien-3-one 21-acetate (the 16α epimer predominating), from the second column was used in the following example without purification.

In the same manner, substituting a stoichiometric equivalent amount of products comprising 16β-fluoro- and 16α-fluoro - 11β,21 - dihydroxy-4,17(20)-pregnadien-3-one (and 20β-fluoro- and 20α-fluoro-11β,21-dihydroxy-4,16-pregnadien-3-one), 6α,16β-difluoro- and 6α,16α-difluoro-11β,21-dihydroxy-4,17(20)-pregnadien - 3 - one (and 6α,20β-difluoro- and 6α,20α-difluoro - 11β,21 - dihydroxy-4,16-pregnadien-3-one), 6α,16β-difluoro- and 6α,16α-difluoro - 11β,21 - dihydroxy-1,4,17(20)-pregnatrien - 3 - one (and 6α,20β-difluoro- and 6α,20α-difluoro - 11β,21 - dihydroxy-1,4,16-pregnatrien-3-one), 6α-methyl - 16β - fluoro- and 6α-methyl-16α-fluoro-11β,21-dihydroxy-4,17(20)-pregnadiene - 3 - one (and 6α-methyl-20β-fluoro- and 6α-methyl - 20α - fluoro-11β,21-dihyroxy-4,16-pregnadien-3-one), and 6α-methyl - 16β - fluoro- and 6α-methyl-16α-fluoro-11β,21-dihydroxy-1,4,17(20)-pregnatrien - 3 - one (and 6α-methyl - 20β - fluoro- and 6α-methyl-20α-fluoro-11β,21-dihydroxy-1,4,16-pregnatrien-3-one), disclosed in Preparation 6E, for the product comprising 16β-fluoro- and 16α-fluoro-11β,21-dihydroxy-1,4,17(20)-pregnatrien-3-one and 20β-fluoro- and 20α-fluoro-11β,21-dihydroxy-1,4,16-pregnatrien - 3 - one and acetylating with acetic anhydride is productive of a product comprising the 21-acetate of 16β-fluoro- and 16α-fluoro-11β,21-dihydroxy-4,17(20)-pregnadien - 3 - one (and 20β-fluoro- and 20α-fluoro-11β,21-dihydroxy-4,16-pregnadien-3-one), 6α, 16β-difluoro- and 6α,16α-difluoro - 11β,21 - dihydroxy-4,17(20)-pregnadien - 3 - one (and 6α,20β-difluoro- and 6α,20α-difluoro - 11β,21 - dihydroxy 4,16-pregnadien-3-one), 6α,16β-difluoro- and 6α,16α-difluoro - 11β,21 - dihydroxy-1,4,17(20)-pregnatrien - 3 - one (and 6α,20β-difluoro- and 6α,20α-difluoro - 11β,21 - dihydroxy-1,4,16-pregnatrien-3-one), 6α-methyl-16β-fluoro- and 6α-methyl - 16α - fluoro-11β,21-dihydroxy-4,17(20)-pregnadien-3-one (and 6α-methyl-20β-fluoro- and 6α-methyl - 20α - fluoro-11β,21-dihydroxy-4,16-pregnadiene-3-one), and 6α - methyl - 16β - fluoro- and 6α-methyl-16α-fluoro-11β,21-dihydroxy - 1,4,17(20) - pregnatrien - 3 - one (and 6α-methyl - 20β - fluoro- and 6α-methyl-20α-fluoro-11β,21-dihydroxy-1,4,16-pregnatrien-3-one), respectively.

If desired, the above-described mixed products can be separated in the manner described above or according to other procedures known in the art.

PREPARATION 8E

*16α-Fluoro-11β,17α,21-Trihydroxy - 1,4 - Pregnadiene-3,20-Dione 21-Acetate and 16β-Fluoro - 11β,17α,21-Trihydroxy-1,4-Pregnadiene-3,20-Dione 21-Acetate*

4.3 g. (0.011 mol.) of the product comprising 16α-fluoro-11β,21-dihydroxy - 1,4,17(20) - pregnatrien-3-one 21-acetate and 16β-fluoro - 11β,21 - dihydroxy-1,4,17(20)-pregnatrien-3-one 21-acetate obtained from the second chromatographic column in Preparation 7E, 180 ml. of tertiary butanol, 5 ml. of pyridine, 43 ml. of a 2 mg./ml. tertiary butanol solution of osmium tetroxide and 13.7 ml.

of a 2 N tertiary butanol solution of N-methylmorpholine oxide hydrogen peroxide complex were stirred at about 28° C. for about 16 hours. There was then added to the reaction mixture about 100 ml. of a freshly prepared 1% solution of sodium hydrosulfite, followed by stirring for about 5 minutes and filtration through a synthetic magnesium silicate mat. The filtrate was then evaporated, under vacuum, while maintaining the temperature below 35° C., leaving a residue. The residue was taken up in about 200 ml. of methylene chloride, washed with two 50 ml. portions of dilute hydrochloric acid, two 50 ml. portions of water, filtered and evaporated to dryness yielding 4.1 g. of a crude product comprising 16α-fluoro-11β,17α,21-trihydroxy-1,4-pregnadiene-3,20-dione 21-acetate and 16β-fluoro-11β,17α,21-trihydroxy - 1,4 - pregnadiene-3,20-dione 21-acetate. The crude residual product was dissolved in about 100 ml. of methylene chloride and poured onto a first chromatographic column containing 300 g. of Florisil packed in commercial hexanes. The chromatographic column was developed by eluting with Skellysolve B hexanes containing increasing amounts of acetone. The eluate fractions were freed of solvent and analyzed by papergram analysis. Those fractions (eluted with 10% acetone in Skellysolve B hexanes) which papergram analysis showed to contain 16α-fluoro-11β,17α,21-trihydroxy-1,4-pregnadiene - 3,20 - dione 21-acetate were combined, dissolved in methylene chloride, and rechromatographed using a second chromatographic column containing 30 g. of Florisil packed in Skellysolve B hexanes. The second chromatographic column was developed by eluting with Skellysolve B hexanes containing increasing proportions of acetone. The eluate fractions from the second chromatographic column were freed of solvent and analyzed by papergram analysis. Those fractions which papergram analysis showed to contain the 16α fluoro epimer were combined and recrystallized from ethyl acetate-commercial hexanes to give 16α-fluoro-11β,17α,21-trihydroxy - 1,4 - pregnadiene-3,20-dione 21-acetate having a melting point of 219–220° C., $$\lambda_{max.}^{EtOH} 243 \; m\mu$$

$a_M$ 16,100 and the following analysis:

*Analysis.*—Calcd. for $C_{23}H_{29}FO_6$: C, 65.70; H, 6.95; F, 4.52. Found: C, 65.23; H, 7.01; F, 4.52.

Those fractions (eluted with 15% acetone in Skellysolve B hexanes) from the first chromatographic column which papergram analysis showed to contain a mixture of 16α-fluoro - 11β,17α,21 - trihydroxy-1,4-pregnadiene-3,20-dione 21-acetate and 16β-fluoro-11β,17α,21-trihydroxy-1,4-pregnadiene-3,20-dione 21-acetate were combined (160 mg.), dissolved in methylene chloride, and rechromatographed using a chromatographic column containing 12 g. of Florisil packed in commercial hexanes. The third chromatographic column was developed by eluting with commercial hexanes containing increasing proportions of acetone. The eluate fractions from the third chromatographic column were freed of solvent and analyzed by papergram analysis. Those fractions which papergram analysis showed to contain the 16β-epimer were combined and recrystallized from ethyl acetate-commercial hexanes to give 16β-fluoro-11β,17α,21-trihydroxy-1,4-pregnadiene-3,20-dione 21-acetate having a melting point of 174–177° C.

In the same manner, substituting a stoichiometric equivalent amount of a product comprising the 21-acetate of the 16α and 16β epimeric forms of 16-fluoro-11β,21-dihydroxy-4,17(20)-pregnadiene-3-one,
6α,16-difluoro - 11β,21 - dihydroxy-4,17(20)-pregnadien-3-one,
6α,16-difluoro - 11β,21 - dihydroxy-1,4,17(20)-pregnatrien-3-one,
6α-methyl - 16 - fluoro-11β,21-dihydroxy-4,17(20)-pregnadiene-3-one, and
6α-methyl - 16 - fluoro-11β,21-dihydroxy,1,4,17(20)-pregnatrien-3-one, is productive of the 16α and 16β epimeric forms of 16-fluoro-11β,17α,21-trihydroxy - 4 - pregnene-3,20-dione,
6α,16-difluoro - 11β,17α,21 - trihydroxy-4-pregnene-3,20-dione,
6α,16-difluoro - 11β,17α,21 - trihydroxy-1,4-pregnadiene-3,20-dione,
6α-methyl - 16 - fluoro-11β,17α,21trihydroxy - 4 - pregnene-3,20-dione, and
6α-methyl - 16 - fluoro-11β,17α,21-trihydroxy,1-4-pregnadiene-3,20-dione, respectively.

The 16α and 16β epimeric forms of these compounds can be separated from each other according to the procedure described above for the separation of 16α-fluoro-11β,17α,21-trihydroxy - 1,4 - pregnadiene-3,20-dione 21-acetate from 16β-fluoro - 11β,17α,21 - trihydroxy-1,4-pregnadiene-3,20-dione 21-acetate.

PREPARATION 9E

*16α-Fluoro - 17α,21 - Dihydroxy-1,4,9(11)-Pregnatriene-3,20-Dione 21-Acetate and 16β-Fluoro-11β,17α,21-Dihydroxy-1,4,9(11)-Pregnatriene-3,20-Dione 21-Acetate*

Following the procedure of Example 1 of U.S. Patent 2,838,499, substituting a stoichiometric equivalent amount of 16α-fluoro - 11β,17α,21 - trihydroxy-1,4-pregnadiene-3,20-dione 21-acetate for 1-dehydro-6α-fluorohydrocortisone acetate is productive of 16α-fluoro-17α,21-dihydroxy-1,4,9(11)-pregnatriene - 3,20-dione 21-acetate, a crystalline solid.

In the same manner, substituing 16β-fluoro-11β,17α,21-trihydroxy-1,4-pregnadiene - 3,20 - dione 21-acetate in the above example is productive of 16β-fluoro-17α,21-dihydroxy-1,4,9(11)-pregnatriene - 3,20 - dione 21-acetate, a crystalline solid.

In the same manner, substituting the 21-acetate of the 16α and 16β epimeric forms of 16-fluoro-11β,17α,21-trihydroxy-4-pregnene-3,20-dione,
6α,16-difluoro - 11β,17α,21 - trihydroxy-4-pregnene-3,20-dione,
6α,16-difluoro - 11β,17α,21 - trihydroxy-1,4-pregnadiene-3,20-dione,
6α-methyl - 16 - fluoro-11β,17α,21-trihydroxy-4-pregnene-3,20-dione, and
6α-methyl - 16 - fluoro-11β,17α,21-trihydroxy-1,4-pregnadiene-3,20-dione, disclosed in Preparation 8E is productive of the corresponding 21-acetate of the 16α and 16β epimeric forms of 16-fluoro-17α,21-dihydroxy-4,9(11)-pregnadiene - 3,20-dione,
6α,16-difluoro - 17α,21 - dihydroxy-4,9(11)-pregnadiene-3,20-dione,
6α,16-difluoro - 17α,21 - dihydroxy-1,4,9(11)-pregnatriene-3,20-dione,
6α-methyl - 16 - fluoro-17α,21-dihydroxy-4,9(11)-pregnadiene-3,20-dione, and
6α-methyl - 16 - fluoro-17α,21-dihydroxy-1,4,9(11)-pregnatriene-3,20-dione, respectively.

PREPARATION 10E

*16α - Fluoro - 9α - Bromo - 11β,17α,21 - Trihydroxy-1,4-Pregnadiene-3,20-Dione 21-Acetate and 16β-Fluoro-9α-Bromo-11β,17α,21-Trihydroxy - 1,4 - Pregnadiene-3,20-Dione 21-Acetate*

Following the procedure of Example 2 of U.S. Patent 2,838,499, substituting a stoichiometric equivalent amount of 16α-fluoro-17α,21-dihydroxy-1,4,9(11) - pregnatriene-3,20-dione 21-acetate for 6α-fluoro - 17α,21 - dihydroxy-1,4,9(11) - pregnatriene - 3,20-dione 21-acetate is productive of 16α-fluoro-9α-bromo - 11β,17α,21 - trihydroxy-1,4-pregnadiene-3,20-dione 21-acetate, a crystalline solid.

In the same manner, substituting 16β-fluoro-17α,21-dihydroxy - 1,4,9(11) - pregnatriene-3,20-dione 21-acetate in the above example is productive of 16β-fluoro-9α-bromo - 11β,17α,21 - trihydroxy - 1,4 - pregnadiene-3,20-dione 21-acetate, a crystalline solid.

Likewise, substituting the 21-acetate of the 16α and 16β epimeric forms of 16-fluoro - 17α,21 - dihydroxy-4,9(11)-pregnadiene-3,20-dione, 6α,16-difluoro-17α,21-dihydroxy-4,9(11) - pregnadiene - 3,20-dione, 6α,16-difluoro-17α,21-dihydroxy-1,4,9(11) - pregnatriene-3,20-dione, 6α-methyl-16-fluoro-17α,21-dihydroxy - 4,9(11) - pregnadiene-3,20-dione, and 6α-methyl-16-fluoro - 17α,21 - dihydroxy - 1,4,9(11)-pregnatriene-3,20-dione, disclosed in Preparation 9E, is productive of the corresponding 21-acetates of the 16α and 16β epimeric forms of 16-fluoro-9α-bromo-11β,17α,21-trihydroxy-4-pregnene - 3,20-dione, 6α,16-difluoro-9α-bromo-11β,17α,21 - trihydroxy-4-pregnene-3,20-dione, 6α,16-difluoro - 9α - bromo - 11β,17α,21 - trihydroxy-1,4-pregnadiene-3,20-dione, 6α-methyl-16-fluoro - 9α-bromo-11β,17α,21 - trihydroxy - 4 - pregnene-3,20-dione, and 6α-methyl-16-fluoro-9α-bromo - 11β,17α,21 - trihydroxy-1,4-pregnadiene-3,20-dione, respectively.

In the same manner, following the procedure of Example 2 of U.S. Patent 2,838,499, substituting another N-haloamide or an N-haloimide such as N-iodosuccinimide or N-chlorosuccinimide, is productive of the corresponding 9α-halo products.

PREPARATION 11E

*16α - Fluoro - 9β,11β - Epoxy - 17α,21 - Dihydroxy - 1,4-Pregnadiene-3,20-Dione 21-Acetate and 16β-Fluoro-9β, 11β-Epoxy-17α,21-Dihydroxy - 1,4 - Pregnadiene-3,20-Dione 21-Acetate*

Following the procedure of Example 3 of U.S. Patent 2,838,499, substituting a stoichiometric equivalent amount of 16α-fluoro - 9α - bromo - 11β,17α-21 - trihydroxy-1,4-pregnadiene - 3,20 - dione 21-acetate for 6α - fluoro - 9α-bromo - 11β,17α,21 - trihydroxy - 1,4 - pregnadiene-3,20-dione 21-acetate is productive of 16α-fluoro-9β,11β-epoxy-17α,21-dihydroxy - 1,4-pregnadiene-3,20-dione 21-acetate, a crystalline solid.

In the same manner, substituting 16β-fluoro-9α-bromo-11β,17α,21 - trihydroxy - 1,4 - pregnadiene-3,20-dione 21-acetate in the above example is productive of 16β-fluoro-9β,11β - epoxy - 17α,21 - dihydroxy-1,4-pregnadiene-3,20-dione 21-acetate, a crystalline solid.

In the same manner, substituting the 21-acetate of the 16α and 16β epimeric forms of 16-fluoro-9α-bromo-11β,17α,21-trihydroxy-4-pregnene - 3,20-dione, 6α,16-difluoro-9α-bromo - 11β,17α,21-trihydroxy-4-pregnene-3,20-dione, 6α,16-difluoro - 9α - bromo - 11β,17α,21 - trihydroxy-1,4-pregnadiene - 3,20-dione, 6α-methyl-16-fluoro-9α-bromo-11β,17α,21 - trihydroxy-4-pregnene - 3,20-dione, and 6α-methyl-16-fluoro-9α-bromo - 11β,17α,21 - trihydroxy-1,4-pregnadiene-3,20-dione, disclosed in Preparation 10E, is productive of the corresponding 21-acetate of the 16α and 16β epimeric forms of 16-fluoro-9β,11β-epoxy-17α,21-dihydroxy - 4 - pregnene-3,20-dione, 6α,16-difluoro-9β,11β-epoxy - 17α,21-dihydroxy-4-pregnene-3,20-dione, 6α-16-difluoro-9β,11β-epoxy - 17α,21 - dihydroxy-1,4-pregnadiene-3,20-dione, 6α-methyl-16-fluoro - 9β,11β-epoxy-17α, 21-dihydroxy-4-pregnene - 3,20-dione, and 6α-methyl-16-fluoro-9β,11β-epoxy-17α,21-dihydroxy - 1,4-pregnadiene-3,20-dione, respectively.

In the same manner, substituting the other 9α-halo products, obtained according to the procedure of Preparation 10E, in this example is productive of the 9β,11β-epoxy products described above.

PREPARATION 12E

*9α,16α-Difluoro-11β,17α,21-Trihydroxy - 1,4-Pregnadiene-3,20-Dione 21-Acetate and 9α,16β-Difluoro-11β,17α,21-Trihydroxy-1,4-Pregnadiene-3,20-Dione 21-Acetate*

Following the procedure of Example 4 of U.S. Patent 2,838,499, substituting a stoichiometric equivalent amount of 16α-fluoro-9β,11β-epoxy-17α,21-dihydroxy-1,4-pregnadiene-3,20-dione 21-acetate for 6α-fluoro-9β,11β-epoxy-17α,21-dihydroxy-1,4-pregnadiene-3,20-dione 21-acetate is productive of 9α,16α-difluoro - 11β,17α,21-trihydroxy-1,4-pregnadiene-3,20-dione 21-acetate, having a melting point of 265–268° C. and the following analysis:

*Analysis.*—Calcd. for $C_{23}H_{28}F_2O_6$: C, 63.00; H, 6.44; F, 8.67. Found: C, 62.61; H, 6.59; F, 8.60.

In the same manner, substituting 16β-fluoro-9β,11β-epoxy-17α,21-dihydroxy - 1,4-pregnadiene-3,20-dione 21-acetate in the above example is productive of 9α,16β-difluoro - 11β,17α,21 - trihydroxy - 1,4-pregnadiene-3,20-dione 21-acetate, a crystalline solid.

In the same manner, substituting the 21-acetate of the 16α and 16β epimeric forms of 16-fluoro-9β,11β-epoxy-17α,21-dihydroxy-4-pregnene - 3,20-dione, 6α,16-difluoro-9β,11β-epoxy - 17α,21 - dihydroxy-4-pregnene-3,20-dione, 6α,16 - difluoro - 9β,11β - epoxy - 17α,21 - dihydroxy-1,4-pregnadiene-3,20-dione, 6α-methyl - 16 - fluoro - 9β,11β-epoxy-17α,21-dihydroxy-4-pregnene - 3,20-dione, and 6α-methyl-16-fluoro-9β,11β - epoxy - 17α,21 - dihydroxy-1,4-pregnadiene-3,20-dione, disclosed in Preparation 11E, is productive of the corresponding 21-acetate, of the 16α and 16β epimeric forms of 9α,16-difluoro-11β,17α,21-trihydroxy-4-pregnene-3,20-dione, 6α,9α,16-trifluoro-11β,17α,21-trihydroxy - 4 - pregnene-3,20-dione, 6α,9α,16-trifluoro - 11β,17α,21 - trihydroxy - 1,4 - pregnadiene - 3,20-dione, 6α-methyl-9α,16-difluoro - 11β,17α,21 - trihydroxy-4-pregnene-3,20-dione, and 6α-methyl-9α,16-difluoro-11β,17α,21-trihydroxy - 1,4 - pregnadiene - 3,20-dione, respectively.

PREPARATION 13E

*16α - Fluoro - 11β,17α,21 - Trihydroxy-1,4-Pregnadiene-3, 20-Dione, 16β-Fluoro-11β,17α,21-Trihydroxy-1,4-Pregnadiene-3,20-Dione, 9α,16α-Difluoro-11β,17α,21-Trihydroxy-1,4-Pregnadiene-3,20-Dione and 9α,16β-Difluoro-11β,17α,21-Trihydroxy-1,4-Pregnadiene-3,20-Dione*

Following the procedure of Example 5 of U.S. Patent 2,838,499, substituting a stoichiometric equivalent amount of 16α-fluoro-11β, 17α,21-trihydroxy-1,4-pregnadiene-3,20-dione 21-acetate for 1-dehydro-6α,9α-difluorohydrocortisone acetate is productive of 16α-fluoro-11β,17α,21-trihydroxy-1,4-pregnadiene-3,20-dione.

In the same manner, substituting 9α,16α-difluoro-11β,17α,21 - trihydroxy-1,4-pregnadiene-3,20-dione 21-acetate in the above example is productive of 9α,16α-difluoro-11β,17α,21-trihydroxy-1,4-pregnadiene-3,20-dione.

In the same manner, substituting 16β-fluoro-11β,17α,21-trihydroxy-1,4-pregnadiene-3,20-dione 21-acetate and 9α,16β - difluoro - 11β,17α,21-trihydroxy-1,4-pregnadiene-3,20-dione is productive of 16β-fluoro-11β,17α,21-trihydroxy -·1,4 - pregnadiene-3,20-dione and 9α,16β-difluoro-11β,17α,21-trihydroxy-1,4-pregnadiene-3,20-dione.

In the same manner, substituting the 21-acetate of the 16α and 16β epimeric forms of 16-fluoro-11β,17α,21-trihydroxy - 4 - pregnene - 3,20-dione, 6α,16-difluoro-11β, 17α,21 - trihydroxy-4-pregnene-3,20-dione, 6α,16-difluoro-11β,17α,21 - trihydroxy - 1,4-pregnadiene-3,20-dione, 6α-methyl - 16-fluoro-11β,17α,21-trihydroxy-4-pregnene-3,20-dione, and 6α-methyl-16-fluoro-11β,17α,21-trihydroxy-1,4-pregnadiene-3,20-dione, the products of Preparation 8E, and 9α,16 - difluoro - 11β,17α,21-trihydroxy-4-pregnene-3, 20-dione, 6α,9α,16-trifluoro-11β,17α,21-trihydroxy-4-pregnene - 3,20-dione, 6α,9α16-trifluoro-11β17α,21-trihydroxy-1,4-pregnadiene-3,20-dione, 6α-methyl-9α,16-difluoro-11β,17α,21-trihydroxy-4-pregnene-3,20-dione, and 6α-methyl-9α,16 - difluoro - 11β,17α,21 - trihydroxy-1,4-pregnadiene- 3,20-dione, the products of Preparation 12E, is productive of the 16α and 16β epimeric forms of 16-fluoro-11β,17α,21 - trihydroxy-4-pregnene-3,20-dione, 6α,16-difluoro-11β,17α,21 - trihydroxy-4-pregnene-3,20-dione, 6α,16-difluoro-11β,17α,21 - trihydroxy - 1,4 - pregnadiene-3,20-dione 6α-methyl - 16-fluoro-11β,17α,21-trihydroxy-4-pregnene-3,20-dione, 6α - methyl - 16 - fluoro-11β,17α,21-trihydroxy-1,4-pregnadiene-3,20-dione, and 9α,16-difluoro-11β,17α,21-trihydroxy-4-pregnene-3,20-dione, 6α,9α,16-trifluoro-11β,17α,21-trihydroxy-4-pregnene-3,20-dione, 6α,9α,16-trifluoro - 11β,17α,21-trihydroxy-1,4-pregnadiene-3,20-dione, 6α-methyl - 9α,16-difluoro-11β,17α,21-trihydroxy-4-pregnene-3,20-dione, and 6α-methyl-9α,16-difluoro-11β,17α,21-trihydroxy-1,4-pregnadiene-3,20-dione, respectively.

Starting material for 9α-fluoro-11β17α,21-trihydroxy-16β-methyl-4-pregnene-3,20-dione 21-organic sulfonate:

9α - fluoro - 11β,17α,21 - trihydroxy-16β-methyl-4-pregnene-3,20-dione is obtained by treating 11β,17α,21-trihydroxy-16β-methyl-4-pregnene-3,20-dione 21-acetate according to the procedures described above for the production of 6α,9α - difluoro - 11β,17α,21-trihydroxy-16α-methyl-1,4-pregnadiene-3,20-dione, namely, by substituting 11β,17α,21-trihydroxy-16β-methyl-4-pregnene-3,20-dione 21-acetate for 6α-fluoro-11β,17α,21-trihydroxy-16α-methyl-1,4-pregnadiene-3,20-dione 21-acetate and following successively the procedures of Preparations 14D², 16D², 18D², 20D², and 22D².

Starting materials for 11β,17α,21-trihydroxy-16β-methyl-4-pregnene-3,20-dione 21-organic sulfonates and 9α-fluoro-11β,17α,21-trihydroxy-16β-methyl-1,4-pregnadiene-3,20-dione 21-organic sulfonates:

11β,17α,21 - trihydroxy-16β-methyl-4-pregnene-3,20-dione 21-acetate, prepared according to the procedure of Taub et al., JACS, 80, 4435 (1958), and 9α-fluoro-11β,17α,21 - trihydroxy - 16β - methyl-1,4-pregnadiene-3,20-dione 21-acetate, prepared according to the procedure of Oliveto et al., JACS, 80, 6687 (1958), are hydrolyzed according to procedures known in the art for the conversion of hydrocortisone 21-acetate to hydrocortisone or hydrocortisone 21-acetate type compounds to hydrocortisone type compounds (see, for example, Preparations 10B₁, 16D¹, 23D¹, 12D² and 22D²) to obtain 11β,17α,21-trihydroxy-16β-methyl-4-pregnene-3,20-dione and 9α-fluoro - 11β,17α,21 - trihydroxy - 16β-methyl-1,4-pregnadiene-3,20-dione.

EXAMPLES

Part A

EXAMPLE 1Aa

6α-Fluoro-11β,17α,21-Trihydroxy-1,4-Pregnadiene-3,20-Dione 21-Methanesulfonate (II)

1 g. of 6α-fluoro-11β,17α,21-trihydroxy-1,4-pregnadiene-3,20-dione (I) was dissolved in 10 ml. of pyridine by warming on a steam bath. The solution was cooled in an ice bath and 1 ml. of methanesulfonyl chloride was added thereto and the reaction mixture was allowed to stand in an ice bath for 4 hours. The reaction mixture was then poured into 100 ml. of iced 5% hydrochloric acid solution and yielded a crystalline solid which was isolated by filtration, washed with water, and dried to give 1.097 g. of product having a melting point of 183–190° C. (dec.). Recrystallization from methanol yielded 6α-fluoro - 11β,17α,21-trihydroxy-1,4-pregnadiene-3,20-dione 21-methanesulfonate (II) having a melting point of 185–189° C. (dec.), [α]$_D$ +88° (acetone), $\lambda_{max.}^{alc.}$ 242 mμ

ε 16,350, and the analysis below.

*Analysis.*—Calcd. for C$_{22}$H$_{29}$O$_7$SF: C, 57.88; H, 6.40; S, 7.02; F, 4.16. Found: C, 58.0; H, 6.62; S, 7.10; F, 4.27.

In the same manner, reacting 6α-fluoro-11β,17α,21-trihydroxy-1,4-pregnadiene-3,20-dione with other organic sulfonyl chlorides, for example, a saturated aliphatic sulfonyl chloride, such as, ethanesulfonyl chloride, propanesulfonyl chloride, butanesulfonyl chloride, pentanesulfonyl chloride, hexanesulfonyl chloride, nonanesulfonyl chloride, dodecanesulfonyl chloride, 2-propanesulfonyl chloride, 2-butanesulfonyl chloride, 2-pentanesulfonyl chloride, 2-octanesulfonyl chloride, and tertiarybutanesulfonyl chloride; a saturated cycloaliphatic sulfonyl chloride, such as cyclopentanesulfonyl chloride and cyclohexanesulfonyl chloride; and aralkyl sulfonyl chloride, such as phenylmethanesulfonyl chloride and phenylethanesulfonyl chloride; and aryl sulfonyl chloride, such as benzenesulfonyl chloride, o-toluenesulfonyl chloride and p-toluenesulfonyl chloride; and substituted aryl sulfonyl chlorides, such as, o-bromobenzenesulfonyl chloride, p-bromobenzenesulfonyl chloride, o-chlorobenzenesulfonyl chloride, p-chlorobenzenesulfonyl chloride, o-, m-, and p-nitrobenzenesulfonyl chloride, anisole-2-sulfonyl chloride, anisole - 4 - sulfonyl chloride, and the like, instead of methanesulfonyl chloride, is productive of the corresponding 21 - organic sulfonates, such as, the 21 - ethanesulfonate, 21 - propanesulfonate, 21-butanesulfonate, 21 - pentanesulfonate, 21 - hexanesulfonate, 21 - nonanesulfonate, 21 - dodecanesulfonate, 21 - (2 - propanesulfonate), 21 - (2 - butanesulfonate), 21-(2-pentanesulfonate), 21-(2-octanesulfonate), 21-tertiarybutanesulfonate, 21-cyclopentanesulfonate, 21-cyclohexanesulfonate, 21-phenylmethanesulfonate, 21-phenylethanesulfonate, 21-benzenesulfonate, 21-o-toluenesulfonate, 21-p-toluenesulfonate, 21-o-bromobenzenesulfonate, 21 - p - bromobenzenesulfonate, 21 - o - chlorobenzenesulfonate, 21-p-chlorobenzenesulfonate, 21-(o-, m-, p-nitrobenzenesulfonate), 21 - anisole - 2 - sulfonate, 21-anisole-4-sulfonate, and the like, of 6α-fluoro-11β,17α,21-trihydroxy-1,4-pregnadiene-3,20-dione. For example, 6α-fluoro - 11β,17α,21 - trihydroxy - 1,4 - pregnadiene - 3,20-dione 21-benzenesulfonate is obtained as a crystalline solid.

EXAMPLE 1Ab

6α,9α-Difluoro-11β,17α,21-Trihydroxy-1,4-Pregnadiene-3,20-Dione 21-Methanesulfonate (II)

A solution of 1.0 g. of 6α,9α-difluoro-11β,17α,21-trihydroxy-1,4-pregnadiene-3,20-dione (I) in 10 ml. of pyridine was cooled in an ice bath and then treated with 1.0 ml. of methanesulfonyl chloride. After standing at 0–5° C. for 19 hours, the reaction mixture was poured into 100 ml. of iced 5% hydrochloric acid solution to give, following filtration, 1.102 g. of crystalline material having a melting point of 203–208° C. (dec.). After three recrystallizations from methanol and treatment with decolorizing carbon there was obtained 531 mg. of 6α,9α - difluoro - 11β,17α,21 - trihydroxy - 1,4 - pregnadiene-3,20-dione 21-methanesulfonate (II) having a melting point of 235–238° (dec.), [α]$_D$ +82° (acetone), $\lambda_{max.}^{alc.}$ 238 mμ, ε 16,900

In the same manner substituting other appropriate organic sulfonyl chlorides, such as those named in the second paragraph of Example 1Aa, for methanesulfonyl chloride, is productive of the corresponding 21-organic sulfonates of 6α,9α-difluoro-11β,17α,21-trihydroxy-1,4-pregnadiene-3,20-dione. Illustrative of the 21-organic sulfonates thus produced are the 21-ethanesulfonate, 21-dodecanesulfonate, 21 - (2 - butanesulfonate), 21 - cyclohexane sulfonate, 21 - phenylmethanesulfonate, 21 - o-toluenesulfonate, 21 - p - toluenesulfonate, 21 - o - bromobenzenesulfonate, 21-p-chlorobenzenesulfonate, the 21-(o-, m-, p-nitrobenzenesulfonate), 21-anisole-2-sulfonate, and the like, of 6α,9α-difluoro-11β,17α,21-trihydroxy-1,4-pregnadiene-3,20-dione. For example 6α,9α-difluoro-11β,17α,21 - trihydroxy - 1,4 - pregnadiene - 3,20 - diene 21-cyclohexanesulfonate is obtained as a crystalline solid.

Example 1Ac

*6α-Methyl-9α-Fluoro-11β,17α,21-Trihydroxy-1,4-Pregnadiene-3,20-Dione 21-Methanesulfonate (II)*

A solution was prepared containing 250 mg. of 6α-methyl - 9α - fluoro - 11β,17α,21 - trihydroxy - 1,4 - pregnadiene-3,20-dione (I) in 6 ml. of pyridine. This solution was cooled to 0° C. and treated with 0.25 ml. of methanesulfonyl chloride. Thereafter, the solution was allowed to stir at a temperature between 0 and 5° C. for a period of 18 hours. Thereafter, ice and 2 ml. of water were added followed by 30 ml. of sufficient dilute (5%) hydrochloric acid to neutralize the pyridine. The mixture was then filtered, the precipitate washed with water and dried to give 197 mg. of a crude product having a melting point of 165–185° C. Rewashing this material several times with water gave 6α-methyl-9α -fluoro - 11β,17α,21 - trihydroxy - 1,4 - pregnadiene-3,20-dione 21-methanesulfonate (II) having a melting point of 200–210° C.

In the same manner, substituting other appropriate organic sulfonyl chlorides, such as those named in the second paragraph of Example 1A*a*, for methanesulfonyl chloride, is productive of the corresponding 21-organic sulfonates of 6α-methyl-9α-fluoro-11β,17α,21-trihydroxy-1,4-pregnadiene-3,20-dione. Illustrative of the 21-organic sulfonates thus produced are the 21-ethanesulfonate, 21-dodecanesulfonate, 21-(2-butanesulfonate), 21-cyclohexanesulfonate, 21-phenylmethanesulfonate, 21-o-toluenesulfonate, 21-p-toluenesulfonate, 21-o-bromobenzenesulfonate, 21-p-chlorobenzenesulfonate, the 21-(o-, m-, p-nitrobenzenesulfonate), 21-anisole-2-sulfonate, and the like, of 6α-methyl-9α-fluoro-11β,17α,21-trihydroxy-1,4-pregnadiene-3,20-dione. For example, 6α-methyl-9α-fluoro - 11β,17α,21 - trihydroxy - 1,4 - pregnadiene - 3,20-dione 21-ethanesulfonate is obtained as a crystalline solid.

Example 1Ad

*11β,17α,21-Trihydroxy-4-Pregnene-3,20-Dione 21-Methanesulfonate (II)*

0.01 mole of 11β,17α,21-trihydroxy-4-pregnene-3,20-dione (I) is dissolved in 30 ml. of pyridine and cooled to 0 to 5° C., followed by the addition, with stirring, of 0.013 mole of methanesulfonyl chloride. The reaction mixture is then kept at 0 to 5° C. for from about 2 to about 24 hours. 400 ml. of ice water is then poured into the reaction mixture, followed by extraction of the reaction mixture with three 75 ml. portions of methylene chloride. The methylene chloride extracts are combined and washed successively with dilute acid, water and sodium bicarbonate solution, followed by drying over anhydrous sodium sulfate. The washed, combined extracts are then poured onto a chromatographic column containing 300 g. of Florisil (synthetic magnesium silicate). The chromatographic column is developed by eluting with commercial hexanes containing increasing amounts of acetone. The eluate fractions are freed of solvent and those fractions which give a negative or very slow forming Tollens test and whose ultraviolet absorption show the presence of 11β,17α,21-trihydroxy-4-pregnene-3,20-dione 21-methanesulfonate are combined. The combined fractions are then recrystallized from ethyl acetate-commercial hexanes to yield 11β,17α,21-trihydroxy-4-pregnene-3,20-dione (II).

In the same manner, substituting

11β,17α,21-trihydroxy-1,4-pregnadiene-3,20-dione,
9α-fluoro-11β,17α,21-trihydroxy-4-pregnene-3,20-dione,
9α-fluoro-11β,17α,21-trihydroxy - 1,4 - pregnadiene-3,20-dione,
6α-methyl-11β,17α,21-trihydroxy-4-pregnene-3,20-dione,
6α-methyl-11β,17α,21-trihydroxy-1,4 - pregnadiene - 3,20-dione,
6α-methyl-9α-fluoro-11β,17α,21-trihydroxy - 4 - pregnene-3,20-dione,
6α-fluoro - 11β,17α,21 - trihydroxy-4-pregnene-3,20-dione, and
6α,9α-difluoro-11β,17α,21-trihydroxy - 4 - pregnene-3,20-dione, for 11β,17α,21-trihydroxy-4-pregnene-3,20-dione is productive of 11β,17α,21-trihydroxy - 1,4 - pregnadiene-3,20-dione 21-methanesulfonate,
9α - fluoro - 11β,17α,21 - trihydroxy - 4 - pregnene-3,20-dione 21-methanesulfonate,
9α-fluoro-11β,17α,21 - trihydroxy - 1,4-pregnadiene-3,20-dione 21-methanesulfonate,
6α-methyl - 11β,17α,21 - trihydroxy - 4 - pregnene-3,20-dione 21-methanesulfonate,
6α - methyl - 11β,17α,21-trihydroxy - 1,4 - pregnadiene-3,20-dione 21-methanesulfonate,
6α-methyl-9α-fluoro - 11β,17α,21 - trihydroxy-4-pregnene-3,20-dione 21-methanesulfonate,
6α-fluoro-11β,17α,21-trihydroxy - 4 - pregnene-3,20-dione 21-methanesulfonate, and
6α,9α-difluoro-11β,17α,21 - trihydroxy - 4 - pregnene-3,20-dione 21-methanesulfonate, respectively.

In the same manner, substituting other appropriate organic sulfonyl chlorides, such as those named in the second paragraph of Example 1A*a*, for methanesulfonyl chloride, in the reaction of this example, is productive of the corresponding 21-organic sulfonates, such as, the 21-ethanesulfonate, 21-dodecanesulfonate, 21-(2-butanesulfonate), 21-cyclohexanesulfonate, 21-phenylmethanesulfonate, 21-o-toluenesulfonate, 21-p-toluenesulfonate, 21 - o - bromobenzenesulfonate, 21-p-chlorobenzenesulfonate, the 21-(o-, m-, p-nitrobenzenesulfonate), 21-anisole-2-sulfonate, and the like, which otherwise correspond to 21-methanesulfonate compounds described above in this example. For example, 11β,17α,21-trihydroxy-4-pregnene-3,20-dione 21-phenylmethanesulfonate is obtained as a crystalline solid.

Example 2A

*6α-Fluoro-17α,21-Dihydroxy-1,4-Pregnadiene-3,11,20-Trione 21-Methanesulfonate (III)*

500 mg. of 6α-fluoro-11β,17α,21-trihydroxy-1,4-pregnadiene-3,20-dione 21-methanesulfonate (II) is dissolved in 25 ml. of acetone and the solution is cooled to 5° C. To the thus-obtained solution there is then added dropwise the chromic acid reagent (0.267 mole $CrO_3$ in 23 ml. concentrated sulfuric acid diluted to 100 ml. with water) prepared according to the procedure described by Bowers et al., J. Chem. Soc. 2548 (1953), until a slight excess of said reagent persists for 5 minutes, the presence of an excess being indicated by an orange-colored solution. The precipitated inorganic solids are removed by filtration and the acetone solution thus obtained is evaporated in vacuo to leave a crude product. Recrystallization of the crude product from ethyl acetate or ethyl acetate-commercial hexanes yields 6α-fluoro-17α,21-dihydroxy-1,4-pregnadiene-3,11,20-trione 21-methanesulfonate (III), a crystalline solid.

Alternatively, the crude product is purified by taking it up in methylene chloride and pouring it onto a chromatographic column containing Florisil (synthetic magnesium silicate). The chromatographic column is then developed with commercial hexanes containing increasing amounts of acetone. The solvent is evaporated and those fractions which exhibit a negative or slow forming Tollens test or blue tetrazolium test and which exhibit normal ultraviolet absorption for a $\Delta^{1,4}$-3-ketone are combined and recrystallized from ethyl acetate or acetone to yield 6α-fluoro-17α,21-dihydroxy - 1,4 - pregnadiene - 3,11,20 - trione 21-methanesulfonate.

In the same manner, substituting

11β,17α,21-trihydroxy - 4 - pregnene-3,20-dione 21-methanesulfonate,

11β,17α,21-trihydroxy - 1,4 - pregnadiene - 3,20-dione 21-methanesulfonate,

9α-fluoro-11β,17α,21 - trihydroxy - 4 - pregnene - 3,20-dione 21-methanesulfonate, 9α-fluoro-11β,17α,21 - trihydroxy - 1,4-pregnadiene - 3,20-dione 21-methanesulfonate, 6α-methyl - 11β,17α,21 - trihydroxy-4-pregnene-3,20-dione 21-methanesulfonate, 6α-methyl - 11β,17α,21 - trihydroxy - 1,4 - pregnadiene-3,20-dione 21-methanesulfonate, 6α-methyl - 9α - fluoro-11β,17α,21-trihydroxy-4-pregnene-3,20-dione 21-methanesulfonate, 6α-methyl-9α-fluoro - 11β,17α,21 - trihydroxy-1,4-pregnadiene-3,20-dione 21-methanesulfonate, 6α-fluoro - 11β,17α,21 - trihydroxy-4-pregnene-3,20-dione 21-methanesulfonate, 6α,9α - difluoro - 11β,17α,21-trihydroxy-4-pregnene-3,20-dione 21-methanesulfonate, and 6α,9α-difluoro-11β,17α,21-trihydroxy - 1,4 - pregnadiene-3,20-dione 21-methanesulfonate for 6α-fluoro-11β,17α,21-trihydroxy-1,4-pregnadiene-3,20-dione 21-methanesulfonate is productive of 17α,21-dihydroxy-4-pregnene-3,11,20-trione 21-methanesulfonate, 17α,21-dihydroxy-1,4-pregnadiene-3,11,20-trione 21-methanesulfonate, 9α-fluoro-17α,21 - dihydroxy - 4 - pregnene-3,11,20-trione 21-methanesulfonate, 9α - fluoro - 17α,21 - dihydroxy - 1,4 - pregnadiene-3,11,20-trione 21-methanesulfonate, 6α-methyl - 17α,21 - dihydroxy - 4 - pregnene - 3,11,20-trione 21-methanesulfonate, 6α - methyl - 17α,21 - dihydroxy - 1,4 - pregnadiene-3,11,20-trione 21-methanesulfonate, 6α-methyl - 9α - fluoro - 17α,21 - dihydroxy-4-pregnene-3,11,20-trione 21-methanesulfonate, 6α-methyl-9α-fluoro - 17α,21 - dihydroxy - 1,4 - pregnadiene-3,11,20-trione 21-methanesulfonate, 6α-fluoro-17α,21 - dihydroxy - 4 - pregnene-3,11,20-trione 21-methanesulfonate, 6α,9α-difluoro-17α,21 - dihydroxy - 4 - pregnene-3,11,20-trione 21-methanesulfonate, and 6α,9α - difluoro - 17α,21 - dihydroxy - 1,4 - pregnadiene-3,11,20-trione 21-methanesulfonate, respectively.

In the same manner, substituting other 21-organic sulfonates corresponding to the above 21-methanesulfonates as the starting 11-hydroxy steroids of this example, there is produced the corresponding 11-keto steroid 21-organic sulfonates, such as, the 21-ethanesulfonate, 21-dodecanesulfonate, 21 - (2-butanesulfonate), 21 - cyclohexanesulfonate, 21-phenylmethanesulfonate, 21-o-toluenesulfonate, 21-p-toluenesulfonate, 21-o-bromobenzenesulfonate, 21-p-chlorobenzenesulfonate, 21-(o-, m-, p-nitrobenzenesulfonate), 21-anisole-2-sulfonate, and the like. For example, 6α-fluoro-17α,21-dihydroxy-1,4-pregnadiene - 3,11,20-trione 21-p-chlorobenzenesulfonate is obtained as a crystalline solid.

Part B

EXAMPLE 1Ba

9α-Fluoro-11β,16α,17α,21-Tetrahydroxy-1,4-Pregnadiene-3,20-Dione 21-Methanesulfonate (V)

To a solution of 1.0 g. of 9α-fluoro-11β,16α,17α,21-tetrahydroxy-1,4-pregnadiene-3,20-dione (IV) in 10 ml. of pyridine, chilled to 0 to 5° C., there was added 0.25 ml. of methanesulfonyl chloride. The reaction mixture was stirred at 0 to 5° C. for 2 hours and then poured into 100 ml. of water. The crude product, weighing 800 mg., was recovered by filtration and recrystallized from ethylene dichloride-ethyl acetate to yield 350 mg. of 9α - fluoro - 11β,16α,17α,21 - tetrahydroxy-1,4-pregnadiene-3,20-dione 21-methanesulfonate (V) having a melting point of 208 to 210° C. A second recrystallization from ethylene dichloride-ethyl acetate failed to change the melting point.

Analysis.—Calcd. for $C_{22}H_{29}FO_8S$: S, 6.79. Found: S, 6.69.

In the same manner, substituting other appropriate organic sulfonyl chlorides, such as those named in the second paragraph of Example 1Aa, for methanesulfonyl chloride, is productive of the corresponding 21-organic sulfonates of 9α-fluoro-11β,16α,17α,21-tetrahydroxy-1,4-pregnadiene-3,20-dione. Illustrative of the 21-organic sulfonates thus produced are the 21-ethanesulfonate, 21-dodecanesulfonate, 21-(2-butanesulfonate), 21-cyclohexanesulfonate, 21-phenylmethanesulfonate, 21-o-toluenesulfonate, 21 - p - toluenesulfonate, 21-o-bromobenzenesulfonate, 21-p-chlorobenzenesulfonate, the 21-(o-, m-, p-nitrobenzenesulfonate), 21-anisole-2-sulfonate, and the like, of 9α-fluoro-11β,16α,17α,21-tetrahydroxy-1,4-pregnadiene-3,20-dione. For example, 9α-fluoro-11β,16α,17α, 21-tetrahydroxy-1,4-pregnadiene-3,20-dione 21-o-toluenesulfonate is obtained as a crystalline solid.

EXAMPLE 1Ba₁

6α-Methyl-9α-Fluoro-11β,16α,17α,21-Tetrahydroxy-1,4-Pregnadiene-3,20-Dione 21-Methanesulfonate (V)

Following the procedure of Example 1Ba but substituting 6α-methyl-9α-fluoro-11β,16α,17α,21-tetrahydroxy-1,4-pregnadiene-3,20-dione for the 9α-fluoro-11β,16α,17α,21-tetrahydroxy-1,4-pregnadiene-3,20-dione is productive of 6α-methyl-9α-fluoro - 11β,16α,17α,21 - tetrahydroxy-1,4-pregnadiene-3,20-dione 21-methanesulfonate (V), a crystalline solid.

EXAMPLE 1Bb

11β,16α,17α,21-Tetrahydroxy-1,4-Pregnadiene-3,20-Dione 21-Methanesulfonate (V)

Following the procedure of Example 1Ad but substituting 11β,16α,17α,21 - tetrahydroxy - 1,4 - pregnadiene - 3,20-dione (IV) for 11β,17α,21-trihydroxy-4-pregnene-3,20-dione is productive of 11β,16α,17α,21-tetrahydroxy-1,4-pregnadiene-3,20-dione 21-methanesulfonate (V), a crystalline solid.

In the same manner, following the procedure of Example 1Ad but substituting

11β,16α,17α,21-tetrahydroxy-4-pregnene-3,20-dione,

9α - fluoro - 11β,16α,17α,21 - tetrahydroxy - 4 - pregnene-3,20-dione,

6α - methyl - 11β,16α,17α,21 - tetrahydroxy - 4 - pregnene-3,20-dione,

6α - methyl - 11β,16α,17α,21 - tetrahydroxy - 1,4 - pregnadiene-3,20-dione,

6α - methyl - 9α - fluoro-11β,16α,17α,21 - tetrahydroxy - 4-pregnene-3,20-dione, 6α - methyl - 9α - fluoro - 11β,16α,17α,21 - tetrahydroxy - 1,4-pregnadiene-3,20-dione, 6α - fluoro-11β,16α,17α,21 - tetrahydroxy - 4 - pregnene - 3,20-dione, 6α - fluoro - 11β,16α,17α,21 - tetrahydroxy - 1,4 - pregnadiene-3,20-dione, 6α,9α - difluoro - 11β,16α,17α,21 - tetrahydroxy - 4 - pregnene-3-20-dione, and 6α,9α - difluoro - 11β,16α,17α,21 - tetrahydroxy - 1,4 - pregnadiene-3,20-dione, for 11β,17α,21-trihydroxy-4-pregnene-3,20-dione is productive of 11β,16α,17α,21 - tetrahydroxy - 4 - pregnene - 3,20 - dione 21-methanesulfonate, 9α - fluoro - 11β,16α,17α,21 - tetrahydroxy - 4 - pregnene-3,20-dione 21-methanesulfonate, 6α - methyl - 11β,16α,17α,21 - tetrahydroxy - 4 - pregnene-3,20-dione 21-methanesulfonate, 6α - methyl - 11β,16α,17α,21 - tetrahydroxy - 1,4 - pregnadiene-3,20-dione 21-methanesulfonate, 6α - methyl - 9α - fluoro - 11β,16α,17α,21 - tetrahydroxy - 4-pregnene-3,20-dione 21-methanesulfonate, 6α - methyl - 9α - fluoro - 11β,16α,17α,21 - tetrahydroxy - 1,4-pregnadiene-3,20-dione 21-methanesulfonate, 6α - fluoro - 11β,16α,17α,21 tetrahydroxy - 4 - pregnene - 3,20-dione 21-methanesulfonate, 6α - fluoro - 11β,16α,17α,21 - tetrahydroxy - 1,4 - pregnadiene-3,20-dione 21-methanesulfonate, 6α,9α - difluoro - 11β,16α,17α,21 - tetrahydroxy - 4 - pregnene-3,20-dione 21-methanesulfonate, and 6α,9α - difluoro - 11β,16α,17α,21 - tetrahydroxy - 1,4 - pregnadiene-3,20-dione 21-methanesulfonate, respectively.

In the same manner, substituting other appropriate organic sulfonyl chlorides, such as those named in the second paragraph of Example 1Aa, for methanesulfonyl chloride, in the reaction of this example, is productive of the corresponding 21-organic sulfonates, such as, the 21-ethanesulfonate, 21-dodecanesulfonate, 21-(2-butanesulfonate), 21-cyclohexanesulfonate, 21-phenylmethanesulfonate, 21-o-toluenesulfonate, 21-p-toluenesulfonate, 21 - o - bromobenzenesulfonate, 21 - p - chlorobenzenesulfonate, the 21-(o-, m-, p-nitrobenzenesulfonate), 21-anisole-2-sulfonate, and the like which otherwise correspond to the 21-methanesulfonate compounds described above in this example. For example, 11β,16α,17α,21-tetrahydroxy-1,4-pregnadiene-3,20-dione 21-anisole-2-sulfonate is obtained as a crystalline solid.

EXAMPLE 1Bb₁

6α,9α-Difluoro-11β,16α,17α,21-Tetrahydroxy-1,4-Pregnadiene-3,20-Dione 21-Methanesulfonate (V)

Following the procedure of Example 1Ad but substituting 6α,9α-difluoro-11β,16α,17α,21-tetrahydroxy-1,4-pregnadiene-3,20-dione (IV) for 11β,17α-21-trihydroxy-4-pregnene-3,20-dione is productive of 6α,9α-difluoro-11β,16α,17α,21-tetrahydroxy-1,4-pregnadiene-3,20 - dione 21-methanesulfonate (V), a crystalline solid.

EXAMPLE 1Bb₂

6α-Methyl-11β,16α,17α,21-Tetrahydroxy-1,4-Pregnadiene-3,20-Dione 21-Methanesulfonate (V)

Following the procedure of Example 1Ad but substituting 6α - methyl - 11β,16α,17α,21 - tetrahydroxy - 1,4 - pregnadiene - 3,20 - dione for 11β,17α,21 - trihydroxy - 4 - pregnene - 3,20 - dione is productive of 6α - methyl - 11β,16α,17α,21-tetrahydroxy-1,4-pregnadiene-3,20 - dione 21-methanesulfonate (V), a crystalline solid.

EXAMPLE 2B

9α-Fluoro-11β,16α,17α,21-Tetrahydroxy-1,4-Pregnadiene-3,20-Dione 16-Acetate 21-Methanesulfonate (VI)

1 g. of 9α-fluoro-11β,16α,17α,21-trihydroxy-1,4-pregnadiene-3,20-dione 21-methanesulfonate (V) is dissolved in 5 ml. of pyridine and 5 ml. of acetic anhydride and is allowed to stand at room temperature (about 26° C.) for about 15 hours. The thus-obtained reaction mixture is then poured into 100 ml. of ice water containing 7 ml. of concentrated hydrochloric acid, followed by extraction of the crude product with three portions of 25 ml. each of methylene chloride. The extracts are combined and washed successively with dilute hydrochloric acid, water, and sodium bicarbonate and dried over anhydrous sodium sulfate. The thus-obtained solution is then poured onto a chromatographic column containing 80 g. of Florisil (synthetic magnesium silicate). The chromatographic column is developed by eluting with commercial hexanes containing increasing amounts of acetone. The solvent is evaporated and those eluate fractions which give a negative or very slow forming Tollens test and whose ultraviolet absorption show the presence of the desired product are combined and recrystallized from ethyl acetate or ethyl acetate-commercial hexanes to yield 9α - fluoro - 11β,16α,17α,21 - tetrahydroxy - 1,4 - pregnadiene-3,20-dione 16-acetate 21-methanesulfonate (VI), a crystalline solid.

Alternatively, the crude product obtained following the treatment with acetic acid in pyridine can be poured into about 150 ml. of water, cooled to 0° C. and filtered. The thus-collected precipitate is washed with water and recrystallized from ethyl acetate-commercial hexanes to give 9α - fluoro - 11β,16α,17α,21 - tetrahydroxy - 1,4 - pregnadiene-3,20-dione 16-acetate 21-methanesulfonate.

In the same manner, substituting,

11β,16α,17α,21 - tetrahydroxy - 4 - pregnene - 3,20 - dione 21-methanesulfonate, 11β,16α,17α,21 - tetrahydroxy - 1,4 - pregnadiene - 3,20-dione 21-methanesulfonate, 9α - fluoro - 11β,16α,17α,21 - tetrahydroxy - 4 - pregnene-3,20-dione 21-methanesulfonate, 6α-methyl-11β,16α,17α,21-tetrahydroxy-4-pregnene-3,20-dione 21-methanesulfonate, 6α - methyl - 11β,16α,17α,21 - tetrahydroxy - 1,4 - pregnadiene-3,20-dione 21-methanesulfonate, 6α-methyl-9α-fluoro-11β,16α,17α,21-tetrahydroxy-4-pregnene-3,20-dione 21-methanesulfonate, 6α-methyl-9α-fluoro-11β,16α,17α,21-tetrahydroxy-1,4-pregnadiene-3,20-dione 21-methanesulfonate, 6α-fluoro-11β,16α,17α,21-tetrahydroxy-4-pregnene-3,20-dione 21-methanesulfonate, 6α-fluoro-11β,16α,17α,21-tetrahydroxy-1,4-pregnadiene-3,20-dione 21-methanesulfonate, 6α,9α-difluoro-11β,16α,17α,21-tetrahydroxy-4-pregnene-3,20-dione 21-methanesulfonate, and 6α,9α-difluoro-11β,16α,17α,21-tetrahydroxy-1,4-pregnadiene-3,20-dione 21-methanesulfonate for 9α-fluoro-11β,16α,17α,21-tetrahydroxy-1,4-pregnadiene-3,20-dione 21-methanesulfonate is productive of 11β,16α,17α,21-tetrahydroxy-4-pregnene-2,20-dione 16-acetate 21-methanesulfonate, 11β,16α,17α,21-tetrahydroxy-1,4-pregnadiene-3,20-dione 16-acetate 21-methanesulfonate, 9α-fluoro-11β,16α,17α,21-tetrahydroxy-4-pregnene-3,20-dione 16-acetate 21-methanesulfonate, 6α-methyl-11β,16α,17α,21-tetrahydroxy-4-pregnene-3,20-dione 16-acetate 21-methanesulfonate, 6α-methyl-11β,16α,17α,21-tetrahydroxy-1,4-pregnadiene-3,20-dione 16-acetate 21-methanesulfonate, 6α-methyl-9α-fluoro-11β,16α,17α,21-tetrahydroxy-4-pregnene-3,20-dione 16-acetate 21-methanesulfonate, 6α-methyl-9α-fluoro-11β,16α,17α,21-tetrahydroxy-1,4-pregnadiene-3,20-dione 16-acetate 21-methanesulfonate, 6α-fluoro-11β,16α,17α,21-tetrahydroxy-4-pregnene-3,20-dione 16-acetate 21-methanesulfonate, 6α-fluoro-11β,16α,17α,21-tetrahydroxy-1,4-pregnadiene-3,20-dione 16-acetate 21-methanesulfonate, 6α,9α-difluoro-11β,16α,17α,21-tetrahydroxy-4-pregnene-3,20-dione 16-acetate 21-methanesulfonate and 6α,9α-difluoro-11β,16α,17α,21-tetrahydroxy-1,4-pregnadiene-3,20-dione 16-acetate 21-methanesulfonate, respectively.

In the same manner, substituting other 21-organic sulfonates corresponding to the above 21-methanesulfonates as the starting 16-hydroxy steroids of this example, there is produced the corresponding 16-acetate steroid 21-organic sulfonates, such as, the 21-ethanesulfonate, 21-dodecanesulfonate, 21-(2-butanesulfonate), 21-cyclohexanesulfonate, 21-phenylmethanesulfonate, 21-o-toluenesulfonate, 21-p-toluenesulfonate, 21-o-bromobenzenesulfonate, 21-p-chlorobenzenesulfonate, 21-(o-, m-, p-nitrobenzenesulfonate), 21-anisole-2-sulfonate, and the like. For example, 9α-fluoro-11β,16α,17α,21-tetrahydroxy-1,4-pregnadiene-3,20-dione 16-acetate 21-p-toluenesulfonate is obtained as a crystalline solid.

Other 16-acylates of the 21-methanesulfonates (and other 21-organic sulfonates) described above are prepared by allowing the starting 16-hydroxy steroids of this example to react with the selected organic carboxylic acid, preferably a hydrocarbon carboxylic acid containing from 1 to 12 carbon atoms, inclusive, or the anhydride or acyl halide thereof. Illustrative of the compounds thus produced are the 16-formate, 16-propionate, 16-butyrate, 16-valerate, 16-hexanoate, 16-laurate, 16-trimethylacetate, 16-isobutyrate, 16-isovalerate, 16-tertiarybutylacetate, 16-(β-cyclopentylpropionate), 16-cyclohexanecarboxylate, 16-cyclohexylacetate, 16-benzoate, 16-phenylacetate, 16-(β-phenylpropionate), 16-(o-, m-, p-oluate), 16-hemisuccinate, 16-hemiadipate, 16-acrylate, 16-crotonate, 16-propiolate, 16-(2-butynoate), 16-undecolate, 16-cinnamate, 16-maleate, 16-citraconate, and the like, of the 21-methanesulfonates (and other 2-organic sulfonates) described above in this example.

If the corresponding acylating agent is solid, an inert solvent, such as, toluene, xylene, or dioxane can be added to effect solution and to provide a liquid esterification medium.

If the esterifying agent is the free acid, the reaction is carried out in the presence of an esterification catalyst.

EXAMPLE 2B₁

*6α - Methyl - 9α - Fluoro - 11β,16α,17α,21-Tetrahydroxy-1,4-Pregnadiene-3,20-Dione 16-Acetate 21-Methanesulfonate (VI)*

Following the procedure of Example 1Ad but substituting 6α-methyl-9α-fluoro-11β,16α,17α,21-tetrahydroxy-1,4-pregnadiene-3,20-dione for the 11β,17α,21-trihydroxy-4-pregnene-3,20-dione is productive of 6α-methyl-9α-fluoro-11β,16α,17α,21 - tetrahydroxy-1,4 - pregnadiene - 3,20-dione 21-methanesulfonate (V).

Then following the procedure of Example 2B but substituting the thus-prepared 6α-methyl-9α-fluoro-11β,16α,17α,21 - tetrahydroxy - 1,4 - pregnadiene - 3,20 - dione 21-methanesulfonate for the 9α-fluoro-11β,16α,17α,21-trihydroxy - 1,4 - pregnadiene - 3,20 - dione 21 - methanesulfonate is productive of 6α-methyl-9α-fluoro-11β,16α, 17α,21 - tetrahydroxy - 1,4 - pregnadiene - 3,20 - dione 16-acetate 21-methanesulfonate (VI), a crystalline solid.

EXAMPLE 2B₂

*6α,9α - Difluoro - 11β,16α,17α,21 - Tetrahydroxy - 1,4-Pregnadiene - 3,20 - Dione 16 - Acetate 21 - Methanesulfonate (VI)*

Following the procedure of Example 1Ad but substituting 6α,9α-difluoro - 11β,16α,17α,21 - tetrahydroxy - 1, 4-pregnadiene-3,20-dione for the 11β,17α,21-trihydroxy-4-pregnene-3,20-dione is productive of 6α,9α-difluoro-11β,16α,17α,21 - tetrahydroxy - 1,4 - pregnadiene - 3,20-dione 21-methanesulfonate.

Then following the procedure of Example 2B but substituting 6α,9α - difluoro - 11β,16α,17α,21 - tetrahydroxy-1,4-pregnadiene-3,20-dione 21-methanesulfonate for the 9α - fluoro - 11β,16α,17α,21 - trihydroxy - 1,4 - pregnadiene - 3,20 - dione 21 - methanesulfonate is productive of 6α,9α - difluoro - 11β,16α,17α,21 - tetrahydroxy-1,4-pregnadiene-3,20-dione 16-acetate 21-methanesulfonate (VI), a crystalline solid.

EXAMPLE 3B

*9α - Fluoro - 16α,17α,21 - Trihydroxy-1,4 - Pregnadiene-3,11,20-Trione 16-Acetate 21-Methanesulfonate (VII)*

Substituting 9α -fluoro - 11β,16α,17α,21 - tetrahydroxy - 1,4 -pregnadiene - 3,20 - dione 16 -acetate 21-methanesulfonate (VI) for 6α-fluoro-11β,17α,21-trihydroxy - 1,4 - pregnadiene - 3,20 - dione 21 - methanesulfonate, and following the procedure of Example 2A, is productive of 9α - fluoro - 16α,17α,21 - trihydroxy - 1,4-pregnadiene-3,11,20-trione 16-acetate 21-methanesulfonate (VII).

In the same manner, substituting

11β,16α,17α,21-trihydroxy-4-pregnene-3,20-dione 16-acetate 21-methanesulfonate,
11β,16α,17α-21-trihydroxy-1,4-pregnadiene-3,20-dione 16-acetate 21-methanesulfonate,
9α-fluoro-11β,16α,17α,21-trihydroxy-4-pregnene-3,20-dione 16-acetate 21-methanesulfonate,
6α-methyl-11β,16α,17α,21-trihydroxy-4-pregnene-3,20-dione 16-acetate 21-methanesulfonate,
6α-methyl-11β,16α,17α,21-trihydroxy-1,4-pregnadiene-3,20-dione 16-acetate 21-methanesulfonate,
6α-methyl-9α-fluoro-11β,16α,17α,21-trihydroxy-4-pregnene-3,20-dione 16-acetate 21-methanesulfonate,
6α-methyl-9α-fluoro-11β,16α,17α,21-trihydroxy-1,4-pregnadiene-3,20-dione 16-acetate 21-methanesulfonate,
6α-fluoro-11β,16α,17α,21-trihydroxy-4-pregnene-3,20-dione 16-acetate 21-methanesulfonate,
6α-fluoro-11β,16α,17α,21-trihydroxy-1,4-pregnadiene-3,20-dione 16-acetate 21-methanesulfonate,
6α,9α-difluoro-11β,16α,17α,21-trihydroxy-4-pregnene-3,20-dione 16-acetate 21-methanesulfonate, and
6α,9α-difluoro-11β,16α,17α,21-trihydroxy-1,4-pregnadiene-3,20-dione 16-acetate 21-methanesulfonate for 6α - fluoro - 11β,17α,21 - trihydroxy - 1,4 - pregnadiene-3,20-dione 21-methanesulfonate, and following the procedure of Example 2A, is productive of 16α,17α,21-trihydroxy-4-pregnene-3,11,20-trione 16-acetate 21-methanesulfonate,
16α,17α-21-trihydroxy-1,4-pregnadiene-3,11,20-trione 16-acetate 21-methanesulfonate,
9α-fluoro-16α,17α,21-trihydroxy-4-pregnene-3,11,20-trione 16-acetate 21-methanesulfonate,
6α-methyl-16α,17α,21-trihydroxy-4-pregnene-3,11,20-trione 16-acetate 21-methanesulfonate,
6α-methyl-16α,17α,21-trihydroxy-1,4-pregnadiene-3,11,20-trione 16-acetate 21-methanesulfonate,
6α-methyl-9α-fluoro-16α,17α,21-trihydroxy-4-pregnene-3,11,20-trione 16-acetate 21-methanesulfonate,
6α-methyl-9α-fluoro-16α,17α,21-trihydroxy-1,4-pregnadiene-3,11,20-trione 16-acetate 21-methanesulfonate,
6α-fluoro-16α,17α,21-trihydroxy-4-pregnene-3,11,20-trione 16-acetate 21-methanesulfonate,
6α-fluoro-16α,17α,21-trihydroxy-1,4-pregnadiene-3,11,20-trione 16-acetate 21-methanesulfonate,
6α,9α-difluoro-16α,17α,21-trihydroxy-4-pregnene-3,11,20-trione 16-acetate 21-methanesulfonate, and
6α,9α-difluoro-16α,17α,21-trihydroxy-1,4-pregnadiene-3,11,20-trione 16-acetate 21-methanesulfonate, respectively.

In the same manner, substituting other 21-organic sulfonates corresponding to the above 21-methanesulfonates as the starting 11-hydroxy 16-acetate steroids of this example, there is produced the corresponding 11-keto 16-acetate steroid 21-organic sulfonates, such as, the 21-ethanesulfonate, 21-dodecanesulfonate, 21-(2-butane-sulfonate), 21-cyclohexanesulfonate, 21-phenylmethanesulfonate, 21-o-toluenesulfonate, 21-p-toluenesulfonate, 21-o-bromobenzenesulfonate, 21-p-chlorobenzenesulfonate, 21-(o-, m-, p-nitrobenzenesulfonate), 21-anisole-2-sulfonate and the like. For example, 9α-fluoro-16α,17α,21-trihydroxy-1,4-pregnadiene-3,11,20-trione 16-acetate 21-(2-butanesulfonate) is obtained as a crystalline solid.

In the same manner, substituting other 16-acylates corresponding to the above 21-methanesulfonates (and other 21-organic sulfonates) as the starting 11-hydroxy 16-acylate steroids of this example, there is produced the corresponding 11-keto 16-acylate steroid 21-methanesulfonates (and other 21-organic sulfonates) such as, the 16-propionate, 16-laurate, 16-isovalerate, 16-cyclohexanecarboxylate, 16-phenylacetate, 16-hemisuccinate, 16-maleate, and the like.

Part C

EXAMPLE 1C

*9α - Fluoro - 11β,16α,17α,21 - Tetrahydroxy - 1,4 - Pregnadiene-3,20-Dione 16,17-Acetonide (VIII)*

A mixture is prepared containing 2 g. of 9α-fluoro-11β,16α,17α,21 - tetrahydroxy - 1,4 -pregnadiene - 3,20-dione (IV) in 200 ml. of acetone. To this mixture there is added 0.5 ml. of 72% perchloric acid and the mixture is stirred for about 5 hours at room temperature (about 25–30° C.). The thus-obtained reaction mixture is concentrated to about 15 ml. under reduced pressure at about 40° C., cooled to about 20° C. and 100 ml. of water is added thereto. The thus-obtained precipitate is isolated by filtration, washed with water and recrystallized from alcohol to yield 9α-fluoro-11β,16α,17α,21-tetrahydroxy-1,4-pregnadiene-3,20-dione 16,17-acetonide (VIII), a crystalline solid.

Alternatively, the isolated precipitate is taken up in methylene dichloride and poured onto a chromatographic column containing Florisil (synthetic magnesium silicate). The chromatographic column is then developed with commercial hexanes containing increasing amounts of acetone. The solvent is evaporated and those fractions which exhibit a negative Porter-Silber test are combined and recrystallized from alcohol to yield 9α-fluoro-11β,16α,17α,21 - tetrahydroxy-1,4-pregnadiene-3,20-dione 16,17-acetonide.

In the same manner, substituting

11β,16α,17α,21-tetrahydroxy-4-pregnene-3,20-dione,
11β,16α,17α,21-tetrahydroxy-1,4-pregnadiene-3,20-dione,
9α-fluoro-11β,16α,17α,21-tetrahydroxy - 4 - pregnene-3,20-dione,
6α-methyl-11β,16α,17α,21 - tetrahydroxy - 4 - pregnene-3,20-dione,
6α-methyl - 11β,16α,17α,21 - tetrahydroxy - 1,4 - pregnadiene-3,20-dione,
6α-methyl - 9α - fluoro - 11β,16α,17α,21 - tetrahydroxy-4-pregnene-3,20-dione,
6α-methyl - 9α - fluoro - 11β,16α,17α,21-tetrahydroxy-1,4-pregnadiene-3,20-dione,
6α-fluoro-11β,16α,17α,21 - tetrahydroxy-4-pregnene-3,20-dione,
6α-fluoro - 11β,16α,17α,21 - tetrahydroxy - 1,4 - pregnadiene-3,20-dione,
6α,9α-difluoro - 11β,16α,17α,21 - tetrahydroxy - 4 - pregnene-3,20-dione, and
6α,9α-difluoro - 11β,16α,17α,21 - tetrahydroxy-1,4-pregnadiene-3,20-dione for 9α-fluoro-11β,16α,17α,21-tetrahydroxy - 1,4 - pregnadiene-3,20-dione is productive of 11β,16α,17α,21-tetrahydroxy - 4 - pregnene - 3,20 - dione 16,17-acetonide,
11β,16α,17α,21 - tetrahydroxy - 1,4 - pregnadiene - 3,20-dione 16,17-acetonide,
9α-fluoro-11β,16α,17α,21 - tetrahydroxy - 4 - pregnene-3,20-dione 16,17-acetonide,
6α-methyl - 11β,16α,17α,21 - tetrahydroxy - 4 - pregnene-3,20-dione 16,17-acetonide,
6α-methyl - 11β,16α,17α,21 - tetrahydroxy - 1,4 - pregnadiene-3,20-dione 16,17-acetonide,
6α-methyl - 9α - fluoro - 11β,16α,17α,21 - tetrahydroxy-4-pregnene-3,20-dione 16,17-acetonide,
6α-methyl - 9α - fluoro - 11β,16α,17α,21 - tetrahydroxy-1,4-pregnadiene-3,20-dione 16,17-acetonide,
6α-fluoro - 11β,16α,17α,21 - tetrahydroxy - 4 - pregnene-3,20-dione 16,17-acetonide,
6α-fluoro - 11β,16α,17α,21 - tetrahydroxy - 1,4 - pregnadiene-3,20-dione 16,17-acetonide,
6α,9α-difluoro - 11β,16α,17α,21 - tetrahydroxy - 4 - pregnene-3,20-dione 16,17-acetonide, and
6α,9α-difluoro - 11β,16α,17α,21 - tetrahydroxy - 1,4 - pregnadiene-3,20-dione 16,17-acetonide, respectively.

EXAMPLE 2Ca

*9α - Fluoro - 11β,16α,17α,21 - Tetrahydroxy - 1,4 - Pregnadiene - 3,20 - Dione 16,17 - Acetonide 21-Methanesulfonate (IX)*

A solution of 500 mg. of 9α-fluoro-11β,16α,17α,21-tetrahydroxy-1,4-pregnadiene-3,20-dione 16,17 - acetonide (VIII) and 0.11 ml. of methanesulfonyl chloride in 5 ml. of pyridine was stirred at 0 to 5° C. for 18 hours. The thus-obtained reaction mixture was poured into water and the crude solid product obtained was isolated by filtration. The crude solid product was then taken in a minimum volume of methylene chloride and poured onto a chromatographic column containing 40 g. of Florisil (synthetic magnesium silicate). The chromatographic column was developed by eluting with 80 ml. fractions of commercial hexanes containing increasing proportions of acetone. The fractions eluted with commercial hexanes plus 30% acetone were combined and the solvent evaporated to give 375 mg. of crude crystalline product. The crude crystalline product was then recrystallized from ethyl acetate-commercial hexanes to yield 200 mg. of 9α-fluoro-11β,16α,17α,21 - tetrahydroxy - 1,4 - pregnadiene-3,20-dione 16,17-acetonide 21-methanesulfonate (IX) having a melting point of 268–269° C. A second recrystallization from ethyl acetate-Skellysolve B hexanes failed to change the melting point. An analytical sample of 9α-fluoro-11β,16α,17α,21-tetrahydroxy-1,4-pregnadiene-3,20-dione 16,17-acetonide 21-methanesulfonate had the following analysis.

*Analysis.*—Calcd. for $C_{25}H_{33}FO_8S$: C, 58.58; H, 6.49; S, 6.26; F, 3.71. Found: C, 58.59; H, 6.64; S, 6.15; F, 3.85.

In the same manner, substituting other appropriate organic sulfonyl chlorides, such as those named in the second paragraph of Example 1Aa, for methanesulfonyl chloride, is productive of the corresponding 21-organic sulfonates of 9α-fluoro-11β,16α,17α,21-tetrahydroxy-1,4-pregnadiene-3,20-dione 16,17-acetonide. Illustrative of the 21-organic sulfonates thus produced are the 21-ethanesulfonate, 21-dodecanesulfonate, 21-(2-butanesulfonate), 21 - cyclohexanesulfonate, 21 - phenylmethanesulfonate, 21-o-toluenesulfonate, 21-p-toluenesulfonate, 21-o-bromobenzenesulfonate, 21-p-chlorobenzenesulfonate, the 21-(o-, m-, p-nitrobenzenesulfonate), 21-anisole-2-sulfonate, and the like, of 9α-fluoro-11β,16α,17α,21-tetrahydroxy-1,4-pregnadiene-3,20-dione 16,17-acetonide. For example, 9α-fluoro-11β,16α,17α,21-tetrahydroxy - 1,4 - pregnadiene-3,20-dione 16,17-acetonide 21-dodecanesulfonate is obtained as a crystalline solid.

EXAMPLE 2Cb

*6α,9α-Difluoro-11β,16α,17α,21-Tetrahydroxy-1,4 - Pregnadiene-3,20-Dione 16,17-Acetonide 21-Methanesulfonate (IX)*

Following the procedure of Example 1Ad, but substituting 6α,9α-difluoro-11β,16α,17α,21-tetrahydroxy-1,4 - pregnadiene-3,20-dione 16,17-acetonide (VIII) for 11β,17α,21-trihydroxy-4-pregnene-3,20-dione is productive of 6α,9α-difluoro-11β,16α17α,21-tetrahydroxy-1,4-pregnadiene - 3,20-dione 16,17-acetonide 21-methanesulfonate (IX) a crystalline solid.

In the same manner, substituting

11β,16α,17α,21-tetrahydroxy-4-pregnene-3,20-dione 16,17-acetonide,
11β,16α,17α,21-tetrahydroxy-1,4-pregnadiene-3,20 - dione 16,17-acetonide,
9α,fluoro-11β,16α,17α,21-tetrahydroxy-4 - pregnene - 3,20-dione 16,17-acetonide,
6α-methyl-11β,16α,17α,21-tetrahydroxy-4-pregnene - 3,20-dione 16,17-acetonide,
6α-methyl-11β,16α,17α,21-tetrahydroxy-1,4 - pregnadiene-3,20-dione 16,17-acetonide, 6α-methyl-9α-fluoro-11β,16α,17α,21-tetrahydroxy-4-pregnene-3,20-dione 16,17-acetonide,
6α-methyl-9α-fluoro-11β,16α,17α,21-tetrahydroxy-1,4-pregnadiene-3,20-dione 16,17-acetonide,
6α-fluoro-11β,16α,17α,21-tetrahydroxy-4-pregnene-3,20-dione 16,17-acetonide,
6α-fluoro-11β,16α,17α,21-tetrahydroxy-1,4-pregnadiene-3,20-dione 16,17-acetonide, and
6α,9α-difluoro-11β,16α,17α,21-tetrahydroxy-4-pregnene-3,20-dione 16,17-acetonide for 11β,17α,21-trihydroxy-4-pregnene-3,20-dione, and following the procedure of Example 1Ad is productive of 11β,16α,17α,21-tetrahydroxy-4-pregnene-3,20-dione 16,17-acetonide, 21-methanesulfonate,
11β,16α,17α,21-tetrahydroxy-1,4-pregnadiene-3,20-dione 16,17-acetonide 21-methanesulfonate,
9α-fluoro-11β,16α,17α,21-tetrahydroxy-4-pregnene-3,20-dione 16,17-acetonide 21-methanesulfonate,
6α-methyl-11β,16α,17α,21-tetrahydroxy-4-pregnene-3,20-dione 16,17-acetonide 21-methanesulfonate,
6α-methyl-11β,16α,17α,21-tetrahydroxy-1,4-pregnadiene-3,20-dione 16,17-acetonide 21-methanesulfonate,
6α-methyl-9α-fluoro-11β,16α,17α,21-tetrahydroxy-4-pregnene-3,20-dione 16,17-acetonide 21-methanesulfonate,
6α-methyl-9α-fluoro - 11β,16α,17α,21 - tetrahydroxy - 1,4-pregnadiene-3,20-dione 16,17-acetonide 21-methanesulfonate,
6α-fluoro-11β,16α,17α,21-tetrahydroxy-4-pregnene-3,20-dione 16,17-acetonide 21-methanesulfonate,
6α-fluoro-11β,16α,17α,21-tetrahydroxy-1,4-pregnadiene-3,20-dione 16,17-acetonide 21-methanesulfonate, and
6α,9α-difluoro-11β,16α,17α,21-tetrahydroxy-4-pregnene-3,20-dione 16,17-acetonide 21-methanesulfonate,
respectively.

In the same manner, substituting other appropriate organic sulfonyl chlorides, such as those named in the second paragraph of Example 1Aa, for methanesulfonyl chloride, in the reaction of this example, is productive of the corresponding 21-organic sulfonates, such as, the 21-ethanesulfonate, 21-dodecanesulfonate, 21-(2-butanesulfonate), 21-cyclohexanesulfonate, 21-phenylmethanesulfonate, 21-o-toluenesulfonate, 21-p-toluenesulfonate, 21-o-bromobenzenesulfonate, 21-p-chlorobenzenesulfonate, the 21-(o-, m-, p-nitrobenzenesulfonate),21 - anisole-2-sulfonate, and the like which otherwise correspond to the 21-methanesulfonate compounds described above in this example. For example, 6α,9α-difluoro-11β,16α,17α,21-tetrahydroxy-1,4-pregnadiene-3,20-dione 16,17-acetonide 21-ethanesulfonate is obtained as a crystalline solid.

EXAMPLE 2Cb₁

6α-Methyl-9α-Fluoro-11β,16α,17α,21-Tetrahydroxy - 1,4-Pregnadiene-3,20-Dione 16,17-Acetonide 21-Methanesulfonate Following the procedure of Example 1Ad but substituting 6α-methyl-9α-fluoro-11β,16α,17α,21-tetrahydroxy - 1,4-pregnadiene-3,20-dione 16,17-acetonide for the 11β,17α,21-trihydroxy-4-pregnene-3,20-dione is productive of 6α-methyl-9α-fluoro-11β,16α,17α,21-tetrahydroxy-1,4 - pregnadiene-3,20-dione 16,17-acetonide 21-methanesulfonate (IX), a crystalline solid.

EXAMPLE 3C

9α-Fluoro-16α,17α,21-Trihydroxy-1,4-Pregnadiene-3,11,20-Trione 16,17-Acetonide 21-Methanesulfonate (X)

Following the procedure of Example 2A, but substituting 9α-fluoro-11β,16α,17α,21-tetrahydroxy-1,4 - pregnadiene-3,20-dione 16,17-acetonide 21-methanesulfonate (IX) for 6α-fluoro-11β,17α,21-trihydroxy-1,4-pregnadiene-3,20-dione 21-methanesulfonate is productive of 9α-fluoro-16α,17α,21-trihydroxy-1,4-pregnadiene-3,11,20 - trione 16,17-acetonide 21-methanesulfonate (X), a crystalline solid.

In the same manner, substituting

11β,16α,17α,21-tetrahydroxy-4-pregnene-3,20-dione 16,17-acetonide 21-methanesulfonate,
11β,16α,17α,21-tetrahydroxy-1,4-pregnadiene-3,20 - dione 16,17-acetonide 21-methanesulfonate,
9α-fluoro-11β,16α,17α,21-tetrahydroxy-4-pregnene - 3,20-dione 16,17-acetonide 21-methanesulfonate,
6α-methyl-11β,16α,17α,21-tetrahydroxy-4-pregnene - 3,20-dione 16,17-acetonide 21-methanesulfonate,
6α-methyl-11β,16α,17α,21-tetrahydroxy-1,4 - pregnadiene-3,20-dione 16,17-acetonide 21-methanesulfonate,
6α-methyl-9α-fluoro-11β,16α,17α,21-tetrahydroxy-4 - pregnene-3,20-dione 16,17-acetonide 21-methanesulfonate,
6α-methyl-9α-fluoro-11β,16α,17α,21 - tetrahydroxy - 1,4-pregnadiene-3,20-dione 16,17-acetonide 21-methanesulfonate,
6α-fluoro-11β,16α,17α,21-tetrahydroxy-4-pregnene - 3,20-dione 16,17-acetonide 21-methanesulfonate,
6α-fluoro-11β,16α,17α,21-tetrahydroxy-1,4 - pregnadiene-3,20-dione 16,17-acetonide 21-methanesulfonate,
6α,9α-difluoro-11β,16α,17α,21-tetrahydroxy-4 - pregnene-3,20-dione 16,17-acetonide 21-methanesulfonate, and
6α,9α-difluoro-11β,16α,17α,21-tetrahydroxy-1,4 - pregnadiene-3,20-dione 16,17-acetonide 21-methanesulfonate, for 6α-fluoro-11β,17α,21-trihydroxy-1,4-pregnadiene-3,20-dione 21-methanesulfonate, and following the procedure of Example 2A, is productive of 16α,17α,21-trihydroxy-4-pregnene-3,11,20 - trione 16,17-acetonide 21-methanesulfonate,
16α,17α,21-trihydroxy-1,4-pregnadiene - 3,11,20 - trione 16,17-acetonide 21-methanesulfonate,
9α-fluoro-16α,17α,21-trihydroxy-4-pregnene-3,11,20-trione 16,17-acetonide 21-methanesulfonate,
6α-methyl-16α,17α,21-trihydroxy-4 - pregnene - 3,11,20-trione 16,17-acetonide 21-methanesulfonate,
6α-methyl-16α,17α,21-trihydroxy-1,4-pregnadiene-3,11,20-trione 16,17-acetonide 21-methanesulfonate,
6α-methyl-9α-fluoro-16α,17α,21-trihydroxy-4 - pregnene-3,11,20-trione 16,17-acetonide 21-methanesulfonate,
6α-methyl-9α-fluoro-16α,17α,21-trihydroxy-1,4 - pregnadiene-3,11,20-trione 16,17-acetonide 21-methanesulfonate,
6α-fluoro-16α,17α,21-trihydroxy-4-pregnene-3,11,20-trione 16,17-acetonide 21-methanesulfonate,
6α-fluoro-16α,17α,21-trihydroxy-1,4-pregnadiene - 3,11,20-trione 16,17-acetonide 21-methanesulfonate,
6α,9α-difluoro-16α,17α,21-trihydroxy-4-pregnene - 3,11,20-trione 16,17 - acetonide 21 - methanesulfonate, and
6α,9α-difluoro-16α,17α,21-trihydroxy - 1,4 - pregnadiene-3,11,20-trione 16,17-acetonide 21-methanesulfonate,
respectively.

In the same manner, substituting other 21-organic sulfonates corresponding to the above 21-methanesulfonates as the starting 11-hydroxy steroids of this example, there is produced the corresponding 11-keto steroid 21-organic sulfonate, such as, the 21-ethanesulfonate, 21-dodecanesulfonate, 21-(2-butanesulfonate), 21 - cyclohexanesulfonate, 21-phenylmethanesulfonate, 21-o-toluenesulfonate, 21-p-toluenesulfonate, 21-o-bromobenzenesulfonate, 21-p-chlorobenzenesulfonate, 21- (o-, m-, p-nitrobenzenesulfonate), 21-anisole-2-sulfonate, and the like. For example, 9α-fluoro-16α,17α,21-trihydroxy-1,4-pregnadiene - 3,11,20-trione 16,17-acetonide 21-cyclohexanesulfonate is obtained as a crystalline solid.

Part D

EXAMPLE 1Da

16α-Methyl-9α-Fluoro-11β,17α,21-Trihydroxy-1,4-Pregnadiene-3,20-Dione 21-Methanesulfonate (XII)

To a cold (0° C.) solution of 775 mg. (0.00197 mole) of 16α-methyl-9α-fluoro-11β,17α,21-trihydroxy-1,4 - pregnadiene-3,20-dione (XI) in 8.5 ml. of pyridine was added 0.75 ml. of methanesulfonyl chloride. The reaction mixture was swirled and then kept at 5° C. for 18 hours.

Upon pouring the reaction mixture into 200 ml. of ice water, containing 6 ml. of concentrated hydrochloric acid, a yellow solid was formed which was collected on a filter, washed with water and air dried to yield 0.86 g. of crude product having a melting point of 196 to 204° C. (dec.). The crude product was then recrystallized from dilute methanol, using decolorizing charcoal, and yielded 0.70 g. of crystalline material having a melting point of 216–218° C. (dec.). Recrystallization of the thus-obtained crystalline material from dilute methanol yielded two crops of crystals. The first crop, which were white and needle-like, weighed 0.49 g. and had a melting point of 222 to 223° C. (dec.). The second crop of crystals weighed 0.15 g. and had a melting point of 218 to 221° C. A portion of the first crop of crystals was recrystallized to give 16α-methyl-9α-fluoro-11β,17α,21-trihydroxy-1,4 - pregnadiene-3,20-dione 21-methanesulfonate (XII) having a melting point of 223–224° C. (dec.) $[\alpha]_D$ +79° (acetone), $\lambda_{max}^{alc.}$ 239 mµ

ε 15,550 and the following analysis:

*Analysis.*—Calcd. for $C_{23}H_{31}O_7SF$: C, 58.70; H, 6.64; S, 6.81. Found: C, 58.99; H, 6.68; S, 6.50.

In the same manner, substituting other appropriate organic sulfonyl chlorides, such as those named in the second paragraph of Example 1A*a*, for methanesulfonyl chloride, is productive of the corresponding 21-organic sulfonates of 16α-methyl-9α-fluoro-11β,17α,21 - trihydroxy-1,4-pregnadiene-3,20-dione. Illustrative of the 21-organic sulfonates thus produced are the 21-ethanesulfonate, 21-dodecanesulfonate, 21-(2 - butanesulfonate), 21-cyclohexanesulfonate, 21-phenylmethanesulfonate, 21-o-toluenesulfonate, 21-p-toluenesulfonate, 21-o - bromobenzenesulfonate, 21-p-chlorobenzenesulfonate, the 21-(o-, m-, p-nitrobenzenesulfonate), 21-anisole-2-sulfonate, and the like, of 16α-methyl-9α-fluoro-11β,17α,21-trihydroxy - 1,4-pregnadiene-3,20-dione. For example, 16α-methyl-9α - fluoro-11β,17α,21-trihydroxy-1,4-pregnadiene-3,20-dione 21 - p-chlorobenzenesulfonate is obtained as a crystalline solid.

EXAMPLE 1D*b*

*6α,16α-Dimethyl-9α-Fluoro-11β,17α,21-Trihydroxy-1,4-Pregnadiene-3,20-Dione 21-Methanesulfonate* (XII)

A solution of 90 mg. of 6α,16α-dimethyl-9α-fluoro-11β,17α,21-trihydroxy-1,4-pregnadiene-3,20-dione 21 - acetate in 0.62 ml. of tetrahydrofuran in 1.08 ml. of methanol was stirred under nitrogen at room temperature with 0.30 ml. of aqueous potassium carbonate solution (1.03 g./10 ml. H₂O). After standing for 45 minutes, 0.25 ml. of acetic acid was added, the solution was concentrated, diluted with water, and refrigerated. The thus-obtained precipitate was filtered, washed with water, and dried to yield 78 mg. of crude 6α, 16α-dimethyl-9α-fluoro - 11β,17α,21 - trihydroxy - 1,4 - pregnadiene - 3,20-dione (XI) which was dissolved in 2 ml. of pyridine, cooled in an ice bath while stirring and 0.15 ml. of methanesulfonyl chloride was added thereto. The thus-obtained reaction mixture after being allowed, to stand at 0° C. for 15½ hours was diluted with water, filtered, washed, and dried to yield 100 mg. of buff-colored product having a melting point of 225° C. (dec.). The thus-obtained product was recrystallized from methanol using decolorizing carbon to yield 58 mg. of 6α,16α-dimethyl-9α-fluoro - 11β,17α,21 - trihydroxy-1,4-pregnadiene-3,20-dione 21-methanesulfonate (XII) which gave a negative Tollens test, had a melting point of 244–246° C. (dec.).

*Analysis.*—Calcd. for $C_{24}H_{33}O_7SF$: S, 6.61. Found: S, 6.47.

Alternatively, 6α,16α - dimethyl-9α-fluoro-11β,17α,21-trihydroxy-1,4-pregnadiene-3,20-dione, prepared according to Preparation 23D[1], can be reacted with methanesulfonyl chloride in the presence of pyridine, according to the procedure described in Example 1A*d* to obtain 6α,16α-dimethyl-9α-fluoro - 11β,17α,21 - trihydroxy - 1,4-pregnadiene-3,20-dione 21-methanesulfonate.

In the same manner, substituting other appropriate organic sulfonyl chlorides, such as those named in the second paragraph of Example 1A*a*, for methanesulfonyl chloride, is productive of the corresponding 21-organic sulfonates of 6α,16α-dimethyl-9α-fluoro-11β,17α,21-trihydroxy-1,4-pregnadiene-3,20-dione. Illustrative of the 21-organic sulfonates thus produced are the 21-ethanesulfonate, 21-dodecanesulfonate, 21 - (2 - butanesulfonate), 21-cyclohexanesulfonate, 21-phenylmethanesulfonate, 21-o-toluenesulfonate, 21 - p - toluenesulfonate, 21-o-bromobenzenesulfonate, 21-p-chlorobenzenesulfonate, the 21-(o-, m-, p-nitrobenzenesulfonate), 21-anisole-2-sulfonate, and the like, of 6α,16α-dimethyl-9α-fluoro-11β,17α,21-trihydroxy - 1,4 - pregnadiene-3,20-dione. For example 6α,16α-dimethyl-9α-fluoro - 11β,17α,21 - trihydroxy - 1,4-pregnadiene-3,20-dione 21-ethanesulfonate is obtained as a crystalline solid.

EXAMPLE 1D*c*

*6α,9α-Difluoro-16α-Methyl - 11β,17α,21 - Trihydroxy-1,4-Pregnadiene-3,20-Dione 21-Methanesulfonate* (XII)

To a cold (0° C.) solution of 0.52 g. (0.00126 mole) of 6α,9α - difluoro-16α-methyl-11β,17α,21-trihydroxy-1,4-pregnadiene-3,20-dione in 5.5 ml. of pyridine there was added 0.48 ml. of methanesulfonyl chloride. The mixture was swirled and then maintained at 5° C. for 19 hours. Upon mixing with 4 ml. of concentrated hydrochloric acid in 150 ml. of ice water a buff-colored precipitate was formed which was filtered, washed with water, and dried to give 0.64 g. of a crude material having a melting point of 194–200° C. (dec.). The thus-obtained crude material was recrystallized from methanol, using decolorizing charcoal, to give 0.37 g. of 6α,9α-difluoro - 16α - methyl - 11β,17α,21 - trihydroxy-1,4-pregnadiene-3,20-dione 21-methanesulfonate having a melting point of 220–222° C., $[\alpha]_D$ +75° (acetone), $\lambda_{max}^{alc.}$ 238.5 mµ

ε 16,650 and the following analysis:

*Analysis.*—Calcd. for $C_{23}H_{30}O_7SF_2$: C, 56.54; H, 6.19; S, 6.56. Found: C, 56.51; H, 6.49; S, 6.47.

In the same manner substituting other appropriate organic sulfonyl chlorides, such as those named in the second paragraph of Example 1A*a*, for methanesulfonyl chloride, is productive of the corresponding 21-organic sulfonates of 6α,9α-difluoro-16α-methyl-11β,17α,21-trihydroxy-1,4-pregnadiene-3,20-dione. Illustrative of the 21-organic sulfonates thus produced are the the 21-ethanesulfonate, 21-dodecanesulfonate, 21-(2-butanesulfonate), 21 - cyclohexanesulfonate, 21 - phenylmethanesulfonate, 21-o-toluenesulfonate, 21-p-toluenesulfonate, 21-o-bromobenzenesulfonate, 21-p-chlorobenzenesulfonate, the 21-(o-, m-, p-nitrobenzenesulfonate), 21-anisole-2-sulfonate, and the like, of 6α,9α-difluoro-16α-methyl-11β,17α,21-trihydroxy-1,4-pregnadiene - 3,20 - dione. For example, 6α,9α-difluoro-16α-methyl - 11β,17α,21 - trihydroxy - 1,4-pregnadiene - 3,20 - dione 21-cyclohexanesulfonate is obtained as a crystalline solid.

EXAMPLE 1D*d*

*16α-Methyl-11β,17α,21-Trihydroxy-1,4-Pregnadiene-3,20-Dione 21-Methanesulfonate* (XII)

Following the procedure of Example 1A*d*, but substituting 16α-methyl-11β,17α,21-trihydroxy-1,4-pregnadiene-3,20-dione (XI) for 11β,17α,21-trihydroxy-4-pregnene-3,20-dione is productive of 16α-methyl-11β,17α,21-trihydroxy-1,4-pregnadiene-3,20-dione 21 - methanesulfonate (XII), a crystalline solid.

In the same manner, substituting

16β-methyl-9α-fluoro-11β,17α,21-trihydroxy-1,4-pregnadiene-3,20-dione,

6α,16β-dimethyl-9α-fluoro-11β,17α,21-trihydroxy-1,4-pregnadiene-3,20-dione,

6α,9α-difluoro-16β-methyl-11β,17α,21-trihydroxy-1,4-pregnadiene-3,20-dione,
16β-methyl-11β,17α,21-trihydroxy-1,4-pregnadiene,3,20-dione,
16β-methyl- and 16α-methyl-11β,17α,21-trihydroxy-4-pregnene-3,20-dione,
16β-methyl-9α-fluoro- and 16α-methyl-9α-fluoro-11β,17α,21-trihydroxy-4-pregnene-3,20-dione,
6α,16β-dimethyl- and 6α,16α-dimethyl-11β,17α,21-trihydroxy-4-pregnene-3,20-dione,
6α,16β-dimethyl- and 6α,16α-dimethyl-11β,17α,21-trihydroxy-1,4-pregnadiene-3,20-dione,
6α,16β-dimethyl-9α-fluoro and 6α,16α-dimethyl-9α-fluoro-11β,17α,21-trihydroxy-4-pregnene-3,20-dione,
6α-fluoro-16β-methyl- and 6α-fluoro-16α-methyl-11β,17α,21-trihydroxy-4-pregnene-3,20-dione,
6α-fluoro-16β-methyl- and 6α-fluoro-16α-methyl-11β,17α,21-trihydroxy-1,4-pregnadiene-3,20-dione and
6α,9α-difluoro-16β-methyl- and 6α,9α-difluoro-16α-methyl-11β,17α,21-trihydroxy-4-pregnene-3,20-dione for 11β,17α,21-trihydroxy-4-pregnene-3,20-dione and following the procedure of Example 1Ad, is productive of 16β-methyl-9α-fluoro-11β,17α,21-trihydroxy-1,4-pregnadiene-3,20-dione 21-methanesulfonate,
6α,16β-dimethyl-9α-fluoro-11β,17α,21-trihydroxy-1,4-pregnadiene-3,20-dione 21-methanesulfonate,
6α,9α-difluoro-16β-methyl-11β,17α,21-trihydroxy-1,4-pregnadiene-3,20-dione 21-methanesulfonate,
16β-methyl-11β,17α,21-trihydroxy-1,4-pregnadiene-3,20-dione 21-methanesulfonate,
16β-methyl- and 16α-methyl-11β,17α,21-trihydroxy-4-pregnene-3,20-dione 21-methanesulfonate,
16β-methyl-9α-fluoro- and 16α-methyl-9α-fluoro-11β,17α,21-trihydroxy-4-pregnene-3,20-dione,
6α,16β-dimethyl- and 6α,16α-dimethyl-11β,17α,21-trihydroxy-4-pregnene-3,20-dione 21-methanesulfonate,
6α,16β-dimethyl- and 6α,16α-dimethyl-11β,17α,21-trihydroxy-1,4-pregnadiene-3,20-dione 21-methanesulfonate,
6α,16β-dimethyl-9α-fluoro- and 6α,16α-dimethyl-9α-fluoro-11β,17α,21-trihydroxy-4-pregnene-3,20-dione 21-methanesulfonate,
6α-fluoro-16β-methyl- and 6α-fluoro-16α-methyl-11β,17α,21-trihydroxy-4-pregnene-3,20-dione 21-methanesulfonate,
6α-fluoro-16β-methyl- and 6α-fluoro-16α-methyl-11β,17α,21-trihydroxy-1,4-pregnadiene-3,20-dione 21-methanesulfonate, and
6α,9α-difluoro-16β-methyl- and 6α,9α-difluoro-16α-methyl-11β,17α,21-trihydroxy-4-pregnene-3,20-dione 21-methanesulfonate, respectively.

In the same manner, substituting other appropriate organic sulfonyl chlorides, such as those named in the second paragraph of Example 1Aa, for methanesulfonyl chloride, in the reaction of this example, is productive of the corresponding 21-organic sulfonates, such as, the 21-ethanesulfonate, 21-dodecanesulfonate, 21-(2-butanesulfonate), 21-cyclohexanesulfonate, 21-phenylmethanesulfonate, 21-o-toluenesulfonate, 21-p-toluenesulfonate, 21-o-bromobenzenesulfonate, 21-p-chlorobenzenesulfonate, the 21-(o-, m-, p-nitrobenzenesulfonate), 21-anisole-2-sulfonate, and the like which otherwise correspond to the 21-methanesulfonate compounds described above in this example. For example, 16α-methyl-11β,17α,21-trihydroxy-1,4-pregnadiene-3,20-dione 21-dodecanesulfonate is obtained as a crystalline solid.

EXAMPLE 2D

*16α-Methyl-9α-Fluoro-17α,21-Dihydroxy-1,4-Pregnadiene-3,11,20-Trione 21-Methanesulfonate* (XIII)

Following the procedure of Example 2A, but substituting 16α-methyl-9α-fluoro-11β,17α,21-trihydroxy-1,4-pregnadiene-3,20-dione 21-methanesulfonate (XII) for 6α-fluoro-11β,17α,21-trihydroxy-1,4-pregnadiene-3,20-dione 21-methanesulfonate is productive of 6α,9α-difluoro-17α,21-dihydroxy-1,4-pregnadiene-3,11,20-trione 21-methanesulfonate (XIII), a crystalline solid.

In the same manner, substituting

16β-methyl-9α-fluoro-11β,17α,21-trihydroxy-1,4-pregnadiene-3,20-dione 21-methanesulfonate,
16β-methyl- and 16α-methyl-11β,17α,21-trihydroxy-4-pregnene-3,20-dione 21-methanesulfonate,
16β-methyl- and 16α-methyl-11β,17α,21-trihydroxy-1,4-pregnadiene-3,20-dione 21-methanesulfonate,
16β-methyl-9α-fluoro- and 16α-methyl-9α-fluoro-11β,17α,21-trihydroxy-4-pregnene-3,20-dione 21-methanesulfonate,
6α,16β-dimethyl- and 6α,16α-dimethyl-11β,17α,21-trihydroxy-4-pregnene-3,20-dione 21-methanesulfonate,
6α,16β-dimethyl- and 6α,16α-dimethyl-11β,17α,21-trihydroxy-1,4-pregnadiene-3,20-dione 21-methanesulfonate,
6α,16β-dimethyl-9α-fluoro- and 6α,16α-dimethyl-9α-fluoro-11β,17α,21-trihydroxy-4-pregnene-3,20-dione 21-methanesulfonate,
6α,16β-dimethyl-9α-fluoro- and 6α,16α-dimethyl-9α-fluoro-11β,17α,21-trihydroxy-1,4-pregnadiene-3,20-dione 21-methanesulfonate,
6α-fluoro-16β-methyl- and 6α-fluoro-16α-methyl-11β,17α,21-trihydroxy-4-pregnene-3,20-dione 21-methanesulfonate,
6α-fluoro-16β-methyl- and 6α-fluoro-16α-methyl-11β,17α,21-trihydroxy-1,4-pregnadiene-3,20-dione 21-methanesulfonate,
6α,9α-difluoro-16β-methyl- and 6α,9α-difluoro-16α-methyl-11β,17α,21-trihydroxy-4-pregnene-3,20-dione 21-methanesulfonate, and
6α,9α-difluoro-16β-methyl- and 6α,9α-difluoro-16α-methyl-11β,17α,21-trihydroxy-1,4-pregnadiene-3,20-dione 21-methanesulfonate for 6α-fluoro-11β,17α,21-trihydroxy-1,4-pregnadiene-3,20-dione 21-methanesulfonate, and following the procedure of Example 2A, is productive of 16β-methyl-9α-fluoro-17α,21-trihydroxy-1,4-pregnadiene-3,11,20-trione 21-methanesulfonate,
16β-methyl- and 16α-methyl-17α,21-dihydroxy-4-pregnene-3,11,20-trione 21-methanesulfonate,
16β-methyl- and 16α-methyl-17α,21-dihydroxy-1,4-pregnadiene-3,11,20-trione 21-methanesulfonate,
16β-methyl-9α-fluoro- and 6α-methyl-9α-fluoro-17α,21-dihydroxy-4-pregnene-3,11,20-trione 21-methanesulfonate,
6α,16β-dimethyl- and 6α,16α-dimethyl-17α,21-dihydroxy-4-pregnene-3,11,20-trione 21-methanesulfonate,
6α,16β-dimethyl- and 6α,16α-dimethyl-17α,21-dihydroxy-1,4-pregnadiene-3,11,20-trione 21-methanesulfonate,
6α,16β-dimethyl-9α-fluoro- and 6α,16α-dimethyl-9α-fluoro-17α,21-dihydroxy-4-pregnene-3,11,20-trione 21-methanesulfonate,
6α,16β-dimethyl-9α-fluoro- and 6α,16α-dimethyl-9α-fluoro-17α,21-dihydroxy-1,4-pregnadiene-3,11,20-trione 21-methanesulfonate,
6α-fluoro-16β-methyl- and 6α-fluoro-16α-methyl-17α,21-dihydroxy-4-pregnene-3,11,20-trione 21-methanesulfonate,
6α-fluoro-16β-methyl- and 6α-fluoro-16α-methyl-17α,21-dihydroxy-1,4-pregnadiene-3,11,20-trione 21-methanesulfonate,
6α,9α-difluoro-16β-methyl- and 6α,9α-difluoro-16α-methyl-17α,21-dihydroxy-4-pregnene-3,11,20-trione 21-methanesulfonate, and
6α,9α-difluoro-16β-methyl- and 6α,9α-difluoro-16α-methyl-17α,21-dihydroxy-1,4-pregnadiene-3,11,20-trione 21-methanesulfonate, respectively.

In the same manner, substituting other 21-organic sulfonates corresponding to the above 21-methanesulfonates as the starting 11-hydroxy steroids of this example, there is produced the corresponding 11-keto steroid 21-organic sulfonate, such as, the 21-ethanesulfonate, 21-dodecanesulfonate, 21-(2-butanesulfonate), 21-cyclohexanesulfonate, 21-phenylmethanesulfonate, 21-o-toluenesulfonate, 21-p-toluenesulfonate, 21-o-bromobenzenesulfonate, 21-p-chlorobenzenesulfonate, 21-(o-, m-, p-nitrobenzenesulfonate), 21-anisole-2-sulfonate and the like. For example, 16α - methyl - 9α - fluoro - 17α,21 - dihydroxy - 1,4 - pregnadiene-3,11,20-trione 21-(2-butanesulfonate) is obtained as a crystalline solid.

Part E

EXAMPLE 1E

*6α-Methyl-9α,16α-Difluoro-11β,17α,21-Trihydroxy-1,4-Pregnadiene-3,20-Dione 21-Methanesulfonate (XV)*

Following the procedure of Example 1Ad, but substituting 6α-methyl-9α,16α-difluoro-11β,17α,21-trihydroxy-1,4-pregnadiene-3,20-dione (XIV) for 11β,17α,21-trihydroxy-4-pregnene-3,20-dione is productive of 6α-methyl-9α,16α - difluoro - 11β,17α,21 - trihydroxy - 1,4 - pregnadiene-3,20-dione 21-methanesulfonate (XV), a crystalline solid.

In the same manner, substituting

6α-methyl-9α,16β-difluoro-11β,17α,21-trihydroxy-1,4-pregnadiene-3,20-dione,
16β-fluoro- and 16α-fluoro-11β,17α,21-trihydroxy-4-pregnene-3,20-dione,
16β-fluoro- and 16α-fluoro-11β,17α,21-trihydroxy-1,4-pregnadiene-3,20-dione,
9α,16β-difluoro- and 9α,16α-difluoro-11β,17α,21-trihydroxy-4-pregnene-3,20-dione,
9α,16β-difluoro- and 9α,16α-difluoro-11β,17α,21-trihydroxy-1,4-pregnadiene-3,20-dione,
6α-methyl-16β-fluoro- and 6α-methyl-16α-fluoro-11β,17α,21-trihydroxy-4-pregnene-3,20-dione,
6α-methyl-16β-fluoro- and 6α-methyl-16α-fluoro-11β,17α,21-trihydroxy-1,4-pregnadiene-3,20-dione,
6α-methyl-9α,16β-difluoro- and 6α-methyl-9α,16α-difluoro-11β,17α,21-trihydroxy-4-pregnene-3,20-dione,
6α,16β-difluoro- and 6α,16α-difluoro-11β,17α,21-trihydroxy-4-pregnene-3,20-dione,
6α,16β-difluoro- and 6α,16α-difluoro-11β,17α,21-trihydroxy-1,4-pregnadiene-3,20-dione,
6α,9α,16β-trifluoro- and 6α,9α,16α-trifluoro-11β,17α,21-trihydroxy-4-pregnene-3,20-dione, and
6α,9α,16β-trifluoro- and 6α,9α,16α-trifluoro-11β,17α,21-trihydroxy-1,4-pregnadiene-3,20-dione for 6α-methyl-9α,16α-difluoro-11β,17α,21-trihydroxy-1,4-pregnadiene-3,20-dione, and following the procedure of Example 1Ad, is productive of 6α-methyl-9α,16β-difluoro-11β,17α,21-trihydroxy-1,4-pregnadiene-3,20-dione 21-methanesulfonate,
16β-fluoro- and 16α-fluoro-11β,17α,21-trihydroxy-4-pregnene-3,20-dione 21-methanesulfonate,
16β-fluoro- and 16α-fluoro-11β,17α,21-trihydroxy-1,4-pregnadiene-3,20-dione 21-methanesulfonate,
9α,16β-difluoro- and 9α,16α-difluoro-11β,17α,21-trihydroxy-4-pregnene-3,20-dione 21-methanesulfonate,
9α,16β-difluoro- and 9α,16α-difluoro-11β,17α,21-trihydroxy-1,4-pregnadiene-3,20-dione 21-methanesulfonate,
6α-methyl-16β-fluoro- and 6α-methyl-16α-fluoro-11β,17α,21-trihydroxy-4-pregnene-3,20-dione 21-methanesulfonate,
6α-methyl-16β-fluoro- and 6α-methyl-16α-fluoro-11β,17α,21-trihydroxy-1,4-pregnadiene-3,20-dione 21-methanesulfonate,
6α-methyl-9α,16β-difluoro- and 6α-methyl-9α,16α-difluoro-11β,17α,21-trihydroxy-4-pregnene-3,20-dione 21-methanesulfonate,
6α,16β-difluoro- and 6α,16α-difluoro-11β,17α,21-trihydroxy-4-pregnene-3,20-dione 21-methanesulfonate,
6α,16β-difluoro- and 6α,16α-difluoro-11β,17α,21-trihydroxy-1,4-pregnadiene-3,20-dione 21-methanesulfonate,
6α,9α,16β-trifluoro- and 6α,9α,16α-trifluoro-11β,17α,21-trihydroxy-4-pregnene-3,20-dione 21-methanesulfonate, and
6α,9α,16β-trifluoro- and 6α,9α,16α-trifluoro-11β,17α,21-trihydroxy-1,4-pregnadiene-3,20-dione 21-methanesulfonate, respectively.

In the same manner, substituting other appropriate organic sulfonyl chlorides, such as those named in the second paragraph of Example 1Aa, for methanesulfonyl chloride, in the reaction of this example, is productive of the corresponding 21-organic sulfonates, such as, the 21-ethanesulfonate, 21dodecanesulfonate, 21-(2-butanesulfonate), 21-cyclohexanesulfonate, 21-phenyl-methanesulfonate, 21-o-toluenesulfonate, 21-p - toluenesulfonate, 21 - o - bromobenzenesulfonate, 21-p-chlorobenzenesulfonate the 21-(o-, m-, p-nitrobenzenesulfonate), 21-anisole-2-sulfonate, and the like which otherwise correspond to the 21-methanesulfonate compounds described above in this example. For example, 6α-methyl-9α,16α-difluoro-11β, 17α,21-trihydroxy - 1,4 - pregnadiene-3,20-dione 21-phenylmethanesulfonate is obtained as a crystalline solid.

EXAMPLE 1E₁

*9α,16β-Difluoro-11β,17α,21-Trihydroxy-4-Pregnene-3,20-Dione 21-Methanesulfonate (XV)*

Following the procedure of Example 1Ad but substituting 9α,16β-difluoro-11β,17α,21-trihydroxy - 4 - pregnene-3,20-dione for the 11β,17α,21-trihydroxy-4-pregnene-3,20-dione is productive of 9α,16β-difluoro-11β,17α,21-trihydroxy-4-pregnene-3,20 - dione 21 - methanesulfonate (XV), a cyrstalline solid.

EXAMPLE 1E₂

*6α,16α-Difluoro-11β,17α,21-Trihydroxy-1,4-Pregnadiene-3,20-Dione 21-Methanesulfonate (XV)*

Following the procedure of Example 1Ad but substituting 6α,16α-difluoro-11β,17α,21-trihydroxy-1,4 - pregnadiene-3,20-dione for the 11β,17α,21-trihydroxy-4-pregnene-3,20-dione is is productive of 6α,16α-difluoro-11β, 17α,21-trihydroxy-1,4-pregnadiene-3,20-dione 21-methanesulfonate (XV), a crystalline solid.

EXAMPLE 2E

*6α-Methyl-9α,16α-Difluoro-17α,21-Dihydroxy-1,4-Pregnadiene-3,11,20-Trione 21-Methanesulfonate (XVI)*

Following the procedure of Example 2A, but substituting 6α-methyl-9α,16α-difluoro-11β,17α,21-trihydroxy-1,4-pregnadiene-3,20-dione 21 - methanesulfonate (XV) for 6α-fluoro-11β,17α,21-trihydroxy-1,4-pregnadiene-3,20-dione 21-methanesulfonate is productive of 6α-methyl-9α, 16α - difluoro-17α,21-dihydroxy-1,4-pregnadiene - 3,11,20-trione 21-methanesulfonate (XVI), a crystalline solid.

In the same manner, substituting

6α-methyl-9α,16β-difluoro-11β,17α,21 - trihydroxy - 1,4-pregnadiene-3,20-dione 21-methanesulfonate,
16β-fluoro- and 16α-fluoro-11β,17α,21 - trihydroxy - 4-pregnene-3,20-dione 21-methanesulfonate,
16β-fluoro- and 16α-fluoro-11β,17α,21-trihydroxy - 1,4-pregnadiene-3,20-dione 21-methanesulfonate,
9α,16β-difluoro- and 9α,16α-difluoro-11β,17α,21 - trihydroxy-4-pregnene-3,20-dione 21-methanesulfonate,
9α,16β-difluoro- and 9α,16α-difluoro-11β,17α,21 - trihydroxy-1,4-pregnadiene-3,20-dione 21-methanesulfonate
6α-methyl-16β-fluoro- and 6α-methyl-16α-fluoro-11β,17α, 21-trihydroxy-4-pregnene-3,20-dione 21 - methanesulfonate,
6α-methyl-16β-fluoro- and 6α-methyl-16α-fluoro-11β,17α, 21-trihydroxy-1,4-pregnadiene-3,20-dione 21 - methanesulfonate, 6α-methyl-9α,16β-difluoro- and 6α-methyl-9α,16α-difluoro-11β,17α,21-trihydroxy-4 - pregnene - 3,20 - dione 21-methanesulfonate, 6α,16β-difluoro- and 6α,16α-difluoro-11β,17α,21 - trihydroxy-4-pregnene-3,20-dione 21-methanesulfonate, 6α,16β-difluoro- and 6α,16α-difluoro-11β,17α,21 - trihydroxy-1,4-pregnadiene-3,20-dione 21-methanesulfonate, 6α,9α,16β-trifluoro- and 6α,9α,16α-trifluoro - 11β,17α,21-trihydroxy-4-pregnene-3,20-dione 21-methanesulfonate, and 6α,9α,16β-trifluoro- and 6α,9α,16α-trifluoro - 11β,17α,21-trihydroxy-1,4-pregnadiene-3,20-dione 21 - methanesulfonate, for 6α-fluoro-11β,17α,21-trihydroxy-1,4-pregnadiene-3,20-dione 21-methanesulfonate, and following the procedure of Example 2A, is productive of 6α-methyl-9α,16β-difluoro-17α,21-dihydroxy-1,4 - pregnadiene-3,11,20-trione 21-methanesulfonate, 16β-fluoro- and 16α-fluoro-17α,21-dihydroxy-4-pregnene-3,11,20-trione 21-methanesulfonate, 16β-fluoro- and 16α-fluoro-17α,21-dihydroxy-1,4-pregnadiene-3,11,20-trione 21-methanesulfonate, 9α,16β,-difluoro- and 9α,16α-difluoro-17α,21 - dihydroxy-4-pregnene-3,11,20-trione 21-methanesulfonate, 9α,16β-difluoro- and 9α,16α-difluoro-17α,21-dihydroxy-1,4-pregnadiene-3,11,20-trione 21-methanesulfonate, 6α-methyl-16β-fluoro- and 6α-methyl-16α-fluoro - 17α,21-dihydroxy-4-pregnene-3,11,20-trione 21 - methanesulfonate, 6α-methyl-16β-fluoro- and 6α-methyl-16α-fluoro-17α,21-dihydroxy-1,4-pregnadiene-3,11,20-trione 21 - methanesulfonate, 6α-methyl-9α,16β-difluoro- and 6α-methyl-9α,16α-difluoro-17α,21-dihydroxy - 4 - pregnene - 3,11,20 - trione 21-methanesulfonate, 6α,16β-difluoro- and 6α,16α-difluoro-17α,21 - dihydroxy-4-pregnene-3,11,20-trione 21-methanesulfonate, 6α,16β-difluoro- and 6α,16α-difluoro-17α,21-dihydroxy-1,4-pregnadiene-3,11,20-trione 21-methanesulfonate, 6α,9α,16β-trifluoro- and 6α,9α,16α-trifluoro-17α,21-dihydroxy-4-pregnene-3,11,20-trione 21-methanesulfonate, and 6α,9α,16β-trifluoro- and 6α,9α,16α-trifluoro-17α,21 - dihydroxy-1,4-pregnadiene-3,20-dione 21-methanesulfonate, respectively.

In the same manner, substituting other 21-organic sulfonates corresponding to the above 21-methanesulfonates as the starting 11-hydroxy steroids of this example, there is produced the corresponding 11-keto steroid 21-organic sulfonate, such as, the 21-ethanesulfonate, 21-dodecanesulfonate, 21-(2-butanesulfonate), 21 - cyclohexanesulfonate, 21-phenylmethanesulfonate, 21-o-toluenesulfonate, 21-p-toluenesulfonate, 21-o-bromobenzenesulfonate, 21-p-chlorobenzenesulfonate, 21-(o-, m-, p - nitrobenzenesulfonate), 21-anisole-2-sulfonate and the like. For example, 6α - methyl-9α,16α-difluoro-17α,21-dihydroxy-1,4-pregnadiene-3,11,20-trione 21-anisole-2-sulfonate is obtained as a crystalline solid.

The compositions of this invention, owing to the remarkable split between anti-inflammatory and gluco-corticoid activities of the principal active ingredients, offer effective anti-inflammatory therapy substantially devoid of the catabolic effects normally attributed to excessive liver glycogen deposition. Thus treatment can proceed with relative freedom from such untoward effects as osteoporosis, ulcer formation, cushingnoid habitus, purpura and the like, thereby enhancing the safety and usefulness of both short and long term steroid therapy. These compositions are thus useful in treating inflammatory conditions of birds and mammals. In particular, they find application in the clinical management in humans and animals of rheumatoid arthritis and other collagen diseases and the various allergic, dermatologic, ocular and other conditions known to be responsive to the anti-inflammatory corticosteroids. Administration can be by the oral, intramuscular or intrasynovial (intra-articular and intrabursal) routes.

The solid oral dosage forms of the present compositions comprise from about 1 to about 100 mg. of principal active ingredient per dosage unit, the preferred range being from about 5 to about 50 mg. These dosage units can consist of such conventional pharmaceutical forms as tablets, capsules, pills, granules, powders, and the like, tablets being preferred. Liquid forms for oral or injectable use include aqueous or oil suspensions, the former being preferred. Oral liquid forms comprise the above indicated unit doses in from about 5 to 15 ml. of suspending vehicle. The usual concentration of principal active ingredient in a sterile suspension vehicle is from about 0.25% to about 50%, representing from about 5 to about 50 mg. of the steroid in from about 0.1 to about 2 ml. of suspending vehicle.

The dosage of the compositions herein comprises the administration of single doses of from about 1 to about 100 mg. of principal active ingredient, from about 5 to about 50 mg. being preferred, given either by the oral or parenteral route 1 to 4 times daily. However, exact dosage depends on considerations of age, weight, and condition of the patient and the route of administration.

As indicated heretofore, the solid oral unit dosage forms of the novel compositions containing the said 21-organic sulfonates can be prepared as tablets, capsules, pills, powders, granules and the like, tablets being preferred. The active ingredients are admixed with the appropriate solid diluents or tableting adjuvants such as cornstarch, lactose, talc, dicalcium phosphate, sodium acid phosphate, stearic acid, magnesium or calcium stearate, gums and the like. For encapsulated products, any of the conventional capsulating materials employed in pharmaceutical practice can be used where no incompatibility exists.

For parenteral administration of the active ingredients hereof a suspension of the active ingredient in an aqueous suspending medium is preferred, owing to the low order of solubility usually characterizing these compounds. However, where solubility permits, aqueous solutions prepared in the usual manner are appropriate. In preparing the suspensions, conventional preservatives, buffers, isotonic agents and suspending agents can be advantageously employed in conjunction with the active ingredients. Suitable preservatives include chlorobutanol, myristyl-gamma-picolinium chloride, benzyl alcohol, methyl- and propylparaben and sodium ethylmecurithiosalicylate. Sodium chloride is preferred as an isotonic agent. Among the suspending agents which are suitable for present purposes are polyethylene glycols such as 4000 or 6000, polyvinylpyrrolidone, sodium carboxymethylcellulose, dextran, methylcellulose, and surfactants such as polysorbate 80. The polyvinylpyrrolidone is characterized in having a viscosity coefficient, i.e., a K value, of 26 to 36, and a molecular weight of about 40,000.

The term "unit dosage form" as applied to the present compositions refers to physically discrete units suitable as unitary dosages for human subjects, each unit containing a predetermined quantity of active material intended to produce the desired therapeutic effect in association with the required pharmaceutical carrier. The specifications for the novel unit dosage form of this invention are dictated by and directly dependent on (a) the unique characteristics of the active material with respect to the particular therapeutic effect to be achieved, and (b) the limitations inherent in the art of compounding such an active material for therapeutic use in humans, as disclosed in detail herein, these being features of the present invention. Examples of suitable unit dosage forms, as heretofore described, are tablets, capsules, pills, powder packets, wafers, cachets, teaspoonfuls, tablespoonfuls, dropperfuls, and segregated multiples of the foregoing, and other forms alluded to herein.

In addition to the steroid 21-organic sulfonates heretofore described as the principal active ingredients of the present compositions, various supplementary and complementary active ingredients can be added to give products having particularly advantageous properties for the treatment of specific clinical conditions. Thus, for example, there can be combined with the said principal active ingredient such other agents as analgesics, i.e., aspirin (about 200 to about 400 mg. per dosage unit), aspirin anhydride (about 300 mg. per dosage unit), salicylamide (about 200 to about 400 mg. per dosage unit), N-acetyl-p-aminophenol (about 200 to about 400 mg. per dosage unit), and the like; muscle relaxants, i.e., styramate (about 200 to about 400 mg. per dosage unit), meprobamate (about 100 to about 400 mg. per dosage unit), chloromethazanone (about 75 to about 150 mg. per dosage unit), chlorzoxazone (about 125 to about 250 mg. per dosage unit), corisoprodol (about 250 to about 500 mg. per dosage unit), and the like; tranquilizers, i.e., ectylurea (about 100 to about 300 mg. per dosage unit), reserpine (about 0.25 to about 1 mg. per dosage unit), chlorpromazine (about 25 to 250 mg. per dosage unit), and the like; sedatives, i.e., phenobarbital (about 8 to about 60 mg. per dosage unit), methprylon (about 50 to about 100 mg. per dosage unit), and the like; and antibiotics, i.e., the tetracyclines (about 25 to about 500 mg. per dosage unit), novobiocin (about 25 to about 1000 mg. per dosage unit), chloramphenicol (about 25 to about 250 mg. per dosage unit), penicillin (about 50,000 to about 500,000 units per dosage unit), erythromycin (about 100 to about 500 mg. per dosage unit), and the like. The foregoing combinations are representative of those in which the basic steroid activity of the said 21-organic sulfonates is complemented, supplemented, or potentiated by the activities of the secondary active ingredients. Thus, patients requiring such hormone therapy who display in addition the symptoms for which the said secondary ingredients are conventionally employed are appropriate candidates for combined therapy. Normally, the quantities of such secondary active ingredients present in the combination are those conventionally employed where the said secondary ingredients are administered independently.

The following examples illustrate the best mode contemplated by the inventors for carrying out the invention with respect to the compositions but are not to be construed as limiting the scope thereof.

COMPOSITION EXAMPLE 1.—TABLETS

A lot of 10,000 compressed tablets, each tablet containing 1 mg. of 6α-methyl-9α-fluoro-11β,17α,21-trihydroxy-1,4-pregnadiene-3,20-dione 21-methanesulfonate, is prepared from the following ingredients:

|  | Gm. |
|---|---|
| 6α - methyl - 9α - fluoro - 11β,17α,21-trihydroxy-1,4-pregnadiene-3,20-dione 21-methanesulfonate | 10 |
| Calcium stearate | 6.5 |
| Lactose, bolted | 1000 |

The finely powdered ingredients are thoroughly mixed and granulated with 10% starch-paste and dried at 120° F. for 20 hours. The dried granules are passed through a No. 16 screen and lubricated with a mixture of 32.5 gm. of bolted starch and 6.5 gm. of calcium stearate. The granulation is then compressed into tablets in the usual manner.

The above tablets are used orally in adult humans for the treatment of moderately severe arthritic conditions amenable to steroid therapy on a dosage of 1 tablet given 4 times daily.

COMPOSITION EXAMPLE 2.—CAPSULES

A lot of 10,000 hard-gelatin, two-piece capsules, each capsule containing 100 mg. of 6α-fluoro-11β,17α,21-trihydroxy-1,4-pregnadiene-3,20-dione 21-methanesulfonate, is prepared from the following ingredients:

|  | Gm. |
|---|---|
| 6α - fluoro - 11β,17α,21-trihydroxy-1,4-pregnadiene-3,20-dione 21-methanesulfonate | 1000 |
| Starch-lactose mixture | 2000 |

The finely powdered steroid and the starch-lactose mixture are combined and encapsulated in the usual manner in two-piece hard gelatin capsules.

The above capsules are employed orally in adult humans for the treatment of moderately severe bronchial asthma on a dosage of 1 capsule given 3 times daily.

COMPOSITION EXAMPLE 3.—ORAL SUSPENSION

A lot of 1000 ml. of an aqueous suspension for oral use, each teaspoonful (5 ml.) of which contains 25 mg. of 6α,9α-difluoro-11β,17α,21-trihydroxy-1,4-pregnadiene-3,20-dione 21-methanesulfonate, is prepared from the following ingredients:

| Citric acid | gm | 2 |
|---|---|---|
| Benzoic acid | gm | 1 |
| Methylparaben | gm | 2 |
| Propylparaben | gm | 0.5 |
| Glycerin | ml | 150 |
| 6α,9α-difluoro - 11β,17α,21 - trihydroxy - 1,4 - pregnadiene-3,20-dione 21-methanesulfonate | gm | 5 |
| Tragacanth powder | gm | 7.5 |
| Flavor | ml | 0.2 |
| Sucrose | gm | 400 |
| Deionized water, q.s. 1000 ml. | | |

The citric acid is dissolved in 500 ml. of water. The benzoic acid and parabens are added to the glycerin in a separate container, followed by addition of the finely divided steroid, tragacanth and flavors in that order. The resulting mixture is stirred until a uniform suspension is achieved, the suspension being added to the citric acid solution with rapid stirring. The sucrose and then the water are added to bring the final volume to 1000 ml. with thorough mixing.

The above suspension is employed orally in adult humans for the treatment of inflammatory conditions of the eye amenable to steroid therapy on a dosage of 1 teaspoonful given 3 times daily.

COMPOSITION EXAMPLE 4.—INJECTABLE SUSPENSION

A lot of 1000 ml. of sterile aqueous suspension, containing 20 mg. of 6α-fluoro-17α,21-dihydroxy-1,4-pregnadiene-3,11,20-trione 21-methanesulfonate in each milliliter, is prepared from the following ingredients:

|  | Gm. |
|---|---|
| Polyethylene glycol 4000 | 30 |
| Sodium chloride | 9 |
| Polysorbate 80 | 2 |
| Methylparaben | 1.8 |
| Propylparaben | 10 |
| 6α - fluoro - 17α,21 - dihydroxy - 1,4 - pregnadiene-3,11,20-trione 21-methanesulfonate | 20 |
| Water for injection, q.s. 1000 ml. | |

The parabens are added to a major portion of the water with stirring and heating to 65° C. The resulting solution is cooled to room temperature and the remaining ingredients, except for the steroid, are dissolved therein. The balance of the water is added, and the solution is sterilized by filtration. The steroid, previously air micronized to a particle size of 99% less than about 15 microns and sterilized with ethylene oxide gas, is then added to the sterile vehicle. The mixture is then passed through a sterilized colloid mill and filled under aseptic conditions into sterile containers and sealed.

The above suspension is employed in adult humans in the treatment of dermatomyositis on a dosage of 1 ml. given intramuscularly 2 times daily.

COMPOSITION EXAMPLE 5

For the active ingredients of each of Composition Examples 1 through 4 there can be substituted equal amounts of 11β,17α,21-trihydroxy-1,4-pregnadiene-3,20-dione 21-methanesulfonate,
9α-fluoro-11β,17α,21-trihydroxy-4-pregnene-3,20-dione 21-methanesulfonate,
9α-fluoro-11β,17α,21-trihydroxy-1,4-pregnadiene-3,20-dione 21-methanesulfonate,
6α-methyl-11β,17α,21-trihydroxy-4-pregnene-3,20-dione 21-methanesulfonate,
6α-methyl-11β,17α,21-trihydroxy-1,4-pregnadiene-3,20-dione 21-methanesulfonate,
6α-methyl-9α-fluoro-11β,17α,21-trihydroxy-4-pregnene-3,20-dione 21-methanesulfonate,
6α-fluoro-11β,17α,21-trihydroxy-4-pregnene-3,20-dione 21-methanesulfonate,
6α,9α-difluoro-11β,17α,21-trihydroxy-4-pregnene-3,20-dione 21-methanesulfonate,
17α,21-dihydroxy-4-pregnene-3,11,20-trione 21-methanesulfonate,
17α,21-dihydroxy-1,4-pregnadiene-3,11,20-trione 21-methanesulfonate,
9α-fluoro-17α,21-dihydroxy-4-pregnene-3,11,20-trione 21-methanesulfonate,
9α-fluoro-17α,21-dihydroxy-1,4-pregnadiene-3,11,20-trione 21-methanesulfonate,
6α-methyl-17α,21-dihydroxy-4-pregnene-3,11,20-trione 21-methanesulfonate,
6α-methyl-17α,21-dihydroxy-1,4-pregnadiene-3,11,20-trione 21-methanesulfonate,
6α-methyl-9α-fluoro-17α,21-dihydroxy-4-pregnene-3,11,20-trione 21-methanesulfonate,
6α,methyl-9α-fluoro-17α,21-dihydroxy-1,4-pregnadiene-3,11,20-trione 21-methanesulfonate,
6α-fluoro-17α,21-dihydroxy-4-pregnene-3,11,20-trione 21-methanesulfonate,
6α,9α-difluoro-17α,21-dihydroxy-4-pregnene-3,11,20-trione 21-methanesulfate, and
6α,9α-difluoro-17α,21-dihydroxy-1,4-pregnadiene-3,11,20-trione 21-methanesulfonate.

The resulting 1-mg. tablets, 100-mg. capsules, 25-mg. per teaspoonful oral aqueous suspensions and 20-mg. per ml. injectable aqueous suspensions can be administered on a schedule of 1 tablet 4 times daily, 1 capsule 3 times daily, 1 teaspoonful of aqueous suspension 3 times daily, and 1 ml. of injectable suspension intramuscularly 2 times daily, respectively, in the treatment of inflammatory conditions amenable to steroid therapy.

COMPOSITION EXAMPLE 6

In addition to the 21-methanesulfonates of Composition Examples 1 through 5, the corresponding 21-ethanesulfonates, 21-propanesulfonates, 21-butanesulfonates, 21-pentanesulfontes, 21-hexanesulfonates, 21-nonanesulfonates, 21-dodecanesulfonates, 21-(2-propanesulfonates), 21-(2-butanesulfonates), 21-(2-pentanesulfonates), 21-(2-octanesulfonates), 21-tertiary-butanesulfonates, 21-cyclopentanesulfonates, 21-cyclohexanesulfonates, 21-phenylmethanesulfonates, 21-phenylethanesulfonates, 21-benzenesulfonates, 21-o-toluenesulfonates, 21-p-toluenesulfonates, 21-o-bromobenzenesulfonates, 21-p-bromobenzenesulfonates, 21-o-chlorobenzenesulfonates, 21-p-chlorobenzenesulfonates, 21-(o-, m-, p-nitrobenzenesulfonates), 21-anisole-2-sulfonates, and 21-anisole-4-sulfonates can be substituted in equal amounts for the actice ingredient in each of the foregoing Composition Examples 1 through 4. The resulting compositions are given on the dosage schedule indicated above for the treatment of inflammatory conditions amenable to steroid therapy.

COMPOSITION EXAMPLE 7.—TABLETS

A lot of 10,000 tablets, each tablet containing 5 mg. of 6α-methyl-9α-fluoro-11β,16α,17α,21-tetrahydroxy-1,4-pregnadiene-3,20-dione 21-methanesulfonate, is prepared from the following ingredients:

| | Gm. |
|---|---|
| 6α-methyl-9α-fluoro-11β,16α,17α,21-tetrahydroxy-1,4-pregnadiene-3,20-dione 21-methanesulfonate | 50 |
| Talc | 50 |
| Dicalcium phosphate | 1000 |

The finely powdered ingredients are thoroughly mixed and granulated with syrup-starch paste. After drying, starch and calcium stearate are added and the final mixture is compressed into tablets in the usual manner.

The above tablets are used orally in adult humans for the treatment of bronchial asthma on a dosage of 1 tablet given 4 times daily.

COMPOSITION EXAMPLE 8.—CAPSULES

A lot of 10,000 hard gelatin capsules, each capsule containing 50 mg. of 11β,16α,17α,21-tetrahydroxy-1,4-pregnadiene-3,20-dione 21-methanesulfonate, is prepared from the following ingredients:

| | Gm. |
|---|---|
| 11β,16α,17α,21-tetrahydroxy-1,4-pregnadiene-3,20-dione 21-methanesulfonate | 500 |
| Cornstarch | 1500 |
| Magnesium stearate | 250 |

The finely powdered ingredients are thoroughly mixed and then filled into hard gelatin capsules in the usual manner.

The above capsules are employed orally in adult humans for the treatment of moderately severe inflammatory conditions of the eye on a dosage of 1 capsule given 3 times daily.

COMPOSITION EXAMPLE 9.—ORAL SUSPENSION

A lot of 1000 ml. of an aqueous suspension, each teaspoonful (5 ml.) of which contains 25 mg. of 6α,9α-difluoro-11β,16α,17α,21-tetrahydroxy-1,4-pregnadiene-3,20-dione 21-methanesulfonate, is prepared from the following ingredients:

| | |
|---|---|
| Methylparaben gm | 0.75 |
| Propylparaben gm | 0.25 |
| Saccharin sodium gm | 1.25 |
| Cyclamate sodium (sodium cyclohexyl-sulfamate) gm | 0.25 |
| Glycerin ml | 300 |
| Tragacanth powder gm | 1 |
| F.D.C. orange dye gm | 0.75 |
| 6α,9α-difluoro-11β,16α,17α,21-tetrahydroxy-1,4-pregnadiene-3,20-dione 21-methanesulfonate gm | 5 |
| Deionized water, q.s. 1000 ml. | |

The above ingredients are thoroughly mixed and homogenized to give a suspension.

The above suspension is employed orally in adult humans for the treatment of moderately severe allergic conditions amenable to steroid therapy on a dosage of 1 teaspoonful given 3 times daily.

COMPOSITION EXAMPLE 10.—INJECTABLE SUSPENSION

A lot of 1000 ml. of a sterile aqueous suspension, each milliliter containing 20 mg. of 6α-methyl-11β,16α,17α,21-tetrahydroxy-1,4-pregnadiene-3,20-dione 21-methanesulfonate, is prepared from the following ingredients:

| | Gm. |
|---|---|
| Sodium chloride | 9 |
| Preservative | 0.2 |
| 6α-methyl-11β,16α,17α,21-tetrahydroxy-1,4-pregnadiene-3,20-dione 21-methanesulfonate | 20 |
| Water for injection, q.s. 1000 ml. | |

The sodium chloride and preservative are dissolved in the water and the resulting mixture is sterilized by passage through a sterilizing filter. The steroid is micronized, sterilized by exposure to sterilizing vapor and added aseptically to the sterile aqueous solution. The resulting mixture is passed through a sterile homogenizer to obtain a uniform suspension. The suspension is then filled aseptically into sterile vials.

The above suspension is employed in adult humans by injection into the affected joint in the treatment of inflammatory conditions of the joint on a dosage of 1 ml. given 2 times daily.

COMPOSITION EXAMPLE 11

For the active ingredients of each of Examples 7 through 10 there can be substituted equal amounts of 11$\beta$,16$\alpha$,17$\alpha$,21-tetrahydroxy-4-pregnene-3,20-dione 21-methanesulfonate,
9$\alpha$-fluoro-11$\beta$,16$\alpha$,17$\alpha$,21-tetrahydroxy-4-pregnene-3,20-dione 21-methanesulfonate,
6$\alpha$-methyl-11$\beta$,16$\alpha$,17$\alpha$,21-tetrahydroxy-4-pregnene-3,20-dione 21-methanesulfonate,
6$\alpha$-methyl-11$\beta$,16$\alpha$,17$\alpha$,21-tetrahydroxy-1,4-pregnadiene-3,20-dione 21-methanesulfonate,
6$\alpha$-methyl-9$\alpha$-fluoro-11$\beta$,16$\alpha$,17$\alpha$,21-tetrahydroxy-4-pregnene-3,20-dione 21-methanesulfonate,
6$\alpha$-methyl-9$\alpha$-fluoro-11$\beta$,16$\alpha$,17$\alpha$,21-tetrahydroxy-1,4-pregnadiene-3,20-dione 21-methanesulfonate,
6$\alpha$-fluoro-11$\beta$,16$\alpha$,17$\alpha$,21-tetrahydroxy-4-pregnene-3,20-dione 21-methanesulfonate,
6$\alpha$-fluoro-11$\beta$,16$\alpha$,17$\alpha$,21-tetrahydroxy-1,4-pregnadiene-3,20-dione 21-methanesulfonate,
6$\alpha$,9$\alpha$-difluoro-11$\beta$,16$\alpha$,17$\alpha$,21-tetrahydroxy-4-pregnene-3,20-dione 21-methanesulfonate, and
6$\alpha$,9$\alpha$-difluoro-11$\beta$,16$\alpha$,17$\alpha$,21-tetrahydroxy-1,4-pregnadiene-3,20-dione 21-methanesulfonate.

The resulting 5 mg. tablets, 50 mg. capsules, 25 mg. per teaspoonful oral aqueous suspensions and 20 mg. per ml. injectable aqueous suspensions can be administered on a schedule of 1 tablet 4 times daily, 1 capsule 3 times daily, 1 teaspoonful of aqueous suspension 3 times daily, and 1 ml. of injectable suspension intramuscularly 2 times daily, respectively, in the treatment of inflammatory conditions amenable to steroid therapy.

COMPOSITION EXAMPLE 12

In addition to the 21-methanesulfonates of Composition Examples 7 through 11, the corresponding 21-ethanesulfonates, 21-dodecanesulfonates, 21-(2-butanesulfonates), 21-cyclohexanesulfonates, 21-phenylmethanesulfonates, 21-o-toluenesulfonates, 21-p-toluenesulfonates, 21-o-bromobenzenesulfonates, 21-p-chlorobenzenesulfonates, 21-(o-, m-, p-nitrobenzenesulfonates) and 21-anisole-2-sulfonates can be substituted in equal amounts for the active ingredient in each of the foregoing Composition Examples 7 through 10. The resulting compositions are given on the dosage schedule indicated above for the treatment of inflammatory conditions amenable to steroid therapy.

COMPOSITION EXAMPLE 13.—TABLETS

A lot of 10,000 tablets, each tablet containing 5 mg. of 6$\alpha$-methyl-9$\alpha$-fluoro-11$\beta$,16$\alpha$,17$\alpha$,21-tetrahydroxy-1,4-pregnadiene-3,20-dione 16-acetate 21-methanesulfonate, is prepared from the following ingredients:

| | Gm. |
|---|---|
| 6$\alpha$-methyl-9$\alpha$-fluoro-11$\beta$,16$\alpha$,17$\alpha$,21-tetrahydroxy-1,4-pregnadiene-3,20-dione 16-acetate 21-methanesulfonate | 50 |
| Lactose | 1000 |

The finely powdered ingredients are thoroughly mixed and granulated with syrup-starch paste. After drying, starch and calcium stearate are added and the final mixture is compressed into tablets in the usual manner.

The above tablets are used orally in adult humans in the treatment of moderately severe inflammatory conditions of the eye on a dosage of 1 tablet given 4 times daily.

COMPOSITION EXAMPLE 14.—CAPSULES

A lot of 10,000 hard-gelatin, two-piece capsules, each capsule containing 50 mg. of 6$\alpha$,9$\alpha$-difluoro-11$\beta$,16$\alpha$,17$\alpha$,21-tetrahydroxy-1,4-pregnadiene-3,20-dione 16-acetate 21-methanesulfonate, is prepared from the following ingredients:

| | Gm. |
|---|---|
| 6$\alpha$,9$\alpha$-difluoro-11$\beta$,16$\alpha$,17$\alpha$,21-tetrahydroxy-1,4-pregnadiene-3,20-dione 16-acetate 21-methanesulfonate | 500 |
| Starch-lactose mixture | 2000 |

The finely powdered steroid and the starch-lactose mixture are combined and encapsulated in the usual manner in two-piece hard gelatin capsules.

The above capsules are employed orally in dogs in the treatment of moderately severe arthritis on a dosage of 1 capsule given 3 times daily.

COMPOSITION EXAMPLE 15.—ORAL SUSPENSION

A lot of 1000 ml. of an aqueous suspension, each teaspoonful (5 ml.) of which contains 25 mg. of 9$\alpha$-fluoro-11$\beta$,16$\alpha$,17$\alpha$,21-tetrahydroxy-1,4-pregnadiene-3,20-dione 16-acetate 21-methanesulfonate, is prepared from the following ingredients:

| | Gm. |
|---|---|
| Preservative | 3.5 |
| Surfactant | 0.9 |
| 9$\alpha$-fluoro-11$\beta$,16$\alpha$,17$\alpha$,21-tetrahydroxy-1,4-pregnadiene-3,20-dione 16-acetate 21-methanesulfonate | 5 |
| Deionized water, q.s. 1000 ml. | |

The preservative is added to 500 ml. of water. The surfactant is then added, followed by the micronized steroid. The whole is made up to volume with the balance of the water and passed through a homogenizer.

The above suspension is employed orally in adult humans in the treatment of severe asthma on a dosage of 1 teaspoonful given 3 times daily.

COMPOSITION EXAMPLE 16.—INJECTABLE SUSPENSION

A lot of 1000 ml. of sterile aqueous suspension, containing 20 mg. of 9$\alpha$-fluoro-16$\alpha$,17$\alpha$,21-trihydroxy-1,4-pregnadiene-3,11,20-trione 16-acetate 21-methanesulfonate in each milliliter, is prepared from the following ingredients:

| | Gm. |
|---|---|
| Sodium citrate | 15.75 |
| Polyvinylpyrrolidone | 5 |
| Methylparaben | 1.57 |
| Propylparaben | 0.157 |
| 9$\alpha$-fluoro-16$\alpha$,17$\alpha$,21-trihydroxy-1,4-pregnadiene-3,11,20-trione 16-acetate 21-methanesulfonate | 20 |
| Water for injection, q.s., 1000 ml. | |

The vehicle is prepared and sterilized by the usual methods. To the sterile vehicle is added under aseptic conditions the steroid which has been previously micronized to a particle size less than about 10 microns and sterilized with ethylene oxide gas. The resulting mixture is passed through a sterile colloid mill and filled under aseptic conditions into sterile vials.

The above suspension is employed by injection in adult humans in the treatment of moderately severe scleroderma on a dosage of 1 ml. given intramuscularly 2 times daily.

COMPOSITION EXAMPLE 17

For the active ingredients of each of Composition Examples 13 through 16 there can be substituted equal amounts of 11$\beta$,16$\alpha$,17$\alpha$,21-tetrahydroxy-4-pregnene-3,20-dione 16-acetate 21-methanesulfonate, 11β,16α,17α,21-tetrahydroxy-1,4-pregnadiene-3,20 - dione 16-acetate 21-methanesulfonate,
9α-fluoro-11β,16α,17α,21-tetrahydroxy - 4 - pregnene-3,20-dione 16-acetate 21-methanesulfonate,
6α-methyl - 11β,16α,17α,21 - tetrahydroxy - 4 - pregnene-3,20-dione 16-acetate 21-methanesulfonate,
6α - methyl - 11β,16α,17α,21 - tetrahydroxy - 1,4 - pregnadiene-3,20-dione 16-acetate 21-methanesulfonate,
6α-methyl - 9α - fluoro - 11β,16α,17α,21 - tetrahydroxy - 4 - pregnene-3,20-dione 16-acetate 21-methanesulfonate,
6α-methyl - 9α - fluoro - 11β,16α,17α,21-tetrahydroxy-1,4-pregnadiene-3,20-dione 16-acetate 21-methanesulfonate,
6α - fluoro - 11β,16α,17α,21 - tetrahydroxy - 4 - pregnene-3,20-dione 16-acetate 21-methanesulfonate,
6α - fluoro - 11β,16α,17α,21 - tetrahydroxy - 1,4 - pregnadiene-3,20-dione 16-acetate 21-methanesulfonate,
6α,9α - difluoro - 11β,16α,17α,21-tetrahydroxy - 4 - pregnene-3,20-dione 16-acetate 21-methanesulfonate,
6α,9α - difluoro - 11β,16α,17α,21-tetrahydroxy-1,4-pregnadiene-3,20-dione 16-acetate 21-methanesulfonate,
16α,17α,21 - trihydroxy - 4 - pregnene - 3,11,20 - trione 16-acetate 21-methanesulfonate,
16α,17α,21 - trihydroxy - 1,4-pregnadiene - 3,11,20-trione 16-acetate 21-methanesulfonate,
9α - fluoro - 16α,17α,21 - trihydroxy-4-pregnene - 3,11,20-trione 16-acetate 21-methanesulfonate,
6α - methyl - 16α,17α,21 - trihydroxy-4-pregnene-3,11,20-trione 16-acetate 21-methanesulfonate,
6α - methyl - 16α,17α,21 - trihydroxy - 1,4 - pregnadiene-3,11,20-trione 16-acetate 21-methanesulfonate,
6α - methyl - 9α - fluoro - 16α,17α,21 - trihydroxy-4-pregnene-3,11,20-trione 16-acetate 21-methanesulfonate,
6α-methyl - 9α - fluoro -16α,17α,21 - trihydroxy - 1,4-pregnadiene-3,11,20-trione 16-acetate 21-methanesulfonate,
6α-fluoro - 16α,17α,21 - trihydroxy - 4 - pregnene - 3,11,20-trione 16-acetate 21-methanesulfonate,
6α-fluoro-16α,17α,21-trihydroxy-1,4-pregnadiene - 3,11,20-trione 16-acetate 21-methanesulfonate,
6α,9α - difluoro - 16α,17α,21 - trihydroxy - 4 - pregnene-3,11,20-trione 16-acetate 21-methanesulfonate, and
6α,9α - difluoro - 16α,17α,21 - trihydroxy - 1,4 - pregnadiene-3,11,20-trione 16-acetate 21-methanesulfonate.

The resulting 5 mg. tablets, 50 mg. capsules, 25 mg. per teaspoonful oral aqueous suspensions and 20 mg. per ml. injectable aqueous suspensions can be administered on a schedule of 1 tablet 4 times daily, 1 capsule 3 times daily, 1 teaspoonful of aqueous suspension 3 times daily, and 1 ml. of injectable suspension intramuscularly 2 times daily, respectively, in the treatment of inflammatory conditions amenable to steroid therapy.

COMPOSITION EXAMPLE 18

In addition to the 16-acetates of Composition Examples 13 through 17, the corresponding 16-formates, 16-propionates, 16-butyrates, 16-valerates, 16-hexanoates, 16-laurates, 16-trimethylacetates, 16-isobutyrates, 16-isovalerates, 16-tertiarybutylacetates, 16-(β-cyclopentylpropionates), 16-cyclohexanecarboxylates, 16-cyclohexylacetates, 16-benzoates, 16-phenylacetates, 16-(β-phenylpropionates), 16-(o-, m-, p-toluates), 16-hemisuccinates, 16-hemiadipates, 16-acrylates, 16-crotonates, 16-propiolates, 16-(2-butynoates), 16-undecolates, 16-cinnamates, 16-maleates and 16-citraconates can be substituted in equal amounts for the active ingredient in each of the foregoing Composition Examples 13 through 16. The resulting compositions are given on the dosage schedule indicated above for the treatment of inflammatory conditions amenable to steroid therapy.

COMPOSITION EXAMPLE 19

In addition to the 21-methanesulfonates of Composition Examples 13 through 18, the corresponding 21-ethanesulfonates, 21-dodecanesulfonates, 21-(2-butanesulfonates), 21-cyclohexanesulfonates, 21-phenylmethanesulfonates, 21-o-toluenesulfonates, 21-p-toluenesulfonates, 21-o-bromobenzenesulfonates, 21 - p-chlorobenzenesulfonates, 21-(o-, m-, p-nitrobenzenesulfonates), and 21-anisole-2-sulfonates can be substituted in equal amounts for the active ingredient in each of the foregoing Composition Examples 13 through 16. The resulting compositions are given on the dosage schedule indicated above for the treatment of inflammatory conditions amenable to steroid therapy.

COMPOSITION EXAMPLE 20.—TABLETS

A lot of 10,000 tablets, each tablet containing 5 mg. of 9α-fluoro-11β,16α,17α,21-tetrahydroxy-1,4-pregnadiene-3,20-dione 16,17-acetonide 21-methanesulfonate, is prepared from the following ingredients:

| | Gm. |
|---|---|
| 9α-fluoro-11β,16α,17α,21-tetrahydroxy-1,4 - pregnadiene-3,20-dione 16,17-acetonide 21-methanesulfonate | 50 |
| Lactose | 500 |
| Dicalcium phosphate | 1000 |

The finely divided ingredients are thoroughly mixed and granulated with syrup-starch paste. Starch and calcium stearate are added as lubricants and the granulations are compressed into tablets by the usual method.

The above tablets are used orally in humans in the treatment of moderately severe inflammatory conditions of the eye on a dosage of 1 tablet given 4 times daily.

COMPOSITION EXAMPLE 21.—CAPSULES, SOFT GELATIN

A lot of 10,000 soft-gelatin capsules, each capsule containing 50 mg. of 6α,9α-difluoro-11β,16α,17α,21-tetrahydroxy-1,4 - pregnadiene - 3,20 - dione 16,17-acetonide 21-methanesulfonate, is prepared from the following ingredients:

| | Gm. |
|---|---|
| 6α,9α - difluoro - 11β,16α,17α,21 - tetrahydroxy - 1,4-pregnadiene-3,20-dione 16,17-acetonide 21-methanesulfonate | 500 |
| Corn oil | Q.s. |

A uniform dispersion of the steroid in the corn oil is prepared and the dispersion is filled into soft-gelatin capsules in the usual manner.

The above capsules are employed orally in adult humans in the treatment of severe allergic conditions amenable to steroid therapy on a dosage of 1 capsule given 3 times daily.

COMPOSITION EXAMPLE 22.—ORAL SUSPENSION

A lot of 1000 ml. of an aqueous suspension, each teaspoonful (5 ml.) of which contains 25 mg. of 9α-fluoro-16α,17α,21 - trihydroxy - 1,4 - pregnadiene-3,11,20-trione 16,17-acetonide 21-methanesulfonate, is prepared from the following ingredients:

| | Gm. |
|---|---|
| Preservative | 2 |
| Flavor, q.s. | |
| 9α-fluoro-16α,17α,21 - trihydroxy - 1,4 - pregnadiene-3,11,20-trione 16,17-acetonide 21-methanesulfonate | 5 |
| Deionized water, q.s. 1000 ml. | |

The preservative and flavor are dispersed in the water. The finely powdered steroid is added and the resulting mixture homogenized to give a suspension.

The above suspension is employed orally in adult humans in the treatment of inflammatory conditions of the skin amenable to steroid therapy on a dosage of 1 teaspoonful given 3 times daily.

COMPOSITION EXAMPLE 23.—INJECTABLE SUSPENSION

A lot of 1000 ml. of a sterile aqueous suspension, each milliliter containing 20 mg. of 6α-methyl-9α-fluoro-11β,16α,17α,21-tetrahydroxy-1,4-pregnadiene-3,20 - dione 16,17-acetonide 21-methanesulfonate, is prepared from the following ingredients:

| | Gm. |
|---|---|
| Sodium chloride | 9 |
| Preservative | 0.2 |
| 6α-methyl-9α-fluoro - 11β,16α,17α,21 - tetrahydroxy-1,4-pregnadiene-3,20 - dione 16,17-acetonide 21-methanesulfonate | 20 |
| Water for injection, q.s. 1000 ml. | |

The sodium chloride and preservative are dissolved in the water and the resulting mixture is sterilized by passage through a sterilizing filter. The steroid is micronized, sterilized by exposure to sterilizing vapor and added aseptically to the sterile aqueous solution. The resulting mixture is passed through a sterile homogenizer to obtain a uniform suspension. The suspension is then filled aseptically into sterile vials.

The above suspension is employed in adult humans by injection in the treatment of bronchial asthma on a dosage of 1 ml. given intramuscularly 2 times daily.

COMPOSITION EXAMPLE 24

For the active ingredients of each of Composition Examples 20 through 23 there can be substituted equal amounts of 11β,16α,17α,21-tetrahydroxy-4-pregnene-3,20-dione 16,17-acetonide 21- methanesulfonate,
11β,16α,17α,21-tetrahydroxy-1,4-pregnadiene - 3,20-dione 16,17-acetonide 21-methanesulfonate,
9α-fluoro-11β,16α,17α,21-tetrahydroxy-4-pregnene - 3,20-dione 16,17-acetonide 21-methanesulfonate,
6α-methyl - 11β,16α,17α,21-tetrahydroxy-4-pregnene-3,20-dione 16,17-acetonide 21-methanesulfonate,
6α-methyl-11β,16α,17α,21 - tetrahydroxy-1,4-pregnadiene-3,20-dione 16,17-acetonide 21-methanesulfonate,
6α-methyl - 9α - fluoro - 11β,16α,17α,21 - tetrahydroxy-4-pregnene 3,20-dione 16,17-acetonide 21-methanesulfonate,
6α-methyl-9α - fluoro - 11β,16α,17α,21 - tetrahydroxy-1,4-pregnadiene-3,20-dione 16,17-acetonide 21-methanesulfonate,
6α-fluoro-11β,16α,17α,21-tetrahydroxy - 4-pregnene - 3,20-dione 16,17-acetonide 21-methanesulfonate,
6α-fluoro-11β,16α,17α,21 - tetrahydroxy-1,4 - pregnadiene-3,20-dione 16,17-acetonide 21-methanesulfonate,
6α,9α - difluoro - 11β,16α,17α,21-tetrahydroxy-4-pregnene-3,20-dione 16,17-acetonide 21-methanesulfonate,
16α,17α,21 - trihydroxy-4-pregnene-3,11,20-trione 16,17-acetonide 21-methanesulfonate,
16α,17α,21 - trihydroxy - 1,4 - pregnadiene-3,11,20-trione 16,17-acetonide 21-methanesulfonate,
9α-fluoro-16α,17α,21-trihydroxy-4-pregnene-3,11,20-trione 16,17-acetonide 21-methanesulfonate,
6α - methyl - 16α,17α,21 - trihydroxy-4-pregnene-3,11,20-trione 16,17-acetonide 21-methanesulfonate,
6α-methyl-16α,17α,21-trihydroxy-1,4-pregnadiene-3,11,20-trione 16,17-acetonide 21-methanesulfonate,
6α - methyl - 9α-fluoro-16α,17α,21-trihydroxy-4-pregnene-3,11,20-trione 16,17-acetonide 21-methanesulfonate,
6α - methyl - 9α-fluoro-16α,17α,21-trihydroxy-1,4-pregnadiene-3,11,20-trione 16,17-acetonide 21-methanesulfonate,
6α-fluoro-16α,17α,21-trihydroxy-4-pregnene-3,11,20-trione 16,17-acetonide 21-methanesulfonate,
6α-fluoro-16α,17α,21-trihydroxy-1,4 - pregnadiene-3,11,20-trione 16,17-acetonide 21-methanesulfonate,
6α,9α-difluoro-16α,17α,21-trihydroxy-4-pregnene - 3,11,20-trione 16,17-acetonide 21-methanesulfonate, and
6α,9α-difluoro-16α,17α,21 - trihydroxy - 1,4 - pregnadiene-3,11,20-trione 16,17-acetonide 21-methanesulfonate.

The resulting 5 mg. tablets, 50 mg. capsules, 25 mg. per teaspoonful oral aqueous suspensions and 20 mg. per ml. injectable aqueous suspensions can be administered on a schedule of 1 tablet 4 times daily, 1 capsule 3 times daily, 1 teaspoonful of aqueous suspension 3 times daily, and 1 ml. of injectable suspension intramuscularly 2 times daily, respectively, in the treatment of inflammatory conditions amenable to steroid therapy.

COMPOSITION EXAMPLE 25

In addition to the 21-methanesulfonates of Composition Examples 20 through 24, the 21-ethanesulfonates, 21-dodecanesulfonates, 21-(2-butanesulfonates), 21-cyclohexanesulfonates, 21-phenylmethanesulfonates, 21-o-toluenesulfonates, 21-p-toluenesulfonates, 21-o-bromobenzenesulfonates, 21-p-chlorobenzenesulfonates, 21-(o-, m-, p-nitrobenzenesulfonates) and 21-anisole-2-sulfonates can be substituted in equal amounts for the active ingredient in each of the foregoing Composition Examples 20 through 23. The resulting compositions are given on the dosage schedule indicated above for the treatment of inflammatory conditions amenable to steroid therapy.

COMPOSITION EXAMPLE 26.—TABLETS

A lot of 10,000 compressed tablets, each tablet containing 5 mg. of 6α,9α-difluoro-16α-methyl-11β,17α,21-trihydroxy-1,4-pregnadiene-3,20-dione 21-methanesulfonate, is prepared from the following ingredients:

| | Gm. |
|---|---|
| 6α,9α - difluoro - 16α-methyl-11β,17α,21-trihydroxy-1,4-pregnadiene-3,20-dione 21-methanesulfonate | 50 |
| Lactose | 1000 |
| Starch | 32.5 |
| Stearic acid | 6.5 |

The finely powdered ingredients are thoroughly mixed and granulated with 10% starch paste. After drying, the granules are mixed with the starch and stearic acid and compressed into tablets in the usual manner.

The above tablets are employed orally in adult humans for the treatment of disseminated lupus erythematosus on a dosage of 1 tablet given 4 times daily.

COMPOSITION EXAMPLE 27.—CAPSULES

A lot of 10,000 capsules, each capsule containing 50 mg. of 16α-methyl-9α-fluoro-11β,17α,21-trihydroxy-1,4-pregnadiene-3,20-dione 21-methanesulfonate, is prepared from the following ingredients:

| | Gm. |
|---|---|
| 16α - methyl - 9α - fluoro-11β,17α,21-trihydroxy-1,4-pregnadiene-3,20-dione 21-methanesulfonate | 500 |
| Starch, bolted | 1500 |
| Calcium stearate | 35 |
| Talc | 65 |

The starch, talc and calcium stearate are thoroughly mixed and the finely powdered steroid incorporated into the mixture. The resulting material is milled, screened and filled into hard-gelatin capsules in the usual manner.

The above capsules are employed orally in adult humans in the treatment of nonspecific keratitis on a dosage of 1 capsule given 3 times daily.

COMPOSITION EXAMPLE 28.—ORAL SUSPENSION

A lot of 1000 ml. of an aqueous suspension, each teaspoonful (5 ml.) of which contains 25 mg. of 6α,16α-dimethyl - 9α-fluoro-11β,17α,21-trihydroxy-1,4-pregnadiene-3,20-dione 21-methane-sulfonate, is prepared from the following ingredients:

| | | |
|---|---|---|
| Methylparaben | gm | 0.75 |
| Propylparaben | gm | 0.25 |
| Saccharin sodium | gm | 1.25 |
| Cyclamate sodium (sodium cyclohexylsulfamate | gm | 0.25 |
| Glycerin | ml | 300 |
| Tragacanth powder | gm | 1 |
| F.D.C. orange dye | gm | 0.75 |
| 6α,16α - dimethyl - 9α-fluoro-11β,17α,21-trihydroxy-1,4 - pregnadiene - 3,20 - dione 21 - methanesulfonate | gm | 5 |
| Deionized water, q.s. 1000 ml. | | |

The above ingredients are thoroughly mixed and homogenized to give a suspension.

The above suspension is employed orally in adult humans in the treatment of moderately severe dermatologic conditions amenable to steroid therapy on a dosage of 1 teaspoonful given 3 times daily.

COMPOSITION EXAMPLE 29.—INJECTABLE SUSPENSION

A lot of 1000 ml. of sterile aqueous suspension, each milliliter containing 20 g. of 16α-methyl-9α-fluoro-17α, 21-dihydroxy-1,4-pregnadiene-3,11,20-trione 21-methanesulfonate, is prepared from the following ingredients:

| | Gm. |
|---|---|
| Polyethylene glycol 4000 | 30 |
| Sodium chloride | 9 |
| Myristyl-gamma-picolinium chloride | 0.2 |
| 16α - methyl-9α-fluoro-17α,21-dihydroxy,1,4-pregnadiene-3,11,20-trione 21-methanesulfonate | 20 |
| Water for injection, q.s. 1000 ml. | |

The ingredients, except for the steroid, are thoroughly mixed and dissolved, with stirring, followed by sterilization of the solution by filtration. To the said solution is added the steroid which has been previously air micronized to a particle size less than about 10 microns and sterilized with ethylene oxide gas. The resulting suspension is passed through a sterilized colloid mill and filled under aseptic conditions into sterile containers.

The above suspension is employed by injection in adult humans in the treatment of bronchial asthma on a dosage of 1 ml. given intramuscularly 2 times daily.

COMPOSITION EXAMPLE 30

For the active ingredients of each of Composition Examples 26 through 29, there can be substituted equal amounts of 16β-methyl-9α-fluoro-11β,17α,21-trihydroxy-1,4-pregnadiene-3,20-dione 21-methanesulfonate, 6α,16β-dimethyl-9α-fluoro-11β,17α,21-trihydroxy-1,4-pregnadiene-3,20-dione 21-methanesulfonate, 6α,9α-difluoro-16β-methyl-11β,17α,21-trihydroxy-1,4-pregnadiene-3,20-dione 21-methanesulfonate, 16β-methyl-11β,17α,21-trihydroxy-1,4-pregnadiene-3,20-dione 21-methanesulfonate, 16β-methyl- and 16α-methyl-11β,17α,21-trihydroxy-4-pregnene-3,20-dione 21-methanesulfonate, 16β-methyl-9α-fluoro- and 16α-methyl-9α-fluoro-11β,17α,21-trihydroxy-4-pregnene-3,20-dione 21-methanesulfonate, 6α,16β-dimethyl- and 6α,16α-dimethyl-11β,17α,21-trihydroxy-4-pregnene-3,20-dione 21-methanesulfonate, 6α,16β-dimethyl- and 6α,16α-dimethyl,11β,17α,21-trihydroxy-1,4-pregnadiene-3,20-dione 21-methanesulfonate, 6α,16β-dimethyl-9α-fluoro- and 6α,16α-dimethyl-9α-fluoro-11β,17α,21-trihydroxy-4-pregnene-3,20-dione 21-methanesulfonate, 6α,16β-dimethyl-9α-fluoro- and 6α,16α-dimethyl-9α-fluoro-21-trihydroxy-4-pregnene-3,20-dione 21-methanesulfonate, 6α-fluoro-16β-methyl- and 6α-fluoro-16α-methyl-11β,17α,21-trihydroxy-1,4-pregnadiene-3,20-dione 21-methanesulfonate, 6α,9α-difluoro-16β-methyl- and 6α,9α-difluoro-16α-methyl-11β,17α,21-trihydroxy-4-pregnene-3,20-dione 21-methanesulfonate, 16β-methyl-9α-fluoro-17α,21-dihydroxy-1,4-pregnadiene-3,11,20-trione 21-methanesulfonate, 16β-methyl- and 16α-methyl-17α,21-dihydroxy-4-pregnene-3,11,20-trione 21-methanesulfonate, 16β-methyl- and 16α-methyl-17α,21-dihydroxy-1,4-pregnadiene-3,11,20-trione 21-methanesulfonate, 16β-methyl-9α-fluoro- and 16α-methyl-9α-fluoro-17α,21-dihydroxy-4-pregnene-3,11,20-trione 21-methanesulfonate, 6α,16β-dimethyl- and 6α,16α-dimethyl-17α,21-dihydroxy-4-pregnene-3,11,20-trione 21-methanesulfonate, 6α,16β-dimethyl- and 6α,16α-dimethyl-17α,21-dihydroxy-1,4-pregnadiene-3,11,20-trione 21-methanesulfonate, 6α,16β-dimethyl-9α-fluoro- and 6α,16α-dimethyl-9α-fluoro-17α,21-dihydroxy-4-pregnene-3,11,20-trione 21-methanesulfonate 6α,16β-dimethyl-9α-fluoro- and 6α,16α-dimethyl-9α-fluoro-17α,21-dihydroxy-1,4-pregnadiene-3,11,20-trione 21-methanesulfonate, 6α-fluoro-16β-methyl- and 6α-fluoro-16α-methyl-17α,21-dihydroxy-4-pregnene-3,11,20-trione 21-methanesulfonate, 6α-fluoro-16β-methyl- and 6α-fluoro-16α-methyl-17α,21-dihydroxy-1,4-pregnadiene-3,11,20-trione 21-methanesulfonate, 6α,9α-difluoro-16β-methyl- and 6α,9α-difluoro-16α-methyl-17α,21-dihydroxy-4-pregnene-3,11,20-trione 21-methanesulfonate, and 6α,9α-difluoro-16β-methyl- and 6α,9α-difluoro-16α-methyl-17α,21-dihydroxy-1,4-pregnadiene-3,11,20-trione 21-methanesulfonate.

The resulting 5 mg. tablets, 50 mg. capsules, 25 mg. per teaspoonful oral aqueous suspensions and 20 mg. per ml. injectable aqueous suspensions can be administered on a schedule of 1 tablet 4 times daily, 1 capsule 3 times daily, 1 teaspoonful of aqueous suspension 3 times daily, and 1 ml. of injectable suspension intramuscularly 2 times daily, respectively, in the treatment of inflammatory conditions amenable to steroid therapy.

COMPOSITION EXAMPLE 31

In addition to the 21-methanesulfonates of Composition Examples 26 through 30, the 21-ethanesulfonates, 21-dodecanesulfonates, 21-(2-butanesulfonates), 21-cyclohexanesulfonates, 21-phenylmethanesulfonates, 21-o-toluene sulfonates, 21-p-toluenesulfonates, 21-o-bromobenzenesulfonates, 21-p-chlorobenzenesulfonates, 21-(o-, m-, p-nitrobenzenesulfonates), and 21-anisole-2-sulfonates can be substituted in equal amounts for the active ingredients in each of the foregoing Composition Examples 26 through 29. The resulting compositions are given on the dosage schedule indicated above for the treatment of inflammatory conditions amenable to steroid therapy.

COMPOSITION EXAMPLE 32.—TABLETS

A lot of 10,000 compressed tablets, each tablet containing 5 mg. of 6α-methyl-9α,16α-difluoro-11β,17α,21-trihydroxy - 1,4 - pregnadiene-3,20-dione 21-methanesulfonate, is prepared from the following ingredients:

| | Gm. |
|---|---|
| 6α - methyl - 9α,16α - difluoro - 11β,17α,21-trihydroxy-1,4-pregnadiene-3,20-dione 21-methanesulfonate | 50 |
| Lactose | 1000 |

The finely powdered ingredients are thoroughly mixed and granulated with syrup-starch paste. After the granules are dried, starch and calcium stearate are added and the resulting mixture is compressed into tablets in the usual manner.

The above tablets are employed orally in adult humans in the treatment of moderately severe rheumatoid arthritis on a dosage of 1 tablet given 4 times daily.

COMPOSITION EXAMPLE 33.—CAPSULES

A lot of 10,000 hard-gelatin capsules, each capsule containing 50 mg. of 6α-methyl-9α,16α-difluoro-17α,21-dihydroxy - 1,4 - pregnadiene-3,11,20-trione 21-methanesulfonate, is prepared from the following ingredients:

| | Gm. |
|---|---|
| 6α - methyl - 9α,16α-difluoro-17α,21-dihydroxy-1,4-pregnadiene-3,11,20-trione 21-methanesulfonate | 500 |
| Starch, dried | 1200 |
| Talc | 600 |

The starch and talc are thoroughly mixed and the finely powdered steroid incorporated into the mixture. The whole is milled, screened and filled into hard-gelatin capsules in the usual manner.

The above capsules are employed orally in adult humans in the treatment of the collagen diseases amenable to steroid therapy on a dosage of 1 capsule given 3 times daily.

COMPOSITION EXAMPLE 34.—ORAL SUSPENSION

A lot of 1000 ml. of an oral suspension, each teaspoonful (5 ml.) of which contains 25 mg. of $9\alpha$, $16\beta$-difluoro-$11\beta$,$17\alpha$-21-trihydroxy-4-pregnene-3,20-dione 21-methanesulfonate, is prepared from the following ingredients:

|  | Gm. |
|---|---|
| Polyvinyl alcohol | 4 |
| Saccharin | 1 |
| Sucrose | 500 |
| Benzoic acid | 1 |
| Methylparaben | 1 |
| Cocoa | 50 |
| Flavor, q.s. | |
| $9\alpha,16\beta$ - difluoro-$11\beta,17\alpha$,21-trihydroxy-4-pregnene-3,20-dione 21-methanesulfonate | 5 |
| Deionized water, q.s. 1000 ml. | |

The steroid is micronized and thoroughly mixed with the above ingredients to form a uniform suspension.

The above suspension is employed orally in adult humans in the treatment of inflammatory conditions of the eye amenable to steroid therapy on a dosage of 1 teaspoonful given 3 times daily.

COMPOSITION EXAMPLE 35.—INJECTABLE SUSPENSION

A lot of 1000 ml. of sterile aqueous suspension, each ml. containing 20 mg. of $6\alpha,16\alpha$-difluoro-$11\beta,17\alpha$,21-trihydroxy-1,4-pregnadiene-3,20-dione 21-methanesulfonate, is prepared from the following ingredients:

|  | Grams |
|---|---|
| Sodium citrate | 5.7 |
| Sodium carboxymethylcellulose, viscosity 25 to 50 centipoises at 25° C. and 2% concentration | 5 |
| Polyvinylpyrrolidone | 5 |
| Methylparaben | 2.63 |
| $6\alpha,16\alpha$-difluoro-$11\beta,17\alpha$,21-trihydroxy - 1,4-pregnadiene-3,20-dione 21-methanesulfonate | 20 |
| Water for injection, q.s. 1000 ml. | |

The sodium citrate, sodium carboxymethylcellulose and polyvinylpyrrolidone are dispersed in a major portion of the water and sterilized by heating to 120° C. for 30 minutes. When the vehicle has cooled, the methylparaben, previously sterilized with ethylene oxide gas, is added to the vehicle. The steroid is sterilized by treatment with ethylene oxide and aseptically added to the vehicle together with the balance of the water. The resulting suspension is passed through a sterilized colloid mill and filled aseptically into sterile containers.

The above suspension is employed in adult humans by injection in the treatment of moderately severe bronchial asthma on a dosage of 1 ml. given intramuscularly 2 times daily.

COMPOSITION EXAMPLE 36

For the active ingredients of each of Composition Examples 32 through 35, there can be substituted equal amounts of $6\alpha$-methyl-$9\alpha,16\beta$-difluoro-$11\beta,17\alpha$,21-trihydroxy-1,4-pregnadiene-3,20-dione 21-methanesulfonate, $16\beta$-fluoro- and $16\alpha$-fluoro-$11\beta,17\alpha$,21-trihydroxy-4-pregnene-3,20-dione 21-methanesulfonate, $16\beta$-fluoro- and $16\alpha$-fluoro-$11\beta,17\alpha$,21-trihydroxy-1,4-pregnadiene-3,20-dione 21-methanesulfonate, $9\alpha,16\beta$-difluoro- and $9\alpha,16\alpha$-difluoro-$11\beta,17\alpha$,21-trihydroxy-4-pregnene-3,20-dione 21-methanesulfonate, $9\alpha,16\beta$-difluoro- and $9\alpha,16\alpha$-difluoro-$11\beta,17\alpha$,21-trihydroxy-1,4-pregnadiene-3,20-dione- 21-methanesulfonate, $6\alpha$-methyl-$16\beta$-fluoro- and $6\alpha$-methyl-$16\alpha$-fluoro-$11\beta,17\alpha$,21-trihydroxy-4-pregnene-3,20-dione 21-methanesulfonate, $6\alpha$-methyl-$16\beta$-fluoro- and $6\alpha$-methyl-$16\alpha$-fluoro-$11\beta,17\alpha$,21-trihydroxy-1,4-pregnadiene-3,20-dione 21-methanesulfonate, $6\alpha$-methyl-$9\alpha,16\beta$-difluoro- and $6\alpha$-methyl-$9\alpha,16\alpha$-difluoro-$11\beta,17\alpha$,21-trihydroxy-4-pregnene-3,20-dione 21-methanesulfonate, $6\alpha,16\beta$-difluoro- and $6\alpha,16\alpha$-difluoro-$11\beta,17\alpha$,21-trihydroxy-4-pregnene-3,20-dione 21-methanesulfonate, $6\alpha,16\beta$-difluoro- and $6\alpha,16\alpha$-difluoro-$11\beta,17\alpha$-21-trihydroxy-1,4-pregnadiene-3,20-dione 21-methanesulfonate, $6\alpha,9\alpha,16\beta$-trifluoro- and $6\alpha,9\alpha,16\alpha$-trifluoro-$11\beta,17\alpha$,21-trihydroxy-4-pregnene-3,20-dione 21-methanesulfonate, $6\alpha,9\alpha,16\beta$-trifluoro- and $6\alpha,9\alpha,16\alpha$-trifluoro-$11\beta,17\alpha$,21-trihydroxy-1,4-pregnadiene-3,20-dione 21-methanesulfonate, $6\alpha$-methyl-$9\alpha,16\beta$-difluoro-$17\alpha$,21-dihydroxy-1,4-pregnadiene-3,11,20-trione 21-methanesulfonate, $16\beta$-fluoro- and $16\alpha$-fluoro-$17\alpha$,21-dihydroxy-4-pregnene-3,11,20-trione 21-methanesulfonate, $16\beta$-fluoro- and $16\alpha$-fluoro-$17\alpha$,21-dihydroxy-1,4-pregnadiene-3,11,20-trione 21-methanesulfonate, $9\alpha,16\beta$-difluoro- and $9\alpha,16\alpha$-difluoro-$17\alpha$,21-dihydroxy-4-pregnene-3,11,20-trione 21-methanesulfonate, $9\alpha,16\beta$-difluoro- and $9\alpha,16\alpha$-difluoro-$17\alpha$,21-dihydroxy-1,4-pregnadiene-3,11,20-trione 21-methanesulfonate, $6\alpha$-methyl-$16\beta$-fluoro- and $6\alpha$-methyl-$16\alpha$-fluoro-$17\alpha$,21-dihydroxy-4-pregnene-3,11,20-trione 21-methanesulfonate, $6\alpha$-methyl-$16\beta$-fluoro- and $6\alpha$-methyl-$16\alpha$-fluoro-$17\alpha$,21-dihydroxy-1,4-pregnadiene-3,11,20-trione 21-methanesulfonate, $6\alpha$-methyl-$9\alpha,16\beta$-difluoro- and $6\alpha$-methyl-$9\alpha,16\alpha$-difluoro-$17\alpha$,21-dihydroxy-4-pregnene-3,11,20-trione 21-methanesulfonate, $6\alpha,16\beta$-difluoro- and $6\alpha,16\alpha$-difluoro-$17\alpha$,21-dihydroxy-4-pregnene-3,11,20-trione 21-methanesulfonate, $6\alpha,16\beta$-difluoro- and $6\alpha,16\alpha$-difluoro-$17\alpha$,21-dihydroxy-1,4-pregnadiene-3,11,20-trione 21-methanesulfonate, $6\alpha,9\alpha,16\beta$-trifluoro- and $6\alpha,9\alpha,16\alpha$-trifluoro-$17\alpha$,21-dihydroxy-4-pregnene-3,11,20-trione 21-methanesulfonate, and $6\alpha,9\alpha,16\beta$-trifluoro- and $6\alpha,9\alpha,16\alpha$-trifluoro-$17\alpha$,21-dihydroxy-1,4-pregnadiene-3,20-dione 21-methanesulfonate.

The resulting 5 mg. tablets, 50 mg. capsules, 25 mg. per teaspoonful oral aqueous suspensions and 20 mg. per ml. injectable aqueous suspensions can be administered on a schedule of 1 tablet 4 times daily, 1 capsule 3 times daily, 1 teaspoonful of aqueous suspension 3 times daily, and 1 ml. of injectable suspension intramuscularly 2 times daily, respectively, in the treatment of inflammatory conditions amenable to steroid therapy.

COMPOSITION EXAMPLE 37

In addition to the 21-methanesulfonates of Composition Examples 32 through 36, the 21-ethanesulfonates, 21-dodecanesulfonates, 21-(2-butanesulfonates), 21-cyclohexanesulfonates, 21 - phenylmethanesulfonates, 21 - o-toluenesulfonates, 21-p-toluenesulfonates, 21-o-bromobenzenesulfonates, 21-p-chlorobenzenesulfonates, 21-(o-, m-, p-nitrobenzenesulfonates) and 21-anisole-2-sulfonates can be substituted in equal amounts for the active ingredient in each of the foregoing Composition Examples 32 through 35. The resulting compositions are given on the dosage schedule indicated above for the treatment of inflammatory conditions amenable to steroid therapy.

This application is a continuation-in-part of U.S. application Serial Nos. 753,157, filed August 4, 1958; 760,849, filed September 15, 1958, now Patent No. 3,005,838; 800,090, filed March 18, 1959, now abndoned;

800,091, filed March 18, 1959; 815,791, filed May 26, 1959, now Patent No. 3,012,028; and 829,516, filed July 27, 1959, now abandoned.

What is claimed is:

1. 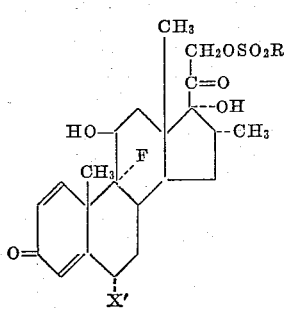

wherein X' is selected from the group consisting of methyl and fluorine, and R is an alkyl radical containing from 1 through 12 carbon atoms.

2. 6α,16α-dimethyl - 9α - fluoro-11β,17α,21-trihydroxy-1,4-pregnadiene-3,20-dione 21-methanesulfonate.

3. 6α,9α-difluoro - 16α - methyl-11β,17α,21-trihydroxy-1,4-pregnadiene-3,20-dione 21-methanesulfonate.

References Cited in the file of this patent

UNITED STATES PATENTS

| | | |
|---|---|---|
| 2,884,420 | Spero et al. | Apr. 28, 1959 |
| 2,884,421 | Magerlein et al. | Apr. 28, 1959 |
| 2,903,449 | Fried et al. | Sept. 8, 1959 |
| 2,985,652 | Ringold et al. | May 23, 1961 |

OTHER REFERENCES

Fieser et al.: Steroids (1959), pages 692–696, Reinhold Pub. Co., New York, N.Y.